US010407983B2

United States Patent
Holt et al.

(10) Patent No.: US 10,407,983 B2
(45) Date of Patent: Sep. 10, 2019

(54) OPERATING SYSTEM FOR AN ARCHITECTURAL COVERING

(71) Applicant: Hunter Douglas Inc., Pearl River, NY (US)

(72) Inventors: Ronald Holt, Westminster, CO (US); Stephen T. Wisecup, Niwot, CO (US); Terry L. Akins, Boulder, CO (US)

(73) Assignee: Hunter Douglas Inc., Pearl River, NY (US)

( * ) Notice: Subject to any disclaimer, the term of this patent is extended or adjusted under 35 U.S.C. 154(b) by 34 days.

(21) Appl. No.: 15/729,769

(22) Filed: Oct. 11, 2017

(65) Prior Publication Data

US 2018/0112461 A1     Apr. 26, 2018

Related U.S. Application Data

(60) Provisional application No. 62/530,516, filed on Jul. 10, 2017, provisional application No. 62/452,404, (Continued)

(51) Int. Cl.
    *E06B 9/90*     (2006.01)
    *E06B 9/42*     (2006.01)
    (Continued)

(52) U.S. Cl.
    CPC ............... *E06B 9/42* (2013.01); *E06B 9/78* (2013.01); *E06B 9/80* (2013.01); *E06B 9/90* (2013.01);
    (Continued)

(58) Field of Classification Search
    CPC ............... F16H 3/66; F16H 2200/2007; F16H 2200/2035; F16H 2716/02; F16D 7/044;
    (Continued)

(56) References Cited

U.S. PATENT DOCUMENTS

| 1,744,686 A | 1/1930 | Pease et al. |
| 4,224,973 A * | 9/1980 | Hugin .................... E06B 9/361 160/176.1 V |

(Continued)

FOREIGN PATENT DOCUMENTS

| DE | 3623612 A1 | 1/1988 |
| DE | 889193 T1 | 6/1999 |

(Continued)

OTHER PUBLICATIONS

English translation of EP2520754B1; http://translationportal.epo.org; Apr. 23, 2019 (Year: 2019).*
EP Search from EP17197371, dated Jul. 27, 2018, 10 pages.

*Primary Examiner* — Roger L Pang

(57) ABSTRACT

An operating system for an architectural covering is provided. The operating system allows at least three modes of operation of an architectural covering. A transmission may be included between an input assembly and an output drive member, and the transmission may be selectively engaged to place the operating system into one of the at least three modes of operation. The operating system may include a first drive section including an input, a second drive section including an output, and a control mechanism arranged to selectively lock an element of the first and second drive sections to control movement of the output of the operating system upon actuation of the input. A shift lock is also disclosed herein. In use, the shift lock operates to restrict shifting operation of the operating system from one operating mode to another.

24 Claims, 28 Drawing Sheets

Related U.S. Application Data filed on Jan. 31, 2017, provisional application No. 62/413,301, filed on Oct. 26, 2016.

(51) Int. Cl.
*E06B 9/80* (2006.01)
*F16D 7/04* (2006.01)
*F16H 3/66* (2006.01)
*E06B 9/78* (2006.01)
*E06B 9/264* (2006.01)
*E06B 9/174* (2006.01)

(52) U.S. Cl.
CPC ............ *F16D 7/044* (2013.01); *F16H 3/66* (2013.01); *E06B 9/264* (2013.01); *E06B 2009/1746* (2013.01); *E06B 2009/801* (2013.01); *E06B 2009/802* (2013.01); *E06B 2009/905* (2013.01); *F16H 2200/2007* (2013.01); *F16H 2200/2035* (2013.01); *F16H 2716/02* (2013.01)

(58) Field of Classification Search
CPC ..... E06B 9/42; E06B 9/90; E06B 9/78; E06B 9/80; E06B 2009/905; E06B 2009/802; E06B 2009/801; E06B 2009/1746; E06B 9/264
USPC .................................. 475/286, 294
See application file for complete search history.

(56) References Cited

U.S. PATENT DOCUMENTS

| 6,129,131 | A | 10/2000 | Colson |
| 6,379,276 | B1* | 4/2002 | Cheng ................. F16H 37/0826 475/330 |
| 7,128,126 | B2 | 10/2006 | Smith et al. |
| 7,159,635 | B2 | 1/2007 | Holt et al. |
| D541,568 | S | 5/2007 | Metaxatos et al. |
| 7,578,334 | B2 | 8/2009 | Smith |
| 8,186,413 | B2 | 5/2012 | Fujita et al. |
| 9,890,588 | B2 | 2/2018 | Smith |
| 9,938,760 | B2* | 4/2018 | Makino ................. E05F 15/643 |
| 10,180,029 | B2* | 1/2019 | Adreon ................... E06B 9/322 |
| 2005/0035238 | A1* | 2/2005 | Fun .......................... E06B 9/72 242/381 |
| 2009/0120592 | A1 | 5/2009 | Lesperance |
| 2009/0120593 | A1 | 5/2009 | Lesperance |
| 2017/0198520 | A1 | 7/2017 | Anderson et al. |
| 2017/0241197 | A1 | 8/2017 | Anthony et al. |

FOREIGN PATENT DOCUMENTS

| EP | 0940553 | A2 | 9/1999 | |
| EP | 2520754 | B1 * | 12/2015 | .............. E06B 9/68 |
| NL | 1040592 | | 7/2015 | |

* cited by examiner

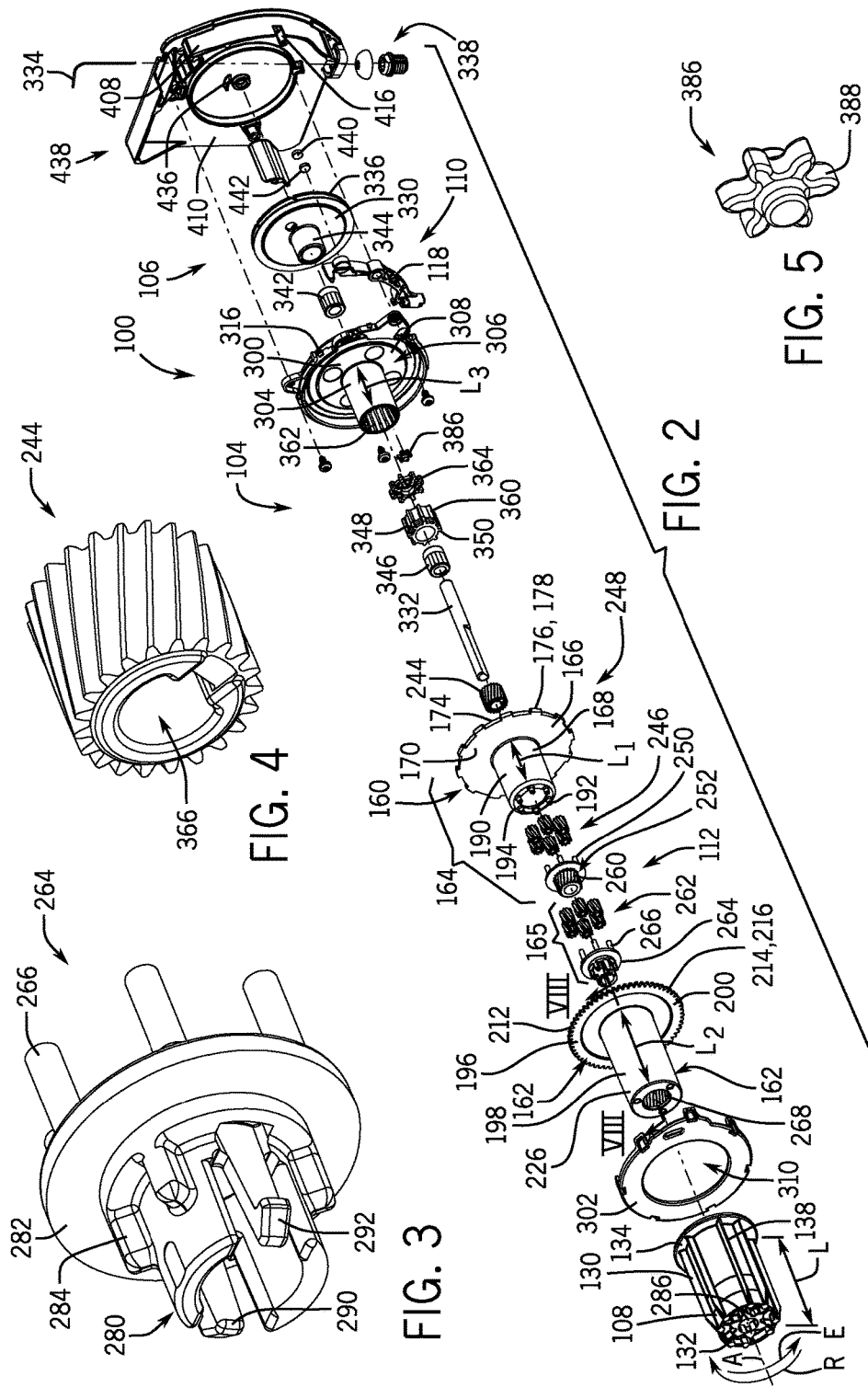

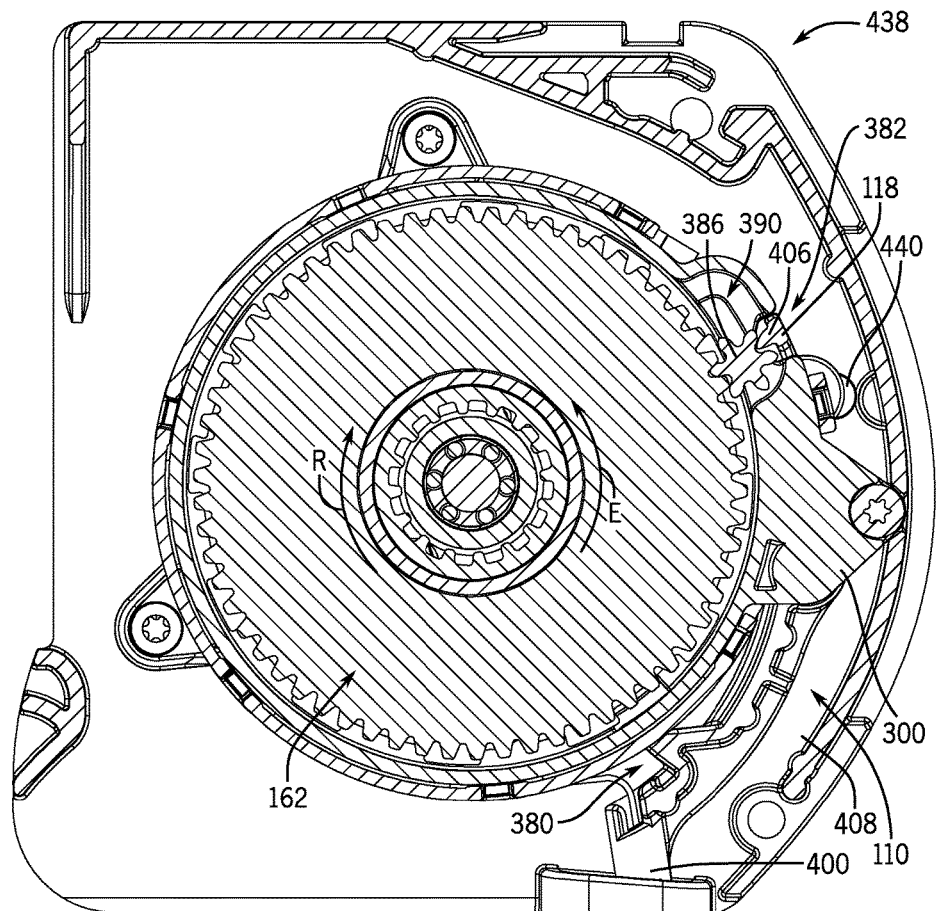
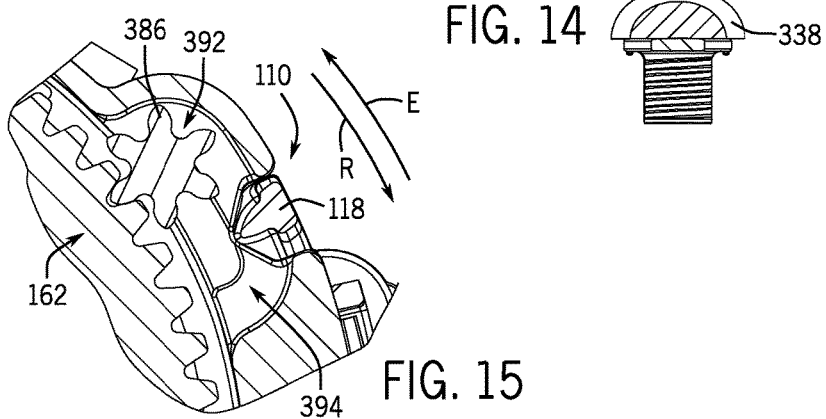

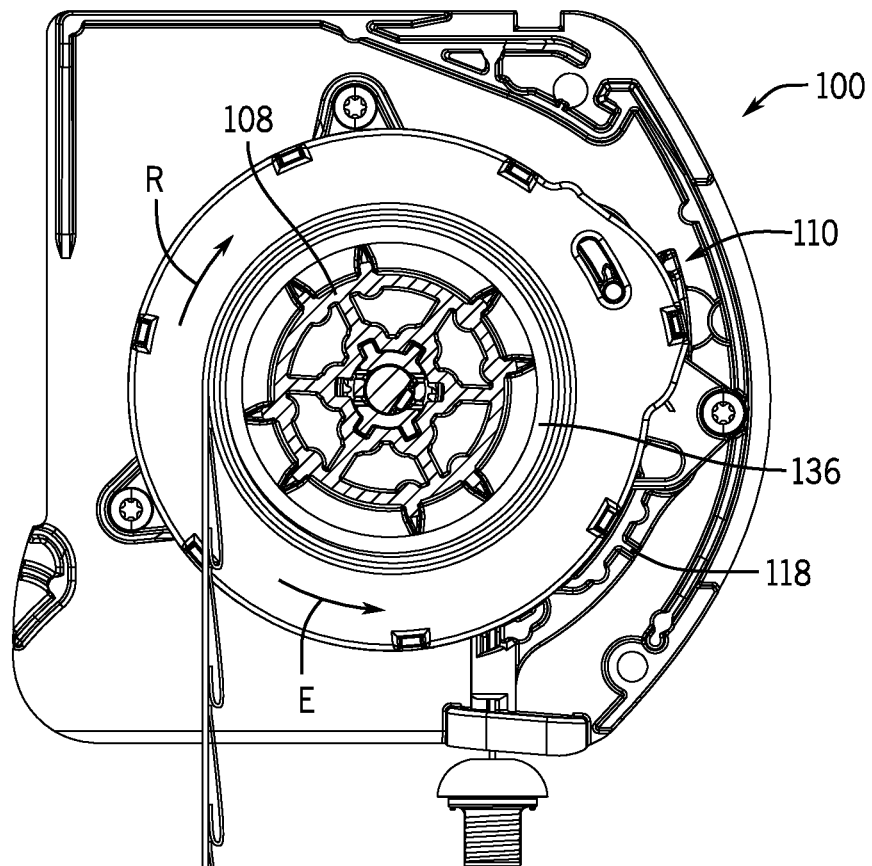
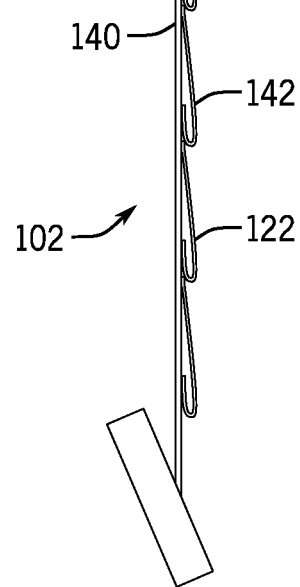
FIG. 19

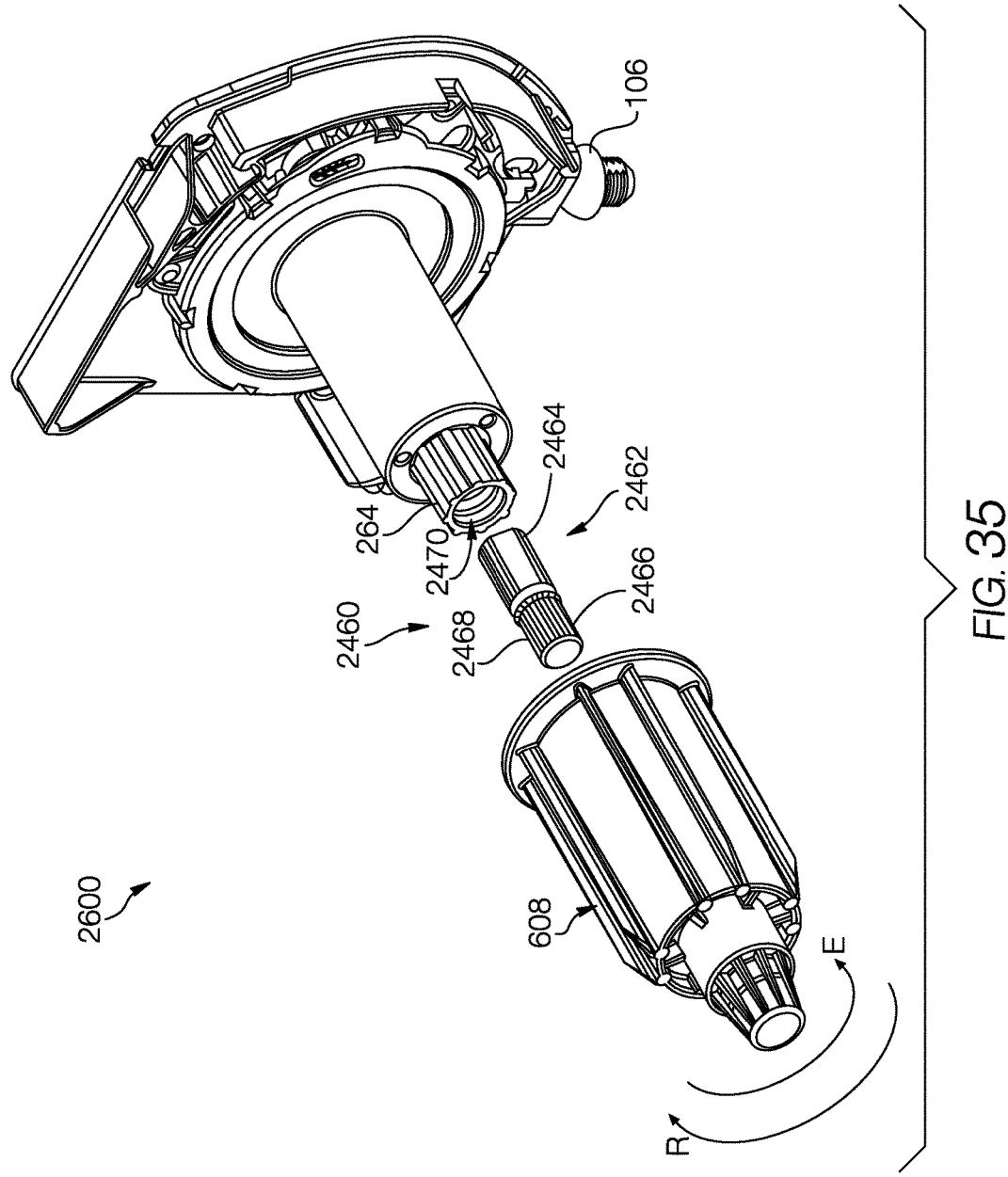

OPERATING SYSTEM FOR AN ARCHITECTURAL COVERING

CROSS-REFERENCE TO RELATED APPLICATIONS

This application claims priority to U.S. Provisional Patent Application Ser. No. 62/413,301, filed Oct. 26, 2016, titled "Operating System for an Architectural Covering", and claims priority to U.S. Provisional Patent Application Ser. No. 62/452,404, filed Jan. 31, 2017, titled "Operating System for an Architectural Covering", and claims priority to U.S. Provisional Patent Application Ser. No. 62/530,516, filed Jul. 10, 2017, titled "Operating System for an Architectural Covering", the entirety of which applications is incorporated by reference herein.

TECHNICAL FIELD

The present disclosure relates generally to architectural coverings, and more specifically to an operating system for an architectural covering.

BACKGROUND

Architectural coverings, such as coverings for structures, including walls, and openings, such as windows, doorways, archways, and the like, have taken numerous forms for many years. Some coverings include a retractable shade material that is movable between various positions or configurations, such as between an extended position and a retracted position. Additionally or alternatively, the shade material may be moved between an open configuration in which a portion of the shade material is operated to allow viewing through the shade material, and a closed configuration in which a portion of the shade material is operated to block viewing through the shade material. To move the shade material between positions or configurations, some coverings include an operating system. Some operating systems use a retractable cord mechanism to operate the operating system of the window shade or shading, thereby eliminating long, dangling cords and providing a relatively constant cord length. The retractable cord mechanism of some coverings may be operated (e.g., reciprocally pulled and automatically retracted, which alternatively may be referenced as "pumped" for the sake of convenience without intent to limit) by a user to move the shade material into one or more directions or configurations, such as to retract the shade material, to alternately retract and extend the shade material, or to both close and retract the shade material. Some operating systems allow the shade material or shading (such terms may be used interchangeably herein without intent to limit) to gravity drop under its own weight to extend the shade material across an architectural structure/feature. Some coverings include a separate mechanism biasing the shade material to open (e.g., automatically) upon the shade material reaching the fully extended configuration.

BRIEF SUMMARY

The present disclosure generally provides an operating system for an architectural covering that offers improvements or an alternative to existing arrangements. The operating system may be coupled to a shade material to facilitate operation of the architectural covering, such as facilitating movement of the shade material across or within an architectural structure or opening. The operating system may be operated by a user in two or more manners, such as three manners, to extend, open, and retract/close the shade material in relation to an architectural structure/feature. In one example, the operating system may selectively allow the shade material to gravity drop across an architectural structure/feature. Once extended, the operating system may be operated (e.g., reciprocally operated and automatically reset) to open the shade material via a retractable cord mechanism operated by a user. The retractable cord mechanism may also be operated by a user to close and/or to retract the shade material. In one embodiment, the operating system includes a control mechanism movable to change the rotation direction of a drive member. The control mechanism may alternately engage different components of the operating system, such as different components of a transmission, to alter the operation of the operating system. In one embodiment, the control mechanism is arranged to selectively lock a shared element between a plurality of drive sections of the transmission to control movement of the transmission and therefore rotation of the drive member.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment. The present disclosure of certain embodiments is merely exemplary in nature and is in no way intended to limit the claimed invention or its applications or uses. It is to be understood that other embodiments may be utilized and that structural and/or logical changes may be made without departing from the spirit and scope of the present disclosure.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. It should be understood that the claimed subject matter is not necessarily limited to the particular embodiments or arrangements illustrated herein, and the scope of the present disclosure is defined only by the appended claims.

BRIEF DESCRIPTION OF THE DRAWINGS

The accompanying drawings, which are incorporated into and constitute a part of the specification, illustrate embodiments of the present disclosure by way of illustration only and, together with the general description above and the detailed description below, serve to explain the principles of the present disclosure.

FIG. 2 is a front left exploded view of the operating system of FIG. 1 in accordance with an embodiment of the present disclosure.

FIG. 3 is an enlarged view of an output carrier in accordance with an embodiment of the present disclosure.

FIG. 4 is an enlarged view of an input gear in accordance with an embodiment of the present disclosure.

FIG. 5 is an enlarged view of an overrunning gear in accordance with an embodiment of the present disclosure.

FIG. 14 is a cross-sectional view of the operating system of FIG. 1 taken along line XIV-XIV of FIG. 7 and showing a shifter in a second operating position in accordance with an embodiment of the present disclosure.

FIG. 15 is an enlarged fragmentary view of FIG. 14 and showing an overrunning gear channel of the operating system of FIG. 1 in accordance with an embodiment of the present disclosure.

FIG. 19 is a cross-sectional view of FIG. 17 taken along line XIX-XIX and showing the shade element in an extended, closed configuration in accordance with an embodiment of the present disclosure.

FIG. 35 is a partially exploded view of an additional operating system in accordance with an embodiment of the present disclosure.

DETAILED DESCRIPTION

Figure 1:
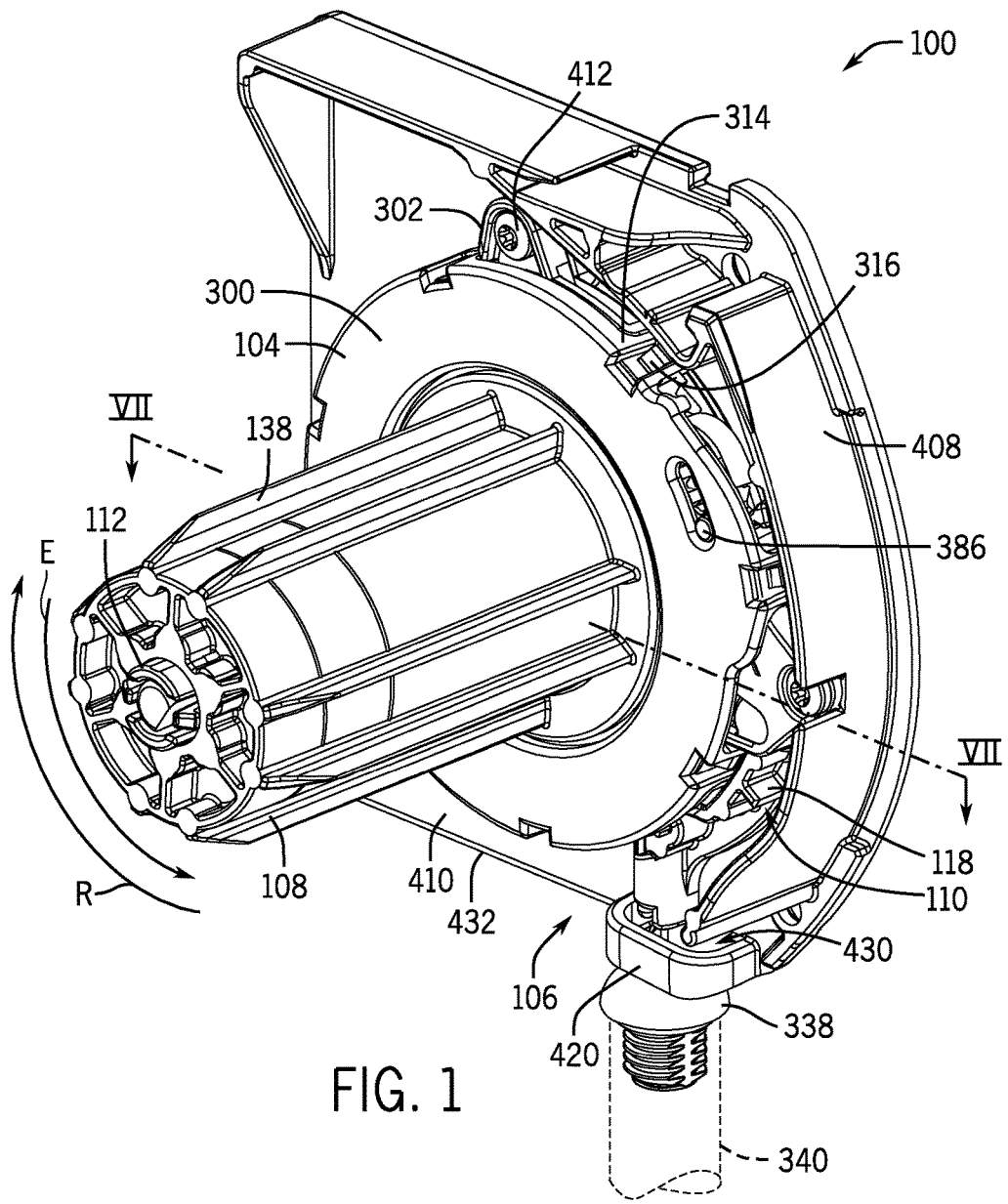
FIG. 1 is a front left isometric view of an operating system in accordance with an embodiment of the present disclosure.

In accordance with various embodiments of the present disclosure, an operating system is provided to move an associated covering or covering material, which alternatively may be referenced as "shade" for the sake of convenience without intent to limit, to a user-desired position. For instance, the operating system may move an associated covering between an extended position in which the covering at least partially covers an associated architectural structure/feature (e.g., a window, doorway, archway, or the like), and a retracted position in which the covering is at least partially retracted across the architectural structure/feature. In addition, the operating system may be operable to open and/or close the covering, such as opening or closing portions of the covering such as operable vanes of the covering, once the covering is positioned in a desired position across the architectural structure/feature, such as in an extended or retracted position.

To control operation of the operating system, the operating system may be provided with a control mechanism which may be operated to cause the operating system to switch between different operating modes (e.g., between two, three, or more operating modes). In one embodiment, the operating system switches between more than two operating modes. In one embodiment, the control mechanism alternately engages different components of the operating system, such as different components of a transmission, to shift the operating system between operating modes. For example, in a first operating mode, the operating system operates to close and/or to retract the covering. In a second operating mode, the operating system operates to allow the covering to extend across an architectural structure/feature, such as automatically under the force of gravity. In a third operating mode, the operating system operates to open the covering, such as opening operational elements (e.g., vanes) of the covering, such as once the covering is in an extended position. The various operating modes may be effected such as by engagement or disengagement of the control mechanism with at least a portion of the transmission. Further, in addition or alternatively, the various operating modes may be effected by engaging or disengaging different sections of the transmission. In one embodiment, the second operating mode is effected by disengagement of the control mechanism from the transmission. In one embodiment, the first operating mode is effected by engagement of the control mechanism with a first component of the transmission. In one embodiment, the third operating mode is effected by engagement of the control mechanism with a second component of the transmission. Depending on the position of the control mechanism, the transmission may operably move (e.g., rotate, lift, open, close, etc.) the covering, such as by rotating a rotatable element or tube in one of two directions. In at least one embodiment, the transmission may provide different drive ratios depending on the mode of operation to correspond with the operational needs of the operating system, such as closing, retracting, and/or opening an associated covering. For instance, in one embodiment, opening of the covering is effected by rotation of the drive member in the same direction as rotation for extending the covering. However, a finer control of the movement in the extension direction may be desirable in controlling elements of the covering (such as vanes) to move the extended covering into an open configuration.

As explained herein, the control mechanism is operable to control movement of the transmission to provide a desired output. For instance, the transmission may be driven by an input, the input always rotating in the same direction (e.g., in a first direction). Depending on the selective engagement of the control mechanism with different components of the transmission, the rotation direction of the transmission's output may be the same as the input, different from the input, controlled by the input, or free from control of the input (e.g., freely rotating with respect to input). This characteristic may be effected by the interaction of two or more drive sections with one another. In one embodiment, the input to the operating system is associated with a first drive section of the transmission. In one embodiment, the output of the operating system is associated with a second drive section of the transmission. As explained herein, controlling at least a portion of one of the drive sections (e.g., via the control mechanism) controls the other section(s) linked thereto, thereby affecting the output of the operating system upon actuation of the input.

According to various embodiments of the present disclosure, illustrated in the accompanying figures in which reference numbers are used for convenience and to assist in understanding without intent to limit, an operating system 100 is provided, which may be used in association with an architectural covering 102. The architectural covering 102 may be moved between retracted and extended configurations by rotation of a drive member, such as a roller shade moved upon rotation of a roller tube (see FIGS. 17-20, for example). The operating system 100 in one embodiment includes a housing 104, an input assembly 106 (which may be referenced as a retractable cord mechanism or cord reel in some embodiments), a rotatable drive member 108, a directional control mechanism 110, and a transmission 112 configured to rotate the drive member 108 upon actuation of the input assembly 106. As explained below, the drive member 108 may rotate in either a first direction E or a second opposite direction R depending on the position of the directional control mechanism 110, rotation of the drive member 108 moving the covering 102 in relation to an architectural structure/feature, such as causing the covering 102 to extend, retract, open, and/or close. For example, in one embodiment, the directional control mechanism 110 may selectively engage a first component 120 of the transmission 112 (see FIG. 6) to achieve a first function of the operating system 100, such as causing the operating system 100 to operate in a first manner, which may retract the covering 102 at least partially across an architectural structure/feature (e.g., across a window, door, archway, or the like) and/or close associated vanes 122 of the covering 102 (see FIGS. 18 and 19) upon rotation of the drive member 108 in the second direction R. Similarly, the directional control mechanism 110 may selectively engage a second component 124 of the transmission 112 (see FIG. 6) to achieve a second function of the operating system 100, such as causing the operating system 100 to operate in a second manner to extend the covering 102 at least partially across the architectural structure/feature (see FIG. 19) upon rotation of the drive member 108 in the first direction E. Additionally or alternately, selective engagement of the directional control mechanism 110 with the second component 124 of the transmission 112 may achieve a third function of the operating system 100, such as causing the operating system 100 to operate in a third manner to open the vanes 122 of the covering 102 (see FIG. 20) upon rotation of the drive member 108 in the first direction E. As detailed below, the directional control mechanism 110 may allow a user to select the desired operating mode of the operating system 100 to position the covering 102 as desired. For instance, the directional control mechanism 110 may include a shifter 118 (or other component of the operating system 100 for shifting operation of the operating system 100 from one operating mode to another) movable to alternately engage the first and second components 120, 124 of the transmission 112 to selectively control operation of the operating system 100 to achieve a desired positioning of the covering 102, as explained below. Alternatively, as will be described in greater detail below, in one embodiment, the shifter 118 may engage with a portion of a first drive section 164. Engagement of the shifter 118 with a portion of the first drive section 164 (e.g., with a first member 160 of the first drive section 164) may limit rotational movement of a portion of the first drive section 164 (e.g., the first member 160) to permit operation of the second drive section 165 to close the covering 102 and/or to retract the covering 102 across an architectural structure/feature. Similarly, engagement of the shifter 118 with a second portion of the transmission 112 (e.g., with a second member 162 of the second drive section 165) may limit rotational movement of a second portion of the transmission 112 (e.g., the second member 162) to permit operation of the second drive section 165 to extend the covering 102 across the architectural structure/feature and/or open the covering 102 (e.g., opening the vanes 122 of the covering 102).

Figure 6:
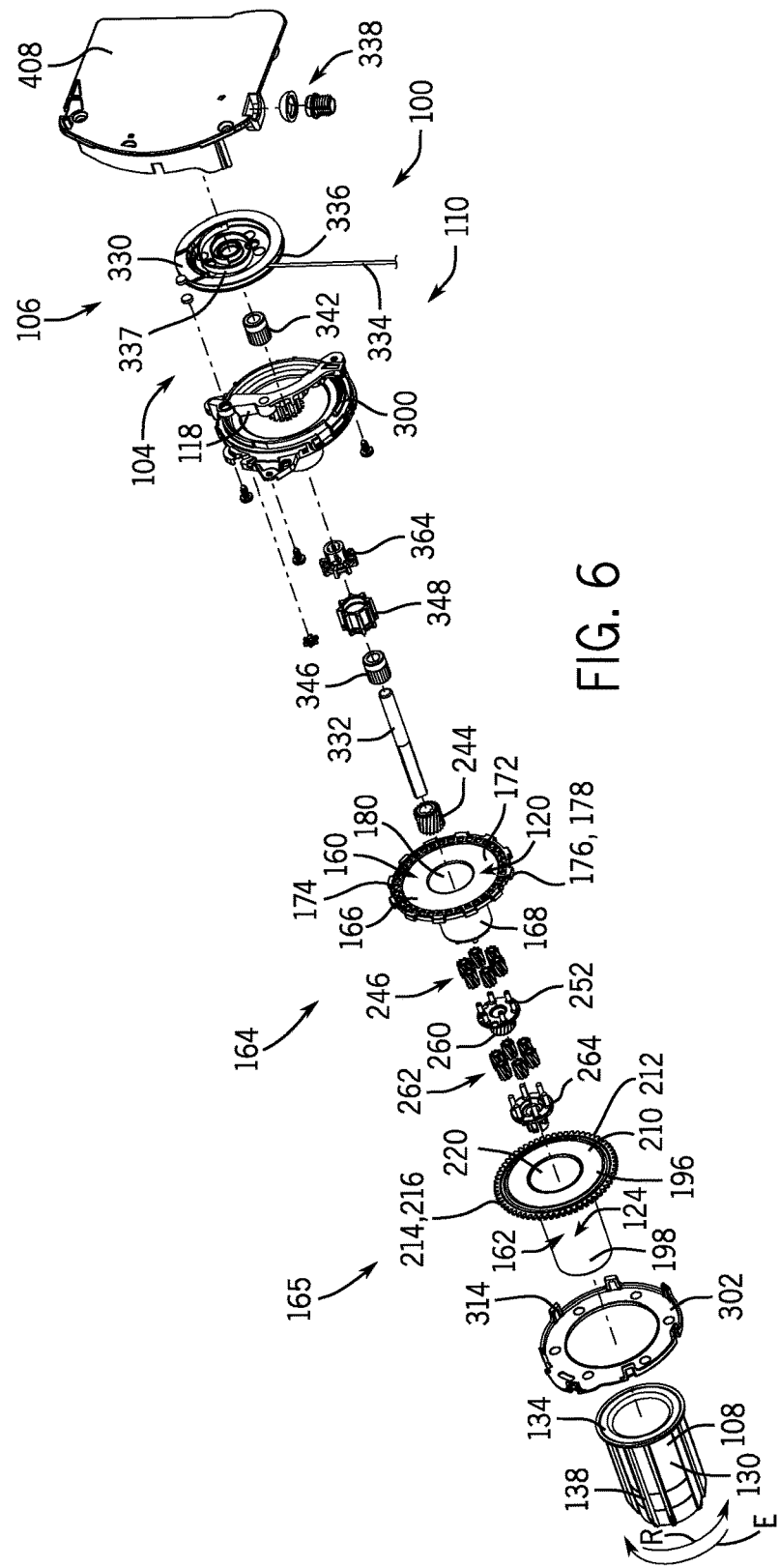
FIG. 6 is a rear right exploded view of the operating system of FIG. 1 in accordance with an embodiment of the present disclosure.
Figure 17:
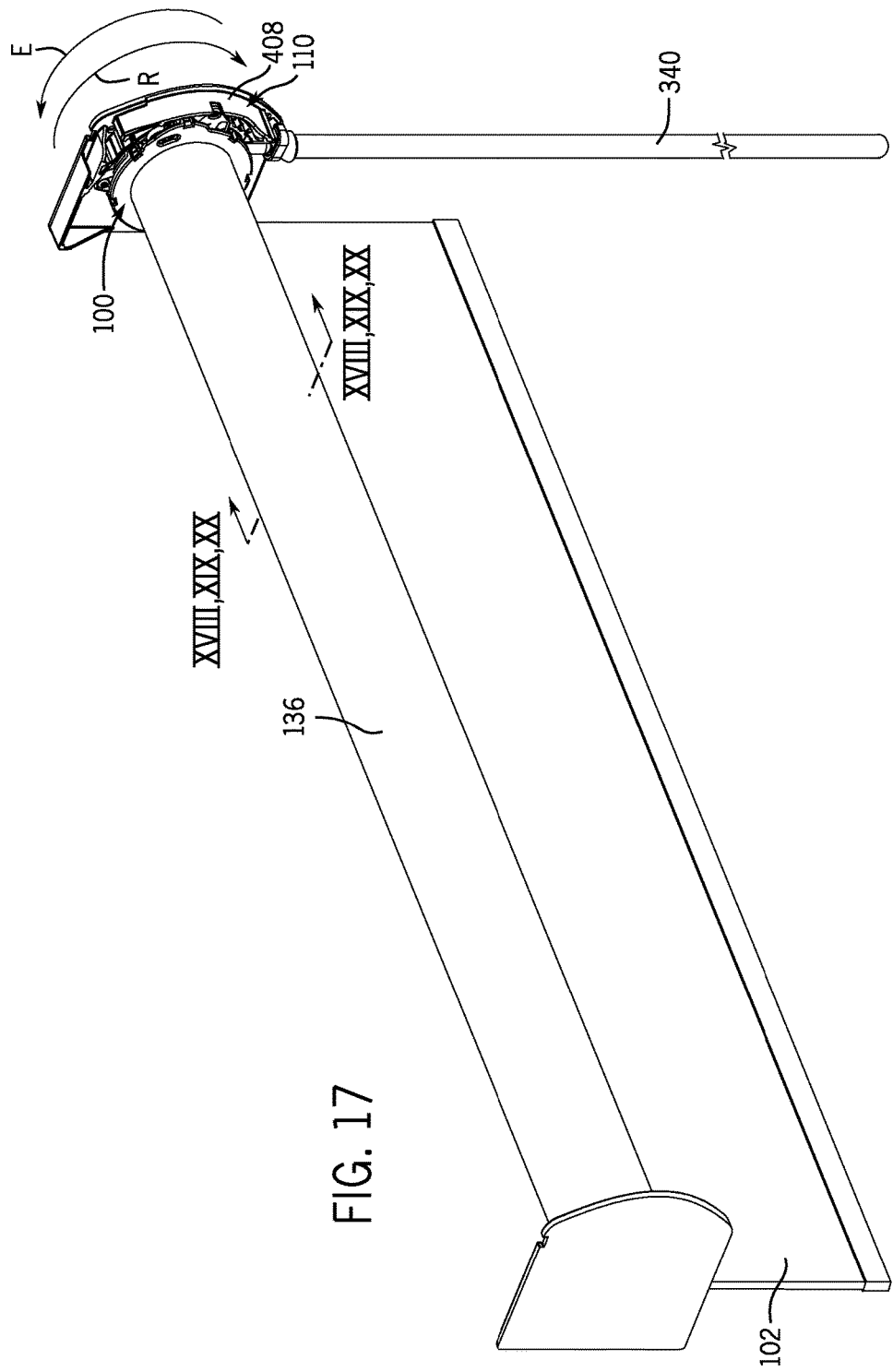
FIG. 17 is a perspective view of the operating system of FIG. 1 associated with a shade element in accordance with an embodiment of the present disclosure.

In one embodiment, illustrated in FIGS. 2, 6, and 17, the drive member 108 may be configured to transmit movement and/or torque from the transmission 112 to the covering 102. For example, the drive member 108 may be arranged to engage a shade element, such as via a shade or covering winding member, such as a roller tube 136 (see FIG. 17) or other functionally similar element. In such embodiments, the transmission 112 may be arranged to rotate the drive member 108 to control operation of the covering 102. For instance, the transmission 112 may rotate the drive member 108 to extend the covering 102 at least partially across an architectural structure/feature, retract the covering 102 at least across the architectural structure/feature, and/or open and/or close the covering 102 as desired. For example, as explained in detail below, rotation of the drive member 108 may cause the covering 102 to move to a first position in which the covering 102 is fully extended and closed (see FIG. 19). Once the covering 102 is in the first position, rotation of the drive member 108, such as in the first direction E, may cause the covering 102 to move to a second position in which the covering 102 is extended and open (see FIG. 20). For instance, rotation of the drive member 108 in the first direction E once the covering 102 is extended may open the vanes 122 of the covering 102, such as by creating a gap 146 between two adjacent vanes 122 by moving the vanes 122 relative to each other, such as by moving a vane material 142 relative to a support sheet 140. If desired, the drive member 108 may be rotated in an opposite direction, such as in the second direction R, to decrease the gap(s) 146 to close the vanes 122 to reduce or eliminate viewing between the vanes 122 (sometimes referred to as view-through) and position the covering 102 in the first position. Once the covering 102 is closed, the drive member 108 may be rotated in the second direction R via the transmission 112 to position the covering 102 in a third position in which the covering 102 is at least partially retracted (see FIG. 18), as explained more fully below.

Figure 18:
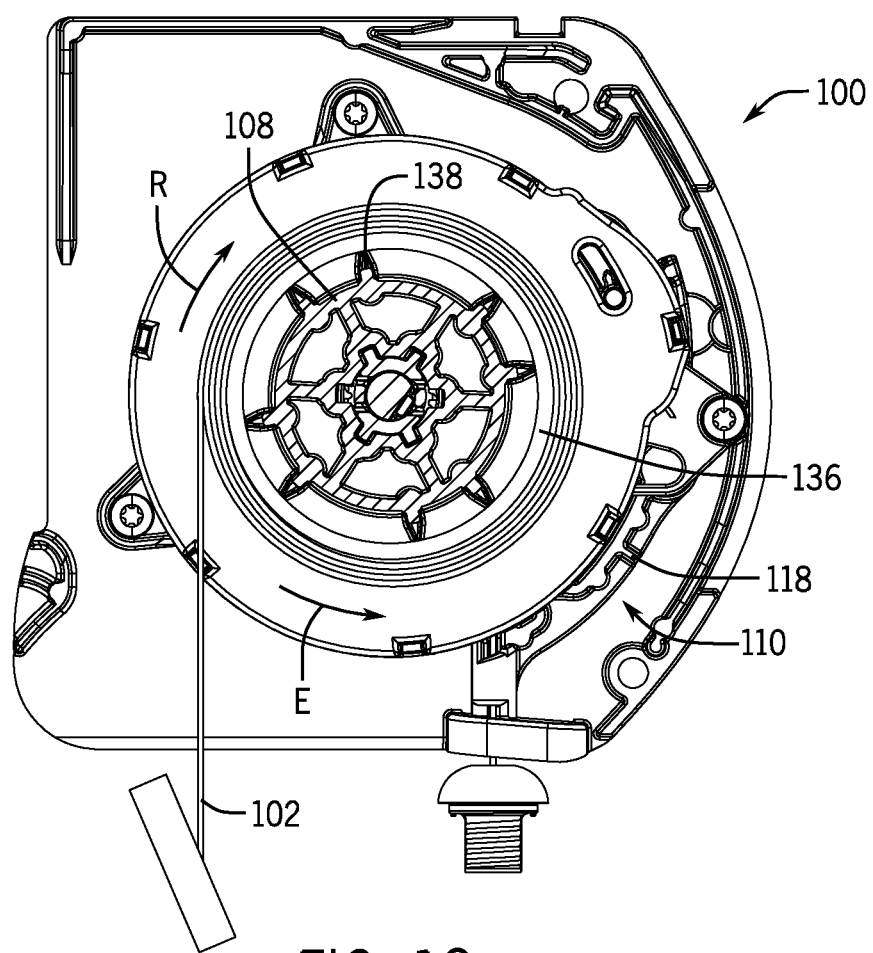
FIG. 18 is a cross-sectional view of FIG. 17 taken along line XVIII-XVIII and showing the shade element in a retracted configuration in accordance with an embodiment of the present disclosure.
Figure 20:
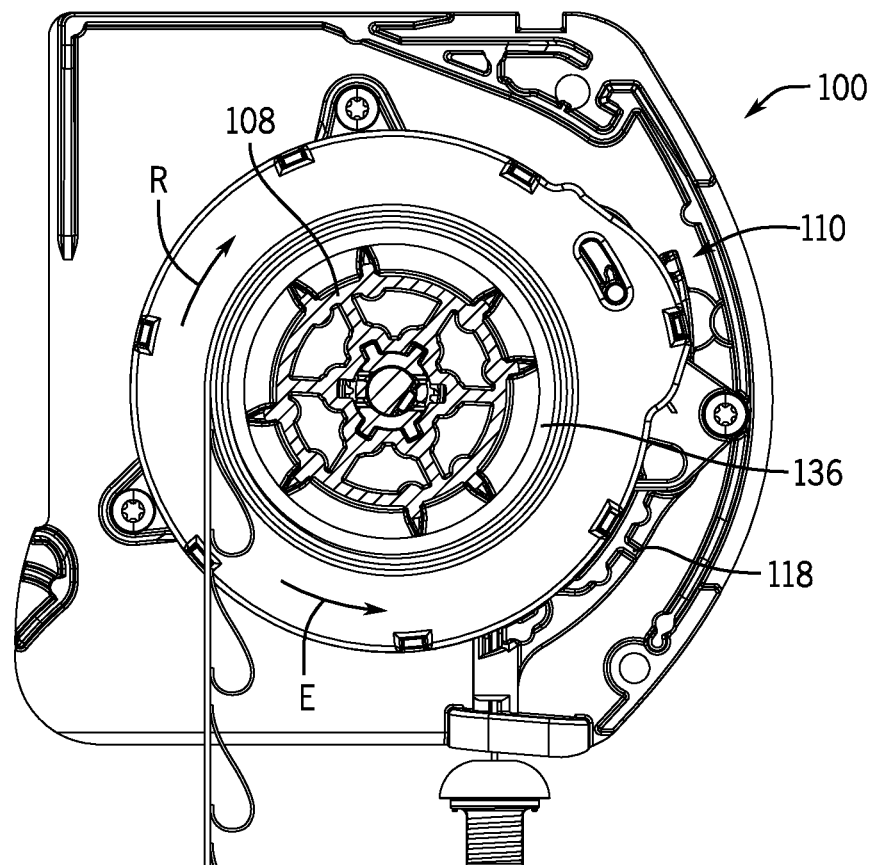
FIG. 20 is a cross-sectional view of FIG. 17 taken along line XX-XX and showing the shade element in an extended, open configuration in accordance with an embodiment of the present disclosure.

In one embodiment, illustrated in FIGS. 18-20, the drive member 108 may be sized and shaped to engage a portion of a roller tube 136, such as through an interference or friction fit. The drive member 108 may be formed as a hollow cylindrical member defined by a cylindrical tube 130 extending a length L from an end wall 132 and terminating at a flared flange 134 (see FIG. 2). To drivingly rotate the roller tube 136, for instance, the drive member 130 may include a plurality of longitudinal ribs 138 extending radially away from, and along the length L of, the cylindrical tube 130 to frictionally engage or interlock with an inner surface of the roller tube 136 (see FIG. 18, for instance). In this manner, rotation of the drive member 108 via the transmission 112 may rotate the roller tube 136 in a corresponding manner. In such embodiments, the covering 102 may be coupled with the roller tube 136 such that the covering 102 wraps about, or unwraps from, the roller tube 136 upon rotation of the roller tube 136 in the second and first directions R, E, respectively, via the drive member 108 (see FIGS. 17-20). Though described in association with a roller shade, the operating system 100 may be associated with other covering types, including stacking and vertical shades or coverings. In such embodiments, the operating system 100 may be operable to extend, retract, open, and/or close the various coverings in a manner similar to that described below, which is presented for illustrative purposes without intent to limit.

To permit the various operation modes of the operating system 100, the transmission 112 may include one or more drive sections, such as first and second drive sections 164, 165, operably coupled together (see FIGS. 2, 6, and 7) yet individually controlled by the directional control mechanism 110. For example, as described more fully below, the first and second drive sections 164, 165 may include parts which are selectively engaged by the directional control mechanism 110 to alter rotation of the drive member 108. As explained below, actuation of the input assembly 106 actuates the first and second drive sections 164, 165 to allow the drive member 108 to rotate to either retract, extend, close, or open the covering 102 depending on the position of the shifter 118. For example, in one embodiment, as previously mentioned and as explained in greater detail below, the directional control mechanism 110 may include a shifter 118 to selectively engage a first component 120 of the transmission 112 (see FIG. 6) to achieve a first function of the operating system 100, or a second component 124 of the transmission 112 (see FIG. 6) to achieve a second function of the operating system 100. Alternatively, in another embodiment, as explained more fully below, the shifter 118 may engage with a portion of the first drive section 164. Engagement of the shifter 118 with a portion of the first drive section 164 (e.g., with a first member 160 of the first drive section 164) may limit rotational movement of a portion of the first drive section 164 (e.g., the first member 160) to permit operation of the second drive section 165 to close the covering 102 and/or to retract the covering 102 across an architectural structure/feature. Similarly, engagement of the shifter 118 with a second portion of the transmission 112 (e.g., with a second member 162 of the second drive section 165) may limit rotational movement of a second portion of the transmission 112 (e.g., the second member 162) to permit operation of the second drive section 165 to extend the covering 102 across the architectural structure/feature and/or open the covering 102 (e.g., opening the vanes 122 of the covering 102). In some embodiments, the transmission 112 may be a planetary gear system, each of the first and second drive sections 164, 165 constituting a planetary gear set, though any other configuration is contemplated permitting operation of the operating system 100 described herein. In one embodiment, the transmission 112 (e.g., the first and second drive sections 164, 165) may be concentrically mounted within the drive member 108 along a rotational axis A, which may correspond to the axis of rotation of the roller tube 136 (see FIGS. 2 and 7).

Each of the first and second drive sections 164, 165 may include one or more elements arranged for compact movement within the operating system 100 and/or for selective engagement with the directional control mechanism 110. For example, in one embodiment, each of the first and second drive sections 164, 165 includes an input element and an output element, the output element operably controlled by the input element, such as via one or more elements positioned operably between the input and output elements. In such embodiments, the directional control mechanism 110 may selectively lock one or more elements of the first and/or second drive sections 164, 165 against rotation to control the output direction of the first and/or second drive sections 164, 165. For instance, in one embodiment, the first member 160 includes an exterior periphery 174 defining an engagement profile 176, the directional control mechanism 110 (e.g., the shifter 118) operable to selectively engage the engagement profile 176 to selectively control rotation of the first member 160 and therefore movement of the first drive section 164, as detailed herein. Similarly, the second member 162 may include an exterior periphery 212 defining an engagement profile 214, the directional control mechanism 110 (e.g., the shifter 118) operable to selectively engage the engagement profile 214 to selectively control rotation of the second member 162 and therefore movement of the second drive section 165, as detailed below.

In one embodiment, the first drive section 164 of transmission 112 has a first member 160 which includes a first base 166 and a hollow, cylindrical first tube 168 extending from the first base 166 a first length $L_1$ (see FIGS. 2 and 6). The first base 166 includes opposing first and second surfaces 170, 172 slidable against other elements of the operating system 100 (e.g., slidable against the second member 162 and slidable against a portion of the housing 104, respectively). In some embodiments, the first base 166 defines the engagement profile 176 with which the directional control mechanism 110 (e.g., the shifter 118) is selectively engaged to control rotation of the first member 160. The engagement profile 176 may be a toothed or step profile defined by a plurality of projections 178 extending radially away from the first base 166, though other shapes and configurations are contemplated to achieve the purposes explained below. The projections 178 may be sized and shaped to extend coextensively with the first and/or second surfaces 170, 172 of the first base 166. The first tube 168 may include interior and exterior surfaces 180, 190 (see FIGS. 2 and 6, respectively) slidable against other elements of the operating system 100 (e.g., slidable against a portion of the housing 104 and slidable against an interior portion of the second member 162, respectively, as explained below) during operation, as explained below. In one embodiment, a plurality of posts 192 may extend from a terminal end 194 of the first tube 168, for instance, to associate the first member 160 with other elements of the first drive section 164, as more fully explained below.

The second member 162 may be arranged and shaped similar to the first member 160 for similar purposes. Namely, the second member 162 may include a second base 196 and a hollow, cylindrical second tube 198 extending from the second base 196 a second length $L_2$, the second base 196 and second tube 198 slidable against the first base 166 and the first tube 168, respectively, of the first member 160. The second base 196 may also include a first surface 200 and an opposing second surface 210, the exterior periphery 212 defined therebetween to allow smooth rotation of the second member 162 with respect to other elements of the operating system 100 (e.g., with respect to a portion of the housing 104 and with respect to the first member 160, respectively. In some embodiments, the second base 196 defines the engagement profile 214 with which the directional control mechanism 110 (e.g., the shifter 118) is selectively engaged to control rotation of the second member 162. The engagement profile 214 of the second member 162 may be defined by a plurality of gear teeth 216 extending radially away from the second base 196, such as extending coextensively with the first and/or second surfaces 200, 210 of the second base 196.

Though the operating system 100 may take on substantially any suitable configuration, the different components of the transmission 112 may be nested together in embodiments wherein compactness is a desired characteristic. For example, the first member 160 and/or the second member 162 may be configured such that at least a portion of the first member 160 (e.g., the first tube 168) may be rotatably received at least partially within the second tube 198 of the second member 162 (see FIG. 7). In such embodiments, the second tube 198 may define a two-part interior surface 220. For instance, with reference to FIG. 8, the interior surface 220 of the second tube 198 may include a gear surface 222 and a smooth surface 224 to engage the transmission 112 and the first member 160, respectively. The smooth surface 224 may slide against the exterior surface 190 of the first tube 168 and may be sized to accommodate the first tube 168. The length L of the drive member 108 may be greater than the second length $L_2$ of the second tube 198 to conceal and to protect the transmission 112.

In some embodiments, the transmission 112 may be arranged to provide variable control of the drive member 108 and therefore the covering 102 to match the operational needs (e.g., torque, speed, etc.) of the operating system 100 to achieve a desired function (e.g., closing, retracting, and/or opening the covering 102, among others). For example, the transmission 112 may provide various mechanical advantages or control, such as two or more drive ratios, depending on whether the covering 102 is being retracted or opened. In such embodiments, the various mechanical advantages may provide a desired operational speed or efficiency of the operating system 100, such as increased control for fine adjustments of the covering 102 (e.g., in opening the covering 102) and/or increased speed for mass adjustments of the covering 102 (e.g., in retracting the covering 102). For instance, the transmission 112 may be arranged to provide a relatively high mechanical advantage (e.g., a first drive or gear ratio) rotating the drive member 108 in the first direction E to extend and/or open the covering 102, and a relatively low mechanical advantage (e.g., a second drive or gear ratio) rotating the drive member 108 in the second direction R to retract and/or close the covering 102. The drive ratios may be defined by the ratio of the number of rotations of an input mechanism (e.g., the input assembly 106) to the number of rotations of the output (e.g., the drive member 108) during the same time period. The first drive ratio may be higher than the second drive ratio to at least provide the necessary torque and/or a desired speed to respectively open and retract the covering 102. In some embodiments, the first drive ratio may be between about 5:1 and about 10:1, and may be preferably about 8:1 to allow for fine adjustment of the covering 102 in situations wherein operating speed is not as much of a concern (e.g., fine adjustment in opening the covering 102) and/or wherein relative ease (e.g., a low amount of force) is desired to operate the covering 102. In such embodiments, the second drive ratio may be between about 1:1 and about 5:1, and may be preferably about 3:1 to limit the input force necessary to retract the covering 102 yet not retract the covering 102 too slowly to be a nuisance. The transmission 112 may be configured to balance the needs of the operating system 100 based on a particular shade configuration (e.g., heavy vs. lightweight shade, speed vs. light lifting force, etc.). For example, the transmission 112 may be configured to provide drive ratios tailored to customer needs and desires and/or for varying configurations of the covering 102. For example, coverings of increased weight and/or rolling resistance may require drive ratios with increased mechanical advantage, or vice-versa.

In non-exclusive embodiments, wherein the first drive section 164 includes a planetary gear set, the first drive section 164 may include a first sun gear 244, and a first set of planetary gears 246 meshingly engaged with the first sun gear 244 and carried by a first carrier 248 positioning the first set of planetary gears 246 about the first sun gear 244. For example, the first carrier 248, which may be defined by, such as formed as part of, the first member 160, may include a plurality of posts, such as posts 192, spaced circumferentially about the first sun gear 244. In such embodiments, the first set of planetary gears 246 may each rotate on a post 192 as the first sun gear 244 rotates relative to the first carrier 248. As described below, in some embodiments, the first set of planetary gears 246 may also be rotatably mounted on posts 250 extending from a transfer member 252 operably connecting the first drive section 164 to the second drive section 165. By rotatably mounting the first set of planetary gears 246 on the posts 192 of the first carrier 248 and the posts 250 of the transfer member 252, the transfer member 252 and the first carrier 248 (first member 160) may rotate (or be held stationary) together to transfer motion between the first and second drive sections 164, 165, as described below. As explained more fully below, the first sun gear 244 may be rotationally driven by an input mechanism, such as the input assembly 106. In such embodiments, actuation of the input mechanism, such as rotation of the input assembly 106 in one embodiment, may rotate the first sun gear 244, which in turn causes corresponding rotation of the first set of planetary gears 246 about their individual axes. Depending on the position of the directional control mechanism 110, the first carrier 248, and therefore the first set of planetary gears 246, may or may not orbit or revolve about the first sun gear 244. For example, selective engagement of the shifter 118 with the first member 160 (e.g., with the engagement profile 176 of the first member 160) limits rotation of the first member 160, which carries the first set of planetary gears 246, thereby causing the first set of planetary gears 246 to be limited to rotate only about their individual axes (and not to revolve about the first sun gear 244) upon rotation of the first sun gear 244.

Similarly, the second drive section 165 may include a second sun gear 260, and a second set of planetary gears 262 meshingly engaged with the second sun gear 260 and carried by a second carrier 264 positioning the second set of planetary gears 262 about the second sun gear 260. The second carrier 264 may include a plurality of posts 266 spaced circumferentially about the second sun gear 260, and each of the second set of planetary gears 262 may rotate on a post 266 as the second sun gear 260 rotates relative to the second carrier 264. As explained more fully below, the second sun gear 260 may be rotationally driven by an input mechanism, such as by an output of the first drive section 164, such as by the transfer member 252. To allow forces to be transmitted between the first and second drive sections 164, 165, the second sun gear 260 and the transfer member 252 rotate together, such as being molded or formed as a single element. In such embodiments, rotation of the input mechanism rotates the second sun gear 260, which in turn causes corresponding rotation of the second set of planetary gears 262 about their individual axes. Depending on the selective engagement of the shifter 118 with either the first or second member 160 or 162, the second set of planetary gears 262 may walk (alternately, "orbit" or "revolve", any of these terms usable interchangeably without limitation) about the second sun gear 260 in either the first or second direction E or R upon rotation of the second set of planetary gears 262 about their individual axes, thereby causing corresponding rotation of the second carrier 264 about the second sun gear 260. For example, selective engagement of the shifter 118 with the first member 160 may cause the second set of planetary gears 262 to walk about the second sun gear 260 in the second direction R as the second sun gear 260 is held stationary via the transfer member 252 operably coupled to the first member 160 (and the ring gear 268 rotates). Similarly, selective engagement of the shifter 118 with the second member 162 (and thus the ring gear 268 formed therein) may cause the second set of planetary gears 262 to walk about the second sun gear 260 in the first direction E, as explained in further detail below.

To allow the selective operation and the variable control of the operating system 100, the first and second drive sections 164, 165 are coupled such that rotation of one affects rotation of the other, such as by sharing an element therebetween, or by coupling of one or more elements therebetween to rotate together (e.g., an element conveying movement between the first and second drive sections 164, 165). In such embodiments, the directional control mechanism 110 (e.g., the shifter 118) may be arranged to selectively lock the shared element of the first and second drive sections 164, 165 or an element which transmits rotation between the first and second drive sections 164, 165, to control operation of the transmission 112. For example, the first and second drive sections 164, 165 may share a ring gear 268, the ring gear 268 meshingly engaged with both the first and second sets of planetary gears 246, 262. In at least one embodiment, rotation of either the first set of planetary gears 246 or the second set of planetary gears 262 may cause rotation of the ring gear 268 and therefore rotation of the other planetary gear set, such as if one of the planetary gear sets cannot revolve around its respective sun gear. In one embodiment, the ring gear 268 may be formed as part of the second member 162, such as within or part of the second tube 198 of the second member 162 (e.g., as part of the gear surface 222). In such embodiments, the first and second sets of planetary gears 246, 262 are positioned at least partially within the second tube 198 of the second member 162 between the ring gear 268 and their respective sun gears 244, 260. As explained below, selective engagement of the shifter 118 with the second member 162 may control the manner of operation of the operating system 100. For example, selective engagement of the shifter 118 with the second member 162 locks the ring gear 268 from rotating in at least one direction (e.g., from rotating in at least the second direction R), which in turn causes the first and second sets of planetary gears 246, 262 to walk or revolve around their respective sun gears 244, 260 as the first and second sets of planetary gears 246, 262 rotate about their individual axes.

Figure 11:
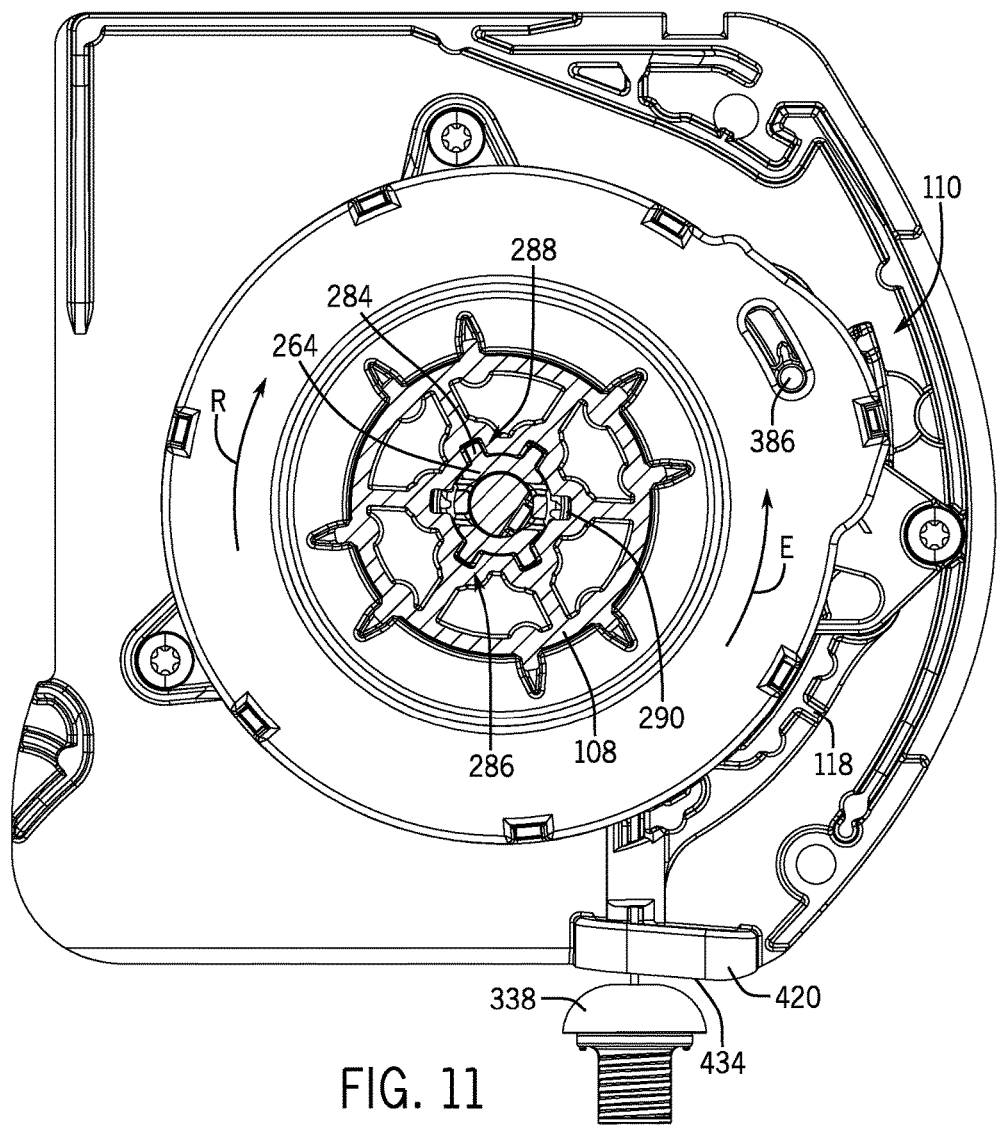
FIG. 11 is a cross-sectional view of the operating system of FIG. 1 taken along line XI-XI of FIG. 7 and showing engagement of a gear set with a drive member in accordance with an embodiment of the present disclosure.

To at least control movement of the covering 102, the second carrier 264, which may be referred to as an output or an output carrier, may be configured to operatively engage the drive member 108. For example, the second carrier 264 and the drive member 108 may include corresponding structure such that movement of one correspondingly moves the other. In one embodiment, illustrated in FIG. 3, the second carrier 264 may include an engagement mechanism, such as a protrusion 280 extending from a wall 282 positioned between the protrusion 280 and the posts 266. The protrusion 280 may include a plurality of radially extending tabs 284 spaced circumferentially about the protrusion 280. In such embodiments, the drive member 108 may include an aperture 286 defined in its end wall 132 and about which is defined a plurality of slots 288 corresponding (e.g., in size, shape, and/or position) with the tabs 284 on the second carrier 264 (see FIG. 11). In an assembled state, the protrusion 280 of the second carrier 264 may be received at least partially within the aperture 286 of the drive member 108, with the tabs 284 of the second carrier 264 being received in the slots 288 of the drive member 108 (see FIG. 11) such that rotation of one of the second carrier 264 and the drive member 108 is imparted to the other. As such, rotation of the transmission 112 may drivingly rotate the drive member 108 (or vice-versa). To retain engagement of the drive member 108 with the second carrier 264, the drive member 108 and the second carrier 264 may include corresponding retention features, which may be releasable in some embodiments to permit disassembly of the operating system 100, if desired. For example, the protrusion 280 of the second carrier 264 may include a plurality of resilient catches 290 each defined at least partially by a terminal hook portion 292, the terminal hook portions 292 defining a diameter greater than the diameter of the aperture 286. In such embodiments, the protrusion 280 is inserted within the aperture 286 (with the tabs 284 and the slots 288 in axial alignment) until the hook portions 292 clear the end wall 132 of the drive member 108, at which point the catches 290 expand to secure at least a portion of the end wall 132 between the hook portions 292 and the wall 282 of the second carrier 264 (see FIG. 7).

To hold the transmission 112 together, the transmission 112 may be rotatably received at least partially within the housing 104. For example, referring to FIG. 7, the housing 104 may include first and second halves 300, 302 that engage each other to enclose portions of the first and second members 160, 162. As shown, the first half 300 may include a boss 304 and an annular recess 306 defined at least partially by a bottom wall 308 extending about the boss 304. The annular recess 306 may receive at least the first and second bases 166, 196 of the first and second members 160, 162, respectively. The recess 306 may include a depth that corresponds substantially to the combined thicknesses of the first and second bases 166, 196 (see FIG. 7). In such embodiments, the second surface 172 of the first member 160 may rotatably abut or slide against the bottom wall 308 of the first half 300 to limit axial movement of the first member 160 relative the housing 104, for instance. To rotatably support the assembled transmission 112, the boss 304 may extend away from the bottom wall 308 a third length $L_3$, the third length $L_3$ corresponding generally with the first length $L_1$ of the first tube 168 of the first member 160. In such embodiments, the first member 160 may rotate about the boss 304. As shown, the boss 304 may be aligned concentrically with the transmission 112 along the rotational axis A.

Figure 7:
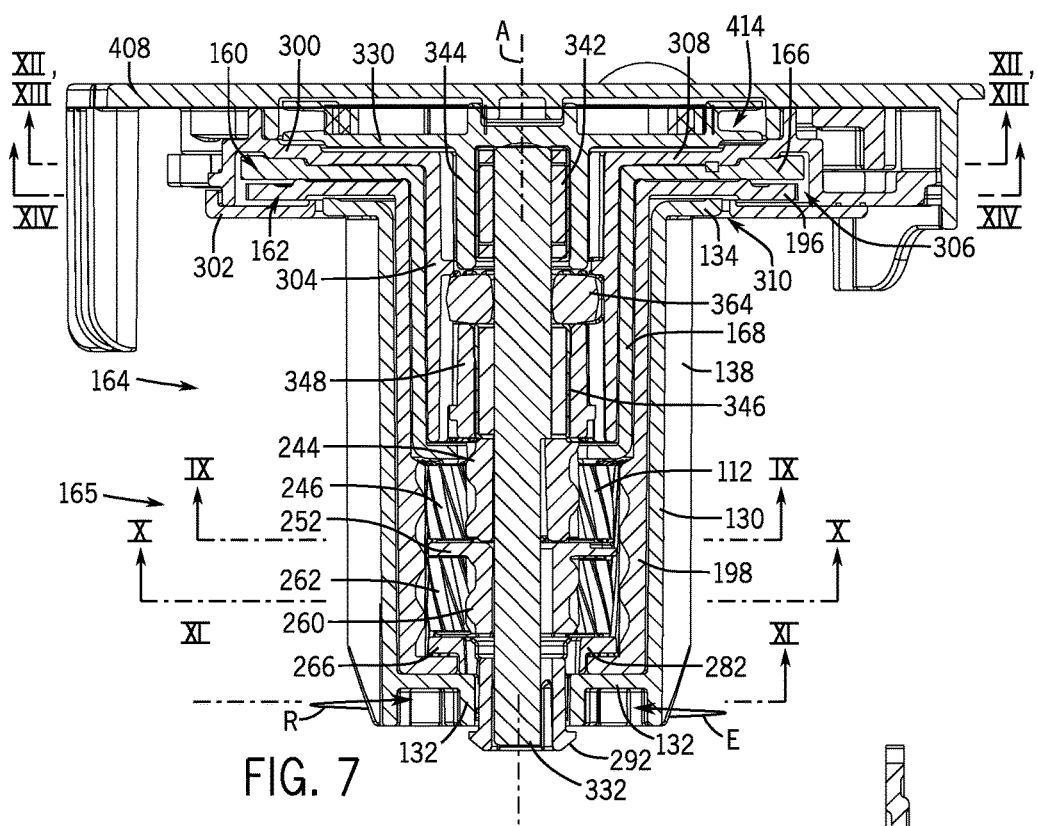
FIG. 7 is a cross-sectional view of the operating system of FIG. 1 taken along line VII-VII of FIG. 1 in accordance with an embodiment of the present disclosure.
Figure 8:
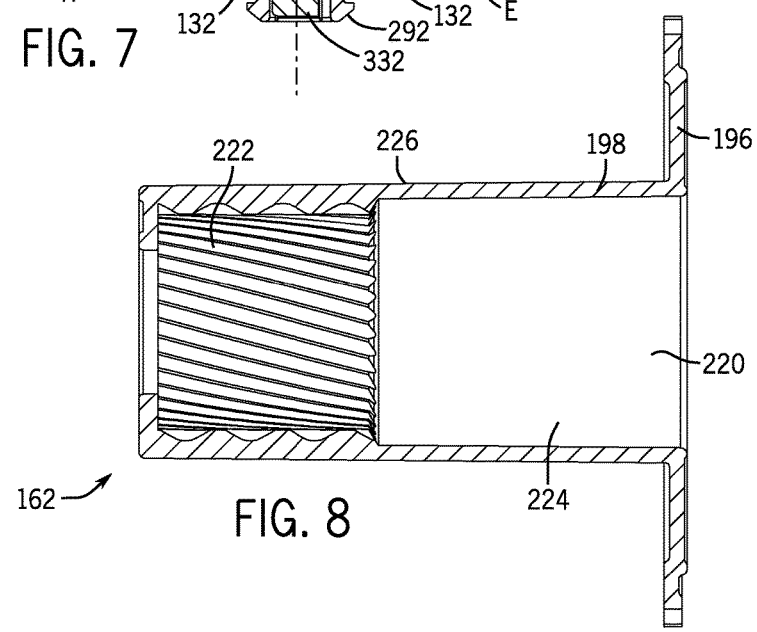
FIG. 8 is a cross-sectional view of a portion of a gear set of the operating system of FIG. 1 taken along line VIII-VIII of FIG. 2 in accordance with an embodiment of the present disclosure.

The second half 302 of the housing 104 may include a center opening 310 through which the tubes 168, 198 of the first and second members 160, 162, respectively, may be received (see FIGS. 2 and 7). In some embodiments, the center opening 310 may be sized to also receive the flange 134 of the drive member 108. Once assembled, the first surface 200 of the second member 162 may rotatably abut or slide against an inner surface 312 of the second half 302. In this manner, the first and second bases 166, 196 of the first and second members 160, 162, respectively, may be enclosed between the first and second halves 300, 302 of the housing 104 to couple the transmission 112 to or at least partially within the housing 104 (see FIG. 7). To couple the first and second halves 300, 302 together, the first and second halves 300, 302 may include corresponding retention features. For instance, the first half 300 may include a plurality of tabs 314 peripherally spaced about the first half 300 (see FIG. 6). The second half 302 may include a plurality of corresponding catches 316 that engage the tabs 314 of the first half 300 to snap fit and secure the two halves 300, 302 together (see FIG. 1), though other suitable fastening mechanism may be utilized, such as fasteners, heat or sonic welding, adhesive, or the like.

As noted above, movement of the transmission 112 may be controlled by the input assembly 106. For example, the input assembly 106 may be adapted to drivingly rotate a portion of the transmission 112 (e.g., the first drive section 164) upon actuation by a user. As explained below, the input assembly 106 may provide an input force to the transmission 112 to rotate the transmission 112 and thereby the drive member 108. In one example, the input assembly 106 may include a spring motor 330 and an input shaft 332 coupled thereto (see FIG. 2). In some embodiments, the spring motor 330 may be actuated by an actuation element, such as by a drive cord 334 (see, e.g., FIG. 13). In such embodiments, the input shaft 332 may be coupled to the spring motor 330 such that rotation of the spring motor 330 as caused by actuation of the drive cord 334 causes the input shaft 332 to rotate. For example, the drive cord 334 may engage the spring motor 330 at a point spaced away from a rotational axis of the spring motor 330, thus creating a moment biasing the spring motor 330 to rotate (e.g., in the first direction E) upon actuation of the drive cord 334. Rotation of the spring motor 330 may cause the input shaft 332 to rotate, rotation of the input shaft 332 rotatably driving the transmission 112, as detailed below. In some embodiments, the drive cord 334 may be wrapped about an outer portion of the spring motor 330, such as within an annular groove 336, such that the moment provided by movement of the drive cord 334 is relatively constant during operation.

To allow the input assembly 106 to be repeatedly operated, the spring motor 330 may be biased to rotate in the second direction R, such as via a clock spring 337 or similar device, so as to wrap the drive cord 334 about the spring motor 330 (see FIG. 6). In this manner, a user may repeatedly operate the input assembly 106 using a series of relatively short strokes of the drive cord 334 away from the operating system 100. For example, during a power stroke, a user may move the drive cord 334 away from the spring motor 330 (e.g., downward) a first distance to rotate the spring motor 330 in the first direction E, at which point the user may release or decrease the amount of force applied to the drive cord 334. Once sufficient force is released, the spring motor 330 may be biased to rotate in the second direction R to retract and wrap the drive cord 334 about the outer portion of the spring motor 330 (e.g., a reset stroke). Once reset, the drive cord 334 may be actuated again (i.e., the power stroke) to continue to rotate the spring motor 330, which in turn causes the transmission 112 to rotate the drive member 108. The process of alternating between the power and reset strokes may be repeated until the drive member 108 is rotated via the transmission 112 (e.g., via the second carrier 264) a sufficient amount as desired. Because the drive cord 334 may be biased to wrap about the spring motor 330, only a small portion of the drive cord 334 (e.g., only a handle portion) may be visible when the drive cord 334 is retracted, thus increasing the aesthetic appeal of the operating system 100 and/or an associated covering. To prevent the drive cord 334 from overwrapping, the drive cord 334 may include a stop mechanism 338 operable to engage a portion of the operating system 100 and/or the covering 102, as explained below. In some embodiments, the stop mechanism 338 may be threaded or include other engagement mechanisms to couple a touchpoint or operating element, such as a wand or handle 340 (hereinafter "handle" for the sake of convenience without intent to limit), thereto (see FIG. 1).

With reference to FIGS. 2, 6, and 7, the input shaft 332 may be operatively coupled to the spring motor 330 such that rotation of the spring motor 330 rotates the input shaft 332 to rotate the transmission 112. In some embodiments, the input shaft 332 may be arranged such that rotation of the spring motor 330 rotates the input shaft 332 in only one direction. For example, the input shaft 332 may be rotatably supported by a two or more one-way or anti-reverse bearings (e.g., two bearings). As detailed below, each of the bearings may permit the input shaft 332 to rotate therein in one direction but may limit relative rotation of the input shaft 332 in an opposite direction, such as via internal rollers engageable with biased ramps or wedges, for instance. As described herein, the bearings in combination may limit rotation of the input shaft 332 in different directions. For example, at least one of the one-way bearings (e.g., a first bearing 342) may be arranged to transmit a rotational force from the spring motor 330 to the input shaft 332 in one direction, such as being configured to transmit rotation of the spring motor 330 in the first direction E to the input shaft 332, as explained below. In such embodiments, at least another of the one-way bearings (e.g., a second bearing 346) may be arranged to complement the first bearing 342 to rotationally support the input shaft 332 and limit rotation of the input shaft 332 to only one direction transmitted by the first bearing 342 during the cyclical movement of the spring motor 330 described above. In particular, the first bearing 342 may be coupled to the spring motor 330 and the input shaft 332 (e.g., radially between a portion of the spring motor 330 and the input shaft 332) such that rotation of the spring motor 330 in the first direction E causes the input shaft 332 to rotate correspondingly in the first direction E during the power stroke of the input assembly 106 (e.g., the first bearing 342 and the input shaft 332 rotate in unison during the power stroke). During the same power stroke, the input shaft 332 may rotate within the second bearing 346 in the first direction E. During the reset stroke of the input assembly 106, the spring motor 330 may rotate in the second direction R causing the first bearing 342 to rotate in the second direction R about the input shaft 332, the input shaft 332, however, being limited from rotating in second direction R by the second bearing 346. In this manner, the input shaft 332 may rotate only in the first direction E during operation of the input assembly 106 upon input from a user, which may be advantageous to facilitate the reciprocating motion of the drive cord 334 and/or limit the operating system 100 from back-driving the spring motor 330, for instance. For example, without use of the first and second bearings 342, 346, the input shaft 332 may be rotated in the second direction R (such as under the weight of the covering 102), which may damage the spring motor 330.

In one embodiment, as illustrated in FIG. 7, the first bearing 342 may be received, such as by press fitting, within a protruding portion 344 of the spring motor 330. To rotationally couple the input shaft 332 to the spring motor 330, the first bearing 342 may be seated within the spring motor 330 in a manner to prevent rotation of the first bearing 342 relative to the spring motor 330. For example, the spring motor 330 and/or the first bearing 342 may be sized and shaped to create an interference fit between the two elements to effectively lock the first bearing 342 to the spring motor 330. In the embodiments of FIG. 7, the second bearing 346 may be rotationally fixed within the boss 304 of the housing 104, such as being positioned, such as by press fitting, within a bearing block 348. In one embodiment, the bearing block 348 may be rotationally fixed within the boss 304 of the housing 104. As shown, the bearing block 348 may include a hollow body 350 with a plurality of fins 360 extending radially therefrom. The second bearing 346 may be seated within the body 350 of the bearing block 348 in a manner to prevent rotation of the second bearing 346 relative to the body 350, such as via interference fit or the like. To secure the bearing block 348 within the boss 304, a plurality of corresponding grooves 362 may be defined within the interior wall of the boss 304, and the grooves 362 of the boss 304 may receive the fins 360 of the bearing block 348. To properly position the bearing block 348 within the boss 304, a spacer 364 may be received within the boss 304 and positioned between the spring motor 330 and the bearing block 348. Like the bearing block 348, the spacer 364 may be sized and shaped to be rotationally fixed within the boss 304, such as by a radial fin structure similar to the bearing block 348 engaging the grooves 362 of the boss 304. Once positioned within the boss 304, the bearing block 348 may sit substantially flush with an axial end of the boss 304 (see FIG. 7). Once seated, the first and second bearings 342, 346 may concentrically align the input shaft 332 with the boss 304 and the transmission 112, such as along the rotational axis A.

As described herein, the input shaft 332 may be keyed to rotate the transmission 112, such as at least one of the first and second drive sections 164, 165 (e.g., the first drive section 164) upon actuation of the spring motor 330. For example, the input shaft 332 may include a non-circular cross-section (see FIG. 9), such as semi-circular, square, or the like. In such embodiments, the first sun gear 244, which may be referred to as an input or input gear, may include an aperture 366 defined therethrough and configured to allow the input shaft 332 to rotate the first sun gear 244, such as having a corresponding non-circular cross-section (see FIG. 4). Rotation of the input shaft 332 may drivingly rotate the first sun gear 244, which in turn may cause at least some of the remaining elements of the first and second drive sections 164, 165 to rotate correspondingly, such as effecting rotation of each of the drive member 108, the first and second members 160, 162, the first and second carriers 248, 264, the ring gear 268, the second sun gear 260, the first and second sets of the planetary gears 246, 262 (either about their individual axes, about their respective sun gears, or both), or any combination thereof. For instance, the input shaft 332 may rotate freely within an opening or aperture defined in the first and second members 160, 162, the first and second carriers 248, 264, and the drive member 108. Though shown and described as including a spring motor 330, the input assembly 106 may include any type of assembly or system operable to rotate the input shaft 332 in the first direction E, including an electric motor, a continuous cord loop, or a twisting wand mechanism, among others.

Figure 12:
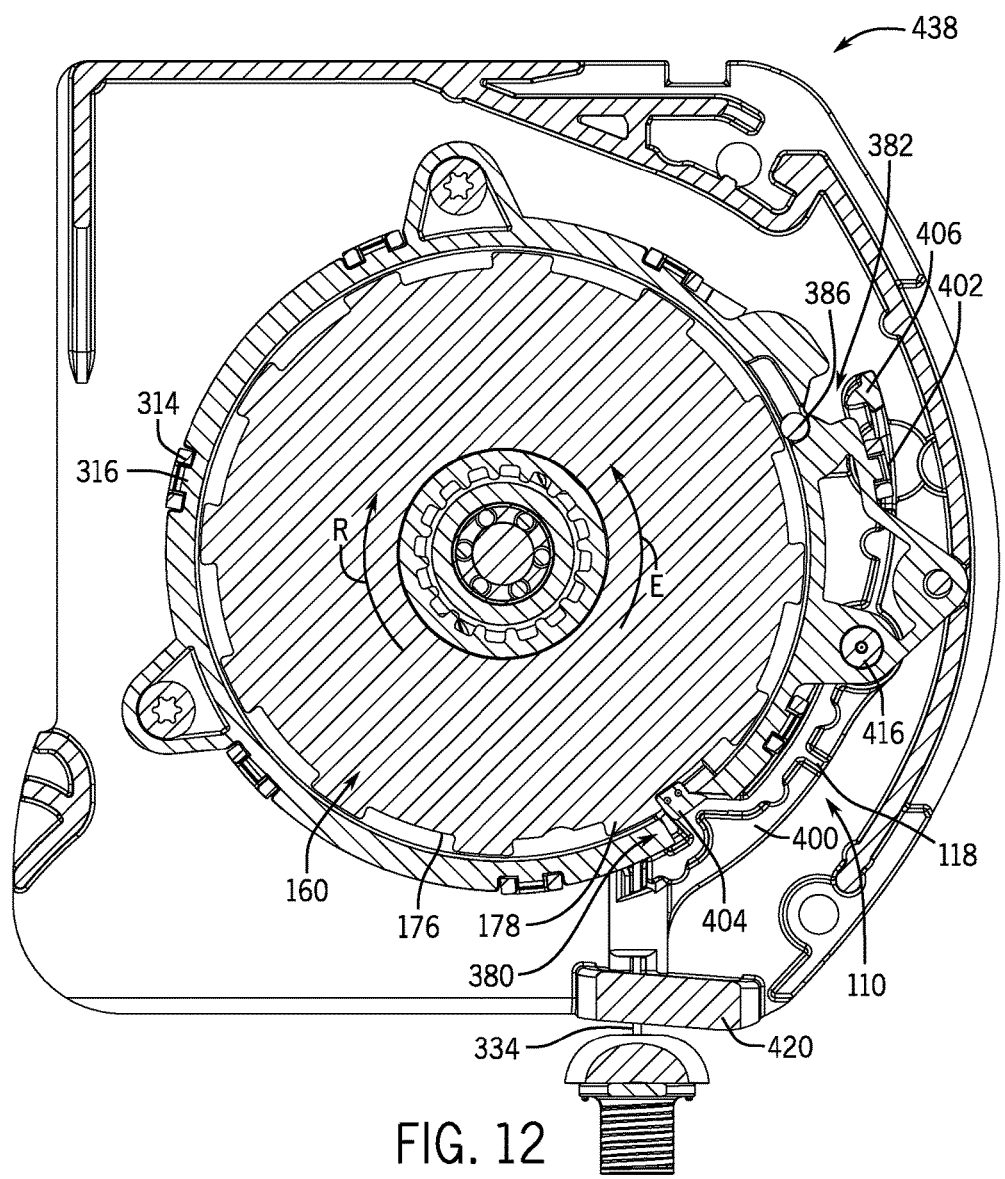
FIG. 12 is a cross-sectional view of the operating system of FIG. 1 taken along line XII-XII of FIG. 7 and showing a shifter in a first operating position in accordance with an embodiment of the present disclosure.
Figure 13:
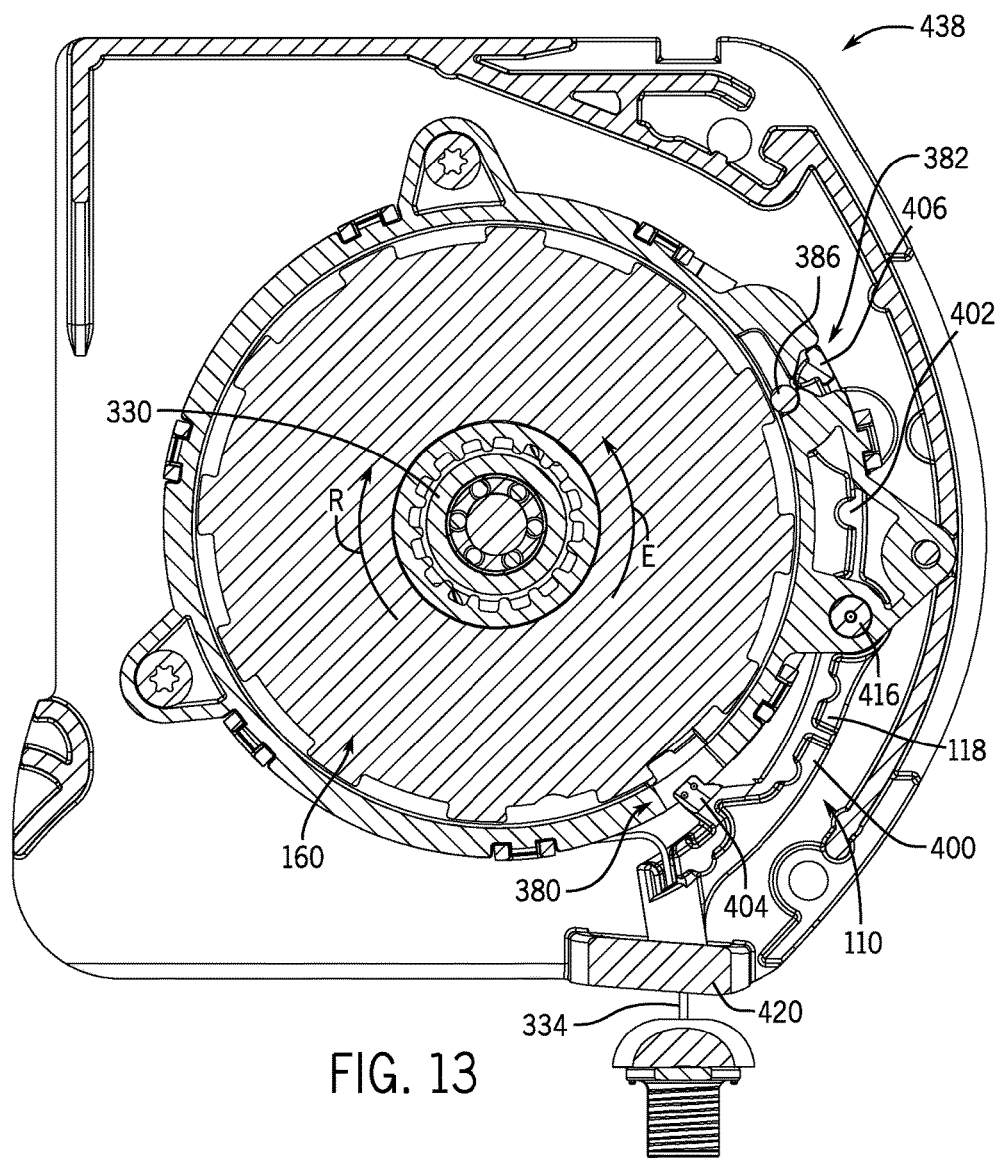
FIG. 13 is a cross-sectional view of the operating system of FIG. 1 taken along line XIII-XIII of FIG. 7 and showing a shifter in a second operating position in accordance with an embodiment of the present disclosure.
Figure 16:
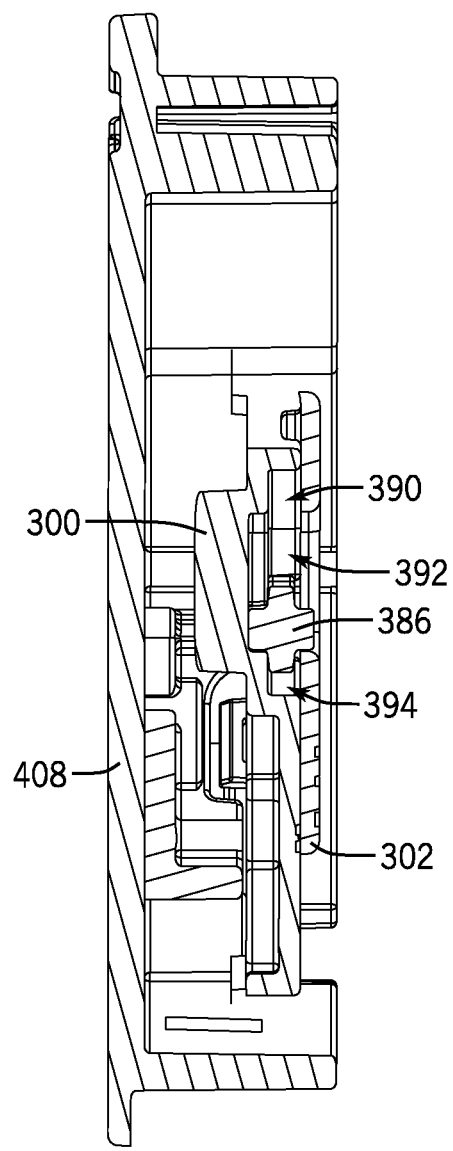
FIG. 16 is an additional cross-sectional view of an overrunning gear channel of the operating system of FIG. 1 taken along line XVI-XVI of FIG. 9 in accordance with an embodiment of the present disclosure.

To control the operation of the transmission 112 and therefore the rotation of the drive member 108, embodiments of the operating system 100 illustrated in FIGS. 12-14 may include first and second lock portions 380, 382 associated with the control mechanism 110 to effect rotation of the transmission 112 to rotate the drive member 108 in either the first direction E or the second direction R. In one embodiment, the first and second lock portions 380, 382 are configured to alternately engage different parts or portions of the transmission 112. For example, as detailed below, the first lock portion 380 may engage a first portion of the transmission 112 to limit the drive member 108 against rotation in the first direction E, and the second lock portion 382 may engage another portion of the transmission 112 to limit the drive member 108 against rotation in the second direction R. In each of the embodiments described herein, the shifter 118 may be movable between engagement configurations to alternately engage the first lock portion 380 with the transmission 112, engage the second lock portion 382 with the transmission 112, or disengage the first and second lock portions 380, 382 from the transmission 112 to control the movement of the operating system 100, as explained below. For instance, engagement of the shifter 118 with a first portion of the transmission 112 (e.g., with the first member 160) engages the first lock portion 380 to cause the operating system 100 to affect the rotation direction of the drive member 108, and therefore affect operation of the covering 102, in a first manner, such as closing and/or retracting the covering 102 by limiting the drive member 108 to rotate in only the second direction R. Similarly, engagement of the shifter 118 with another portion of the transmission 112 (e.g., with the second member 162) disengages the first lock portion 380 and engages the second lock portion 382 to affect the rotation direction of the drive member 108 in another manner, such as opening the covering 102 by limiting the drive member 108 to rotate in only the first direction E. Additionally or alternatively, disengagement of the first and second lock portions 380, 382 may affect the operation of the covering 102 in a third manner, such as allowing the covering 102 to extend across an architectural structure/feature by allowing the drive member 108 to rotate (e.g., freely) in the first direction E.

In some embodiments, the first lock portion 380 includes a first portion 400 of the shifter 118. In such embodiments, the first portion 400 of the shifter 118 may engage the engagement profile 176 of the first member 160 to limit rotation of the first member 160. For example, the first portion 400 may include a first protrusion 404 configured to selectively engage the engagement profile 176 of the first member 160 to engage the first lock portion 380 to the transmission 112. As detailed below, the first portion 400 of the shifter 118 may selectively extend within an aperture defined within the first half 300 of the housing 104 to engage the first member 160.

Figure 9:
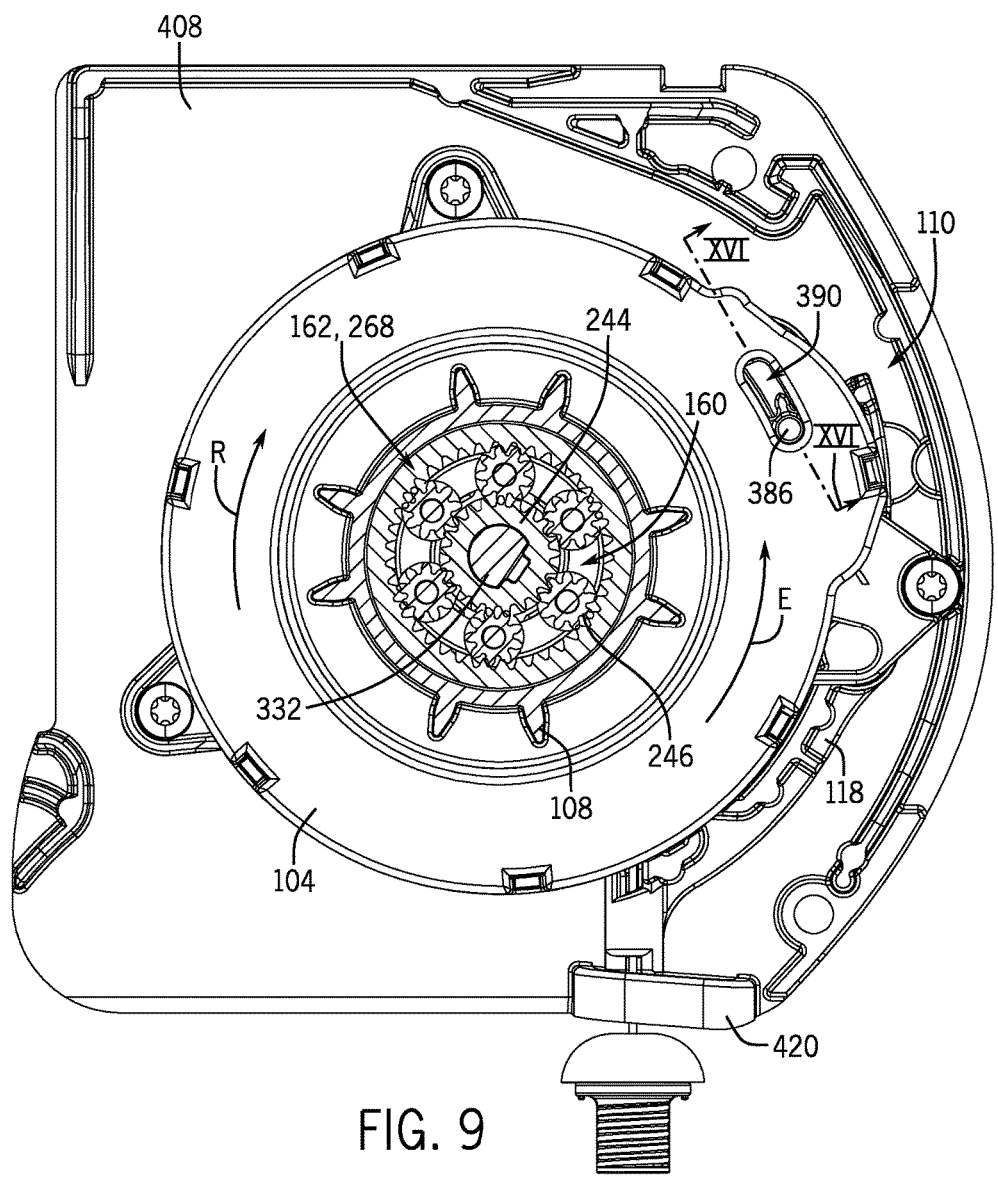
FIG. 9 is a cross-sectional view of the operating system of FIG. 1 taken along line IX-IX of FIG. 7 and showing operation of a first gear system in accordance with an embodiment of the present disclosure.
Figure 10:
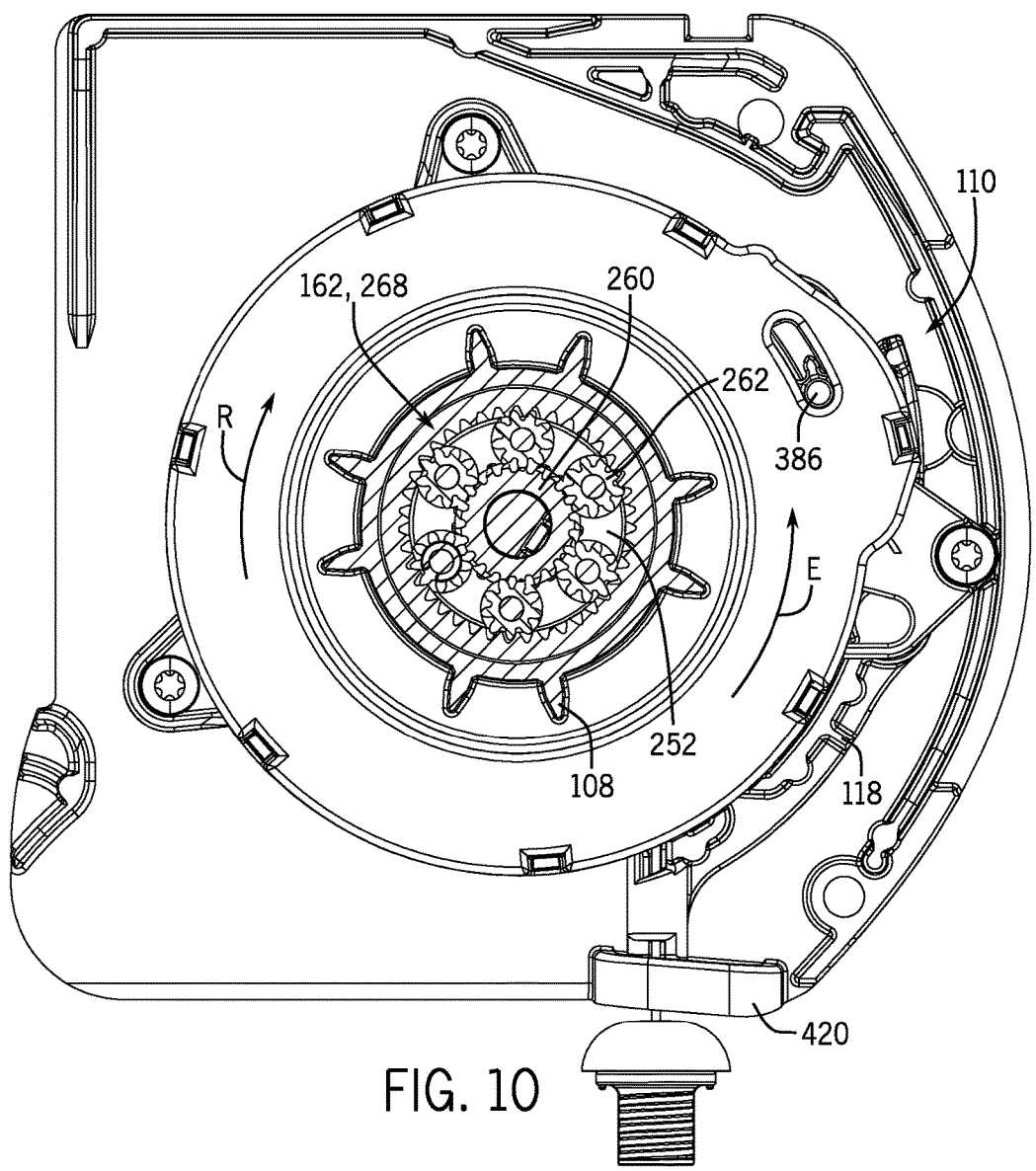
FIG. 10 is a cross-sectional view of the operating system of FIG. 1 taken along line X-X of FIG. 7 and showing operation of a second gear system in accordance with an embodiment of the present disclosure.

In some embodiments, the second lock portion 382 includes a second portion 402 of the shifter 118 and an overrunning gear 386, the second portion 402 of the shifter 118 selectively engaging the second member 162 via the overrunning gear 386. As explained below, the overrunning gear 386 may permit the operating system 100 to operate the covering 102 in two or more manners once the shifter 118 is positioned to engage the second lock portion 382 to the transmission 112. For example, once the shifter 118 is positioned for engagement with the second member 162, the overrunning gear 386 may operatively permit the covering 102 to gravity drop across the architectural structure/feature without influence from the transmission 112 (i.e., a gravity drop feature) while also permitting the operating system 100 to drivingly open covering 102 once the covering 102 is fully dropped (i.e., extended). For example, as described more fully below, the overrunning gear 386 may allow the second member 162 to rotate in one direction only (e.g., in only the first direction E) once the shifter 118 is positioned for engagement with the second member 162. In an assembled state, the overrunning gear 386 is meshingly engaged with the engagement profile 214 of the second member 162 such that rotation of second member 162 rotates the overrunning gear 386, or vice-versa. For instance, as shown in FIG. 5, the overrunning gear 386 may include a plurality of gear teeth 388 that mesh with the gear teeth 216 of the second member 162. As such, rotation of the second member 162 may be controlled by controlling the rotation of the overrunning gear 386. As detailed below, the shifter 118 may engage the overrunning gear 386 to limit rotation of the second member 162. For instance, the shifter 118 may engage at least one of the gear teeth 388 of the overrunning gear 386 to limit rotation of the overrunning gear 386. Once the shifter 118 engages the overrunning gear 386, the overrunning gear 386 may in turn limit rotation of the second member 162, as explained in more detail below. As shown in FIGS. 9, 14, and 15, the overrunning gear 386 may rotate within a channel 390 defined by and between the first and second halves 300, 302 of the housing 104. The channel 390 may include a length defining a first channel portion 392 and a second channel portion 394. As explained below, the shifter 118 may selectively extend into the second channel portion 394 to engage the overrunning gear 386 therein.

In some embodiments, the shifter 118 may be an elongate member including the first portion 400 opposing the second portion 402 (see FIGS. 12 and 13). In some embodiments, the shifter 118 may be curved and may pivot about an axis positioned between the first and second portions 400, 402. As explained below, the axis may permit the shifter 118 to move (e.g., rock) between two operating positions to engage either the first member 160 (e.g., a first operating position, see FIG. 12) or the second member 162 (e.g., a second operating position, see FIG. 13) to alter operation of the operating system 100. The shifter 118 may be rotatably or pivotably mounted to a portion of the operating system 100, such as about a pivot boss 416 extending from an inner surface 410 of an end cap 408 (see FIG. 2). The pivot boss 416 may be aligned with the axis of the shifter 118 to permit the shifter 118 to move between the first and second operating positions.

To move the shifter 118 between its operating positions, the drive cord 334 may be routed through the first portion 400 of the shifter 118. As such, a user may move the shifter 118 between its operating positions by manipulating the drive cord 334 in certain directions. For instance, moving the drive cord 334 towards the operating system 100 may move the shifter 118 to its first operating position, and moving the drive cord 334 away from the operating system 100 may move the shifter 118 to its second operating position.

The shifter 118 may be releasably held to engage either the first lock portion 380 or the second lock portion 382 with the transmission 112 in an alternating fashion. For example, the operating system 100 may include a biasing mechanism 438 biasing the shifter 118 to one of the two operating positions based on the position of the shifter 118. As shown in FIG. 2, the biasing mechanism 438 may include a plurality of magnets associated with the shifter 118 and the end cap 408. A first magnet 440 may be secured to the end cap 408, such as to the inner surface 410 of the end cap 408, and a second magnet 442 may be associated with a portion of the shifter 118, such as positioned within a cavity 444 defined in the second portion 402 of the shifter 118 (see FIG. 14).

The first and second magnets 440, 442 may be configured to repel each other so as to position either the first or second lock portions 380, 382 of the shifter 118 into engagement with the transmission 112. The first and second magnets 440, 442 may substantially align with each other when the shifter 118 is positioned between its operating positions, and the magnets 440, 442 may bias the shifter 118 toward one of its operating positions. For instance, once the first portion 400 of the shifter 118 is positioned near the first member 160, the first and second magnets 440, 442 may repel each other to fully seat the first portion 400 for engagement with the first member 160. In like manner, once the second portion 402 of the shifter 118 is positioned near the second member 162, the first and second magnets 440, 442 may repel each other to fully seat the shifter 118 for engagement with the second member 162. To provide the alternating repelling force, the first and second magnets 440, 442 may be positioned in an overlapping sliding relationship, with the second magnet 442 positioned to either side of the first magnet 440 depending on the position of the shifter 118. Though shown and described as including a plurality of magnets, the biasing mechanism 438 may include any suitable structure or configuration, including one or more cam surfaces, pivot mechanisms, springs, or the like, operable to alternatively seat the shifter 118 for engagement with different parts of the transmission 112, such as the first and second members 160, 162.

Operation of the illustrated embodiment will now be discussed in more detail. As explained herein, operation of the input assembly 106 may actuate the first drive section 164, which in turn actuates the second drive section 165 to rotate the drive member 108 coupled thereto. For example, without limitation, each of the first and second drive sections 164, 165 may include an input and an output. In one embodiment, the output of the first drive section 164 may be or may operably drive the input of the second drive section 165, as described below. In such embodiments, the directional control mechanism 110 alternately engages different portions of the transmission 112 (e.g., a shared element of the first and second drive sections 164, 165) to cause the transmission 112 to operate in different manners, the manner of operation of the transmission 112 affecting the manner of operation of the drive member 108 (e.g., to rotate in the first direction E, to rotate in the second direction R, and/or to rotate freely), such as by controlling rotation of the output of the second drive section 165 upon rotation of the input of the first drive section 164. As explained below, in one embodiment, a first engagement configuration of the shifter 118 (such as engaging the first lock portion 380) may affect at least a first element of the transmission 112 to cause the drive member 108 to rotate in a first manner. Similarly, a second engagement configuration of the shifter 118 with the second lock portion 382 may affect at least a second element of the transmission 112 to cause the drive member 108 to rotate in a second manner. A third engagement configuration of the shifter 118 may allow the drive member 108 to rotate freely, such as by disengaging at least one element of the transmission 112, such as an element that is shared between the first drive section 164 and the second drive section 165 of the transmission 112.

Briefly, during operation of the operating system 100, the input shaft 332 rotates in the first direction E causing the first sun gear 244 to rotate in the first direction E. What changes is whether the first carrier 248 is locked or whether the ring gear 268 is locked depending on the position of the directional control mechanism 110 (e.g., the shifter 118). If the first carrier 248 is locked, the first set of planetary gears 246 can only rotate about their individual axes and cannot orbit about the first sun gear 244. As described herein, locking of the first carrier 248 locks the second sun gear 260. Because the second set of planetary gears 262 and the second carrier 264 are both free to rotate, they rotate in the same second direction R. When the ring gear 268 is locked, the first and second sets of planetary gears 246, 262 orbit relative to the ring gear 268 in a direction opposite to the direction in which the gears rotate about their individual axes, such as orbiting in the first direction E as the gears each rotate about its individual axis in the second direction R.

More specifically, when the covering 102 is positioned in the first position in which the covering 102 is fully extended and closed (see FIG. 19), the operating system 100 may be operated to retract the covering 102, such as wrapping the covering 102 about the roller tube 136 in one non-limiting embodiment. To retract the covering 102, the shifter 118 may be positioned to engage the first portion 400 of the shifter 118 with the first member 160 (see FIG. 12). As noted above, to position the shifter 118 into engagement with the first member 160, a user may bias the drive cord 334 towards the first member 160, such as rearward towards the architectural structure/feature, until the shifter 118 engages the first member 160, such as under the bias of the biasing mechanism 438. Once the shifter 118 is seated in this first operating position, the first protrusion 404 of the shifter 118 may engage the engagement profile 176 of the first member 160 to lock the first member 160 against rotation. For instance, the first protrusion 404 may engage a surface of at least one of the projections 178 of the first member 160 to lock the first member 160 against rotation in the first direction E.

Once the shifter 118 is engaged with the first member 160, the user may operate the input assembly 106, such as repeatedly actuating the drive cord 334, to rotate the transmission 112 to retract the covering 102. For example, the user may bias the drive cord 334 in a first manner, such as pulling the drive cord 334 downwardly (e.g., straight down) away from the operating system 100, to cause the spring motor 330 to rotate in the first direction E. As noted above, rotation of the spring motor 330 in the first direction E causes the input shaft 332 to rotate in the first direction E, rotation of the input shaft 332 providing an input for the first drive section 164, such as rotating the first sun gear 244 of the first drive section 164 in the same direction as the input shaft 332 (e.g., in the first direction E). As the first sun gear 244 rotates in the first direction E, each gear of the first set of planetary gears 246 rotates about its individual axis in the second direction R. When the first member 160 (which carries the first carrier 248) is fixed against rotation by the shifter 118, the first set of planetary gears 246 cannot revolve around the first sun gear 244 (because the first carrier 248 is fixed against rotation) and can only rotate in place about their individual axes in the second direction R as the first sun gear 248 rotates in the first direction E. Rotation of the first set of planetary gears 246 about their individual axes in the second direction R then provides an output of the first drive section 164, such as causing the second member 162 (ring gear 268) to rotate in the second direction R, the output of the first drive section 164 operable to affect rotation of another portion of the transmission 112, such as the second drive section 165 as explained below.

In embodiments having a second drive section 165, rotation of the second member 162 (ring gear 268) by the first drive section 164 may provide an input for the second drive section 165, such as rotating the second set of planetary gears 262. In such embodiments, rotation of the second member 162 in the second direction R causes each gear of the second set of planetary gears 262 to rotate about its individual axis in the second direction R. Since the second sun gear 260 is fixed against rotation by being coupled to the first member 160 (first carrier 248) via the transfer member 252, rotation of the gears of the second set of planetary gears 262 about their respective axes in the second direction R causes the second set of planetary gears 262 to revolve around the second sun gear 260 in the second direction R to provide an output of the second drive section 165. For example, as the second set of planetary gears 262 revolves around the second sun gear 260 in the second direction R, the second carrier 264 rotates in the second direction R. Through the engagement between the second carrier 264 and the drive member 108, rotation of the second carrier 264 in the second direction R causes the drive member 108 to rotate in the second direction R to retract the covering 102, such as causing the roller tube 136 to rotate in the second direction R to wrap the covering 102 about the roller tube 136 in one non-limiting example. The user may continue to operate the drive cord 334, such as alternating between the power and reset strokes discussed above, until the covering 102 is retracted to a desired position relative to the architectural structure/feature (e.g., fully retracted, partially retracted, etc.). Once in a desired position, the user may release the drive cord 334, at which point the bias provided by the spring motor 330 may retract the drive cord 334 towards the operating system 100 until the stop mechanism 338 of the drive cord 334 seats against a portion of the end cap 408, such as a lower surface or an engagement structure as explained below.

At any point of retraction, the user may manipulate the operating system 100 to extend the covering 102 across the architectural structure/feature, such as by unwrapping the covering 102 from the roller tube 136. To extend the covering 102, the shifter 118 may be positioned in its second operating position to disengage the first lock portion 380 (e.g., the first portion 400 of the shifter 118 disengages the first member 160) (see FIG. 13). As noted above, to position the shifter 118 in its second operating position, the user may move the drive cord 334 away from the operating system 100, such as away from the architectural structure/feature, until the shifter 118 is positioned in its second operating position, such as under the bias of the biasing mechanism 438. Once seated in the second operating position, the shifter 118 disengages the first member 160 and the second protrusion 406 of the shifter 118 may extend within the second channel portion 394 of the housing 104 to selectively engage the overrunning gear 386 at a certain point of operation, as explained below (see FIG. 15).

Once the shifter 118 disengages the first member 160, the shifter 118 may also be disengaged from the overrunning gear 386 such that the covering 102 drops freely across the architectural structure/feature without any need to drivingly rotate the second carrier 264 to extend the covering 102, such as via the roller tube 136 being free to rotate in the first direction E under the force of gravity. For example, when the shifter 118 disengages the first member 160 and the overrunning gear 386, the transmission 112 may rotate freely to permit the drive member 108 to rotate in the first direction E, thus unwrapping the covering 102 from the roller tube 136 to cover more of the architectural structure/feature in at least one embodiment. For example, once the shifter 118 disengages the first member 160 and the overrunning gear 386, the first member 160 (first carrier 248) and the second member 162 are free to rotate in the first direction E under the bias provided by the covering 102. For example, as the second member 162 (ring gear 268) rotates in the first direction E, the overrunning gear 386 may move to and rotate within the first channel portion 392 of the housing 104 (see FIG. 15). When the shifter 118 extends within only the second channel portion 394 of the housing 104 when positioned in the second operating position, the overrunning gear 386 is free to rotate within the first channel portion 392, thus permitting the second member 162 to rotate freely in the first direction E until, for example, the covering 102 is positioned in its first position, as explained below. Since the first member 160 (first carrier 248) is free to rotate in the first direction E when the shifter 118 is positioned in its second operation position, the second sun gear 260 is also free to rotate in the first direction E. Thus, none of the three main components of the second drive section 165 is locked against rotation when the shifter 118 is positioned in its second operating position, and each of the second sun gear 260, the ring gear 268, and the second carrier 264 can rotate freely in the first direction E to allow free rotation of the drive member 108 in the first direction E to extend the covering 102 across the architectural structure/feature.

Once the covering 102 is in the first position (i.e., extended and closed) and the shifter 118 is in its second operating position, the user may operate the input assembly 106, such as repeatedly actuating the drive cord 334, to rotate the transmission 112 to open the covering 102. For instance, the user may bias the drive cord 334 in a second manner, such as pulling the drive cord 334 downwardly (e.g., transverse to the plane of the architectural structure/feature) away from the operating system 100 and away from the architectural structure/feature. In one embodiment, the drive cord 334 must be pulled at a slight angle away from the covering 102 to maintain the shifter 118 in its second operating position to open the covering 102. Otherwise, if the drive cord 334 is pulled straight down, the drive cord 334 may move the shifter 118 to its first operating position to retract the covering 102. As described herein, moving the drive cord 334 away from the operating system 100 causes the spring motor 330 to rotate in the first direction E, which in turn causes the input shaft 332 to rotate in the first direction E to provide an input for the first drive section 164, such as drivingly rotating the first sun gear 244 in the first direction E. As the first sun gear 244 rotates in the first direction E, each gear of the first set of planetary gears 246 rotates about its individual axis in the second direction R, rotation of the first set of planetary gears 246 about their axes in the second direction R causing the second member 162 (ring gear 268) to rotate in the second direction R. In such embodiments, rotation of the second member 162 in the second direction R causes the overrunning gear 386 to move from the first channel portion 392 to the second channel portion 394, such as via rotation of the overrunning gear 386 in the first direction E, for engagement with the shifter 118 (see FIG. 14). Once the shifter 118 and the overrunning gear 386 are engaged, rotation of the overrunning gear 386 in the first direction E may be limited, thereby limiting rotation of the second member 162 in the second direction R.

Once the second member 162 (ring gear 268) is fixed against rotation in the second direction R, continued actuation of the input assembly 106 causes the first set of planetary gears 246 to revolve or walk around the first sun gear 244 in the first direction E as each of the first set of planetary gears 246 rotates about its individual axis in the second direction R upon rotation of the first sun gear 244 in the first direction E. In such embodiments, the orbiting motion of the first set of planetary gears 246 about the first sun gear 244 provides an output of the first drive section 164 to affect rotation of another portion of the transmission 112, such as the second drive section 165, as explained below.

In embodiments having a second drive section 165, the orbiting movement of the first set of planetary gears 246 about the first sun gear 244 may provide an input for the second drive section 165. For example, in embodiments including a transfer member 252 tying movement of the first set of planetary gears 246 to the second sun gear 260, the orbiting movement of the first set of planetary gears 246 about the first sun gear 244 in the first direction E causes the second sun gear 260 to rotate in the first direction E, thereby causing each gear of the second set of planetary gears 262 to rotate in the second direction R about its individual axis. When the second member 162 (ring gear 268) is fixed against rotation in the second direction R via the shifter 118, rotation of the second set of planetary gears 262 about their individual axes in the second direction R causes the second set of planetary gears 262 to revolve around the second sun gear 260 in the first direction E to provide an output of the second drive section 165. For example, as the second set of planetary gears 262 revolves around the second sun gear 260 in the first direction E, the second carrier 264 rotates in the first direction E. Through the engagement between the second carrier 264 and the drive member 108, rotation of the second carrier 264 in the first direction E causes the drive member 108 to rotate in the first direction E to open the covering 102 as discussed above, such as rotating the roller tube 136 in the first direction E to open the vanes 122 of the covering 102. To provide fine control in opening the covering 102, the transmission 112 may include a relatively high first drive ratio rotating the drive member 108 in the first direction E. The user may continue to operate the drive cord 334, such as alternating between the power and reset strokes discussed above, until the covering 102 is opened as desired (e.g., fully opened, partly opened, etc.).

Moving the covering 102 into a closed configuration may be accomplished in substantially the same manner discussed above in relation to retracting the covering 102. Specifically, the shifter 118 may be positioned in its first operating position such that the first portion 400 of the shifter 118 engages the first member 160. Once the shifter 118 engages the first member 160, the user may operate the input assembly 106, such as repeatedly actuating the drive cord 334, to cause the drive member 108 to rotate in the second direction R in the same manner as discussed above in relation to retracting the covering 102. For example, the user may bias the drive cord 334 in the first manner discussed above to rotate the spring motor 330 and input shaft 332 in the first direction E, which, as detailed above, causes the drive member 108 to rotate in the second direction R via the transmission 112 and due to engagement of the shifter 118 with the first member 160. As the drive member 108 rotates in the second direction R, the covering 102 may be closed, such as via the roller tube 136 rotating in the second direction R to close the vanes 122 of the covering 102, as discussed above. The user may continue to operate the drive cord 334, such as alternating between the power and reset strokes discussed above, until the covering 102 is closed as desired (e.g., fully closed, partly closed, etc.). Once the covering 102 is fully closed, the covering 102 may be retracted as discussed above.

To mount the operating system 100 to the covering 102, the operating system 100 may be connected to the end cap 408 of the covering 102 (see FIGS. 1 and 2). For instance, the housing 104 of the operating system 100, such as the first half 300 of the housing 104, may be secured to an inner surface 410 of the end cap 408 using a plurality of fasteners 412, though other suitable fastening mechanisms and means are contemplated. The spring motor 330 may be positioned between the end cap 408 and the housing 104, such as within a recess 414 defined in the inner surface 410 of the end cap 408 (see FIGS. 2 and 7). Once secured, the protruding portion 344 of the spring motor 330 may be rotatably positioned within the boss 304 of the housing 104 to, for instance, concentrically align rotation of the spring motor 330 with the transmission 112 (see FIG. 7).

In some embodiments, the end cap 408 may facilitate biasing of the spring motor 330 to rotate in the second direction R. For example, in one non-exclusive embodiment, a tab 436 may extend from the inner surface 410 of the end cap 408 for engagement with the spring motor 330 (see FIG. 2). The tab 436 may create an anchor point to facilitate the biasing of the spring motor 330 noted above. For instance, opposing ends of a bias member, such as a clock spring 337 or a torsion spring, may be coupled to the tab 436 and the spring motor 330, respectively. As the spring motor 330 rotates in the first direction E, the clock spring 337 may be tensioned to bias the spring motor 330 to rotate in the second direction R for at least the purposes explained above.

Additionally or alternatively, the end cap 408 may be arranged in some embodiments to position the drive cord 334 into proper alignment with the directional control mechanism 110 (e.g., the shifter 118) to facilitate smooth operation of the operating system 100. For instance, the end cap 408 may include a guide 420 extending inwardly (e.g. looping) from the inner surface 410 of the end cap 408 to define an opening 430 near a bottom portion 432 of the end cap 408 (see FIG. 1). In such embodiments, the first portion 400 of the shifter 118 may be positioned adjacent the opening 430 and the drive cord 334 may be routed through the opening 430 (see FIG. 13). The guide 420 may be sized and shaped such that the opening 430 permits the drive cord 334 to move the shifter 118 between its operating positions. To provide a desired aesthetic characteristic of the operating system 100, the guide 420 may define a lower surface 434, the stop mechanism 338 of the drive cord 334 engaging the lower surface 434 to define a fully retracted position of the drive cord 334.

FIGS. 21-24 illustrate additional embodiments of an operating system 600, 1100, or 1600 incorporating an overload protection assembly or mechanism. With the exception of the description that follows, the operating systems 600, 1100, 1600 are similar to the operating system 100 and its associated description above, and the features of the operating systems 600, 1100, 1600 discussed below may be added to the embodiments of the operating system 100 discussed above, or vice-versa. Thus, in certain instances, descriptions of like features will not be discussed when they would be apparent to those with skill in the art in light of the description above and in view of FIGS. 21-24. For ease of reference, like structure is represented with appropriately incremented reference numbers.

Figure 21:
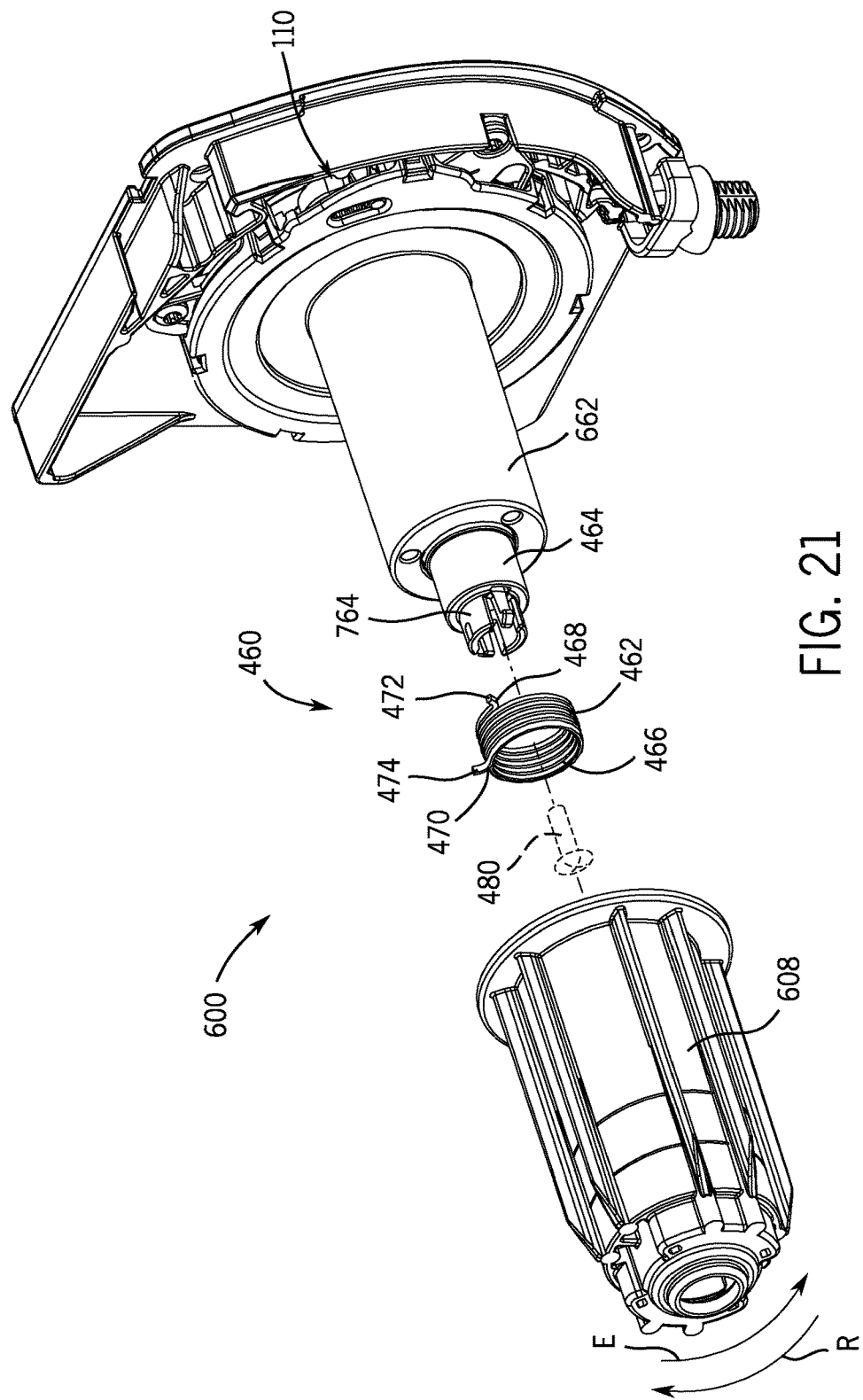
FIG. 21 is a partially exploded view of an additional operating system in accordance with an embodiment of the present disclosure.
Figure 22:
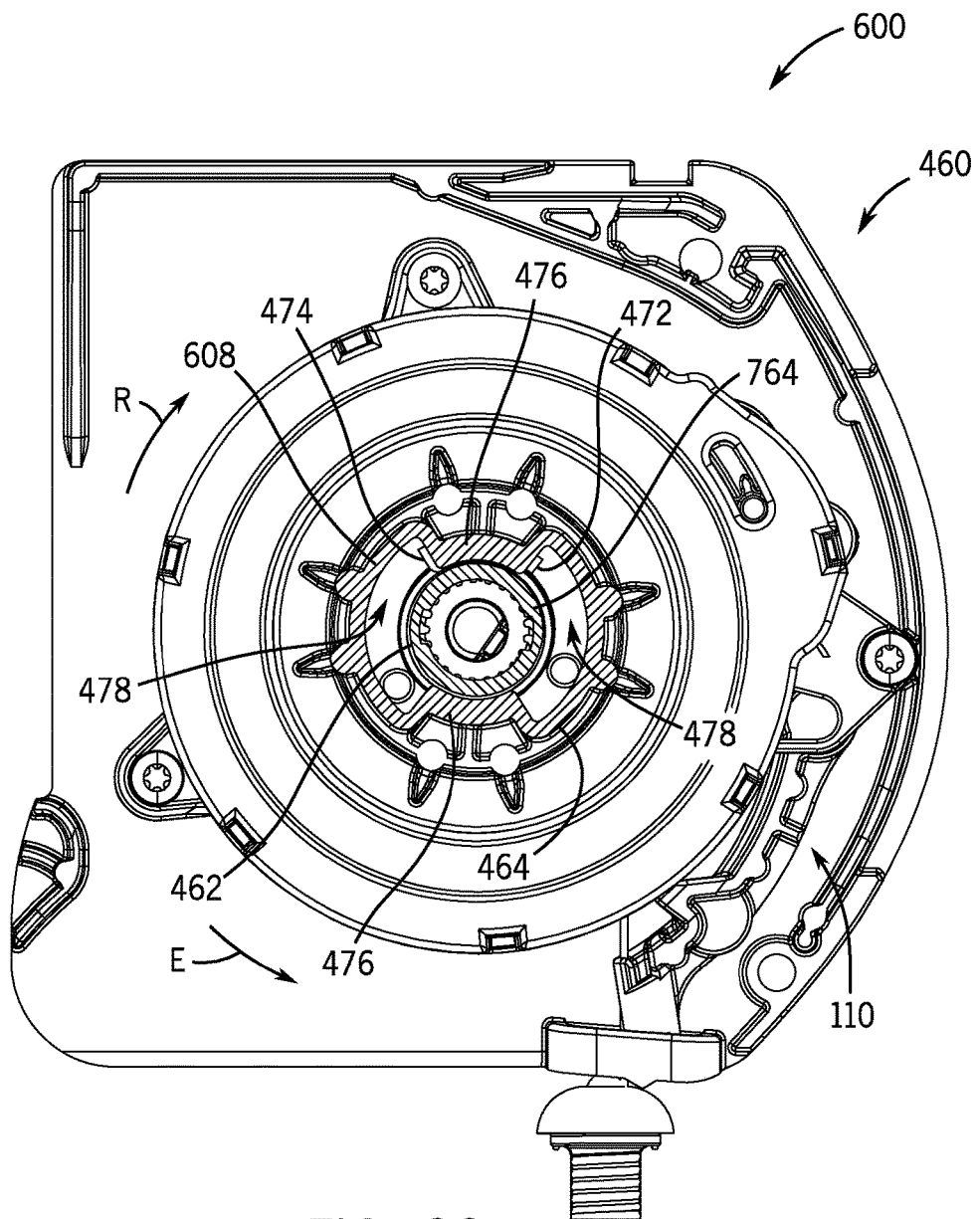
FIG. 22 is a cross-sectional view of the operating system of FIG. 21 in accordance with an embodiment of the present disclosure.

As noted above, the operating system 600 may include an overload protection assembly or mechanism, such as a clutch mechanism 460, arranged to limit overloading of the transmission 112 (see FIGS. 21 and 22). For example, without use of the clutch mechanism 460, excessive torque loads on the transmission 112 from the input assembly 106 may cause at least portions of the first and second drive sections 164, 165 to disengage, which may damage the transmission 112 and/or create an undesirable ratchet-type sound during operation due to at least the first and second drive sections 164, 165 moving with respect to each other too quickly and skipping teeth. As explained below, the clutch mechanism 460 is arranged to slip before disengagement of the transmission 112 occurs under excessive torque loading.

In the embodiments of FIGS. 21 and 22, the clutch mechanism 460 includes a spring, such as a wrap spring 462, coupled (e.g., rotatably coupled) to a portion of the second carrier 764, though other mechanisms are contemplated such as those described below in relation to FIGS. 23 and 24. For instance, the second carrier 764 (FIG. 21) may include a cylindrical journal 464 extending beyond the end of the second member 662 (see FIG. 21), the wrap spring 462 rotatably coupled about the journal 464. In such embodiments, the drive member 608 may be elongated to fit over the wrap spring 462 and the journal 464 of the second carrier 764. As shown, the wrap spring 462 may include a spring body 466 including opposing ends 468, 470 defining first and second tangs 472, 474, respectively. As shown, the first and second tangs 472, 474 extend outwardly away from the spring body 466. The inner diameter of the wrap spring 462 may be less than the outer diameter of the journal 464 to create an interference fit between the spring body 466 of the wrap spring 462 and the journal 464. The interference fit may be configured such that rotation of the second carrier 764 causes corresponding rotation of the wrap spring 462. As explained below, the interference fit between the second carrier 764 and the wrap spring 462 may be configured to support up to a threshold torque between the two elements. The threshold torque may be between about 8 inch-pounds and about 12 inch-pounds (preferably about 10 inch-pounds) depending on the particular application, such as the particular size, weight, and/or configuration of the covering 102. As explained below, torque loads in excess of the threshold torque may cause the wrap spring 462 to slip relative the second carrier 764 before disengagement of the transmission 112 occurs.

In at least one embodiment, illustrated in FIG. 22, the wrap spring 462 may be arranged to drivingly rotate the drive member 608. For example, the drive member 608 may include one or more inner ribs 476 defining one or more longitudinal voids 478 within the interior of the drive member 608. In an assembled state, each of the first and second tangs 472, 474 may be positioned within one of the voids 478 so as to position one of the ribs 476 between the first and second tangs 472, 474. When the operating system 600 is actuated, the second carrier 764 (see FIG. 21) may rotate in either the first direction E or the second direction R (see FIG. 21) in the same manner discussed above with reference to the second carrier 264. When rotated in the first direction E, the second carrier 764 may cause the wrap spring 462 to rotate to engage the first tang 472 of the wrap spring 462 with one side of a rib 476 of the drive member 608, thereby causing the drive member 608 to rotate in the first direction E. Similarly, rotation of the second carrier 764 in the second direction R may cause the wrap spring 462 to correspondingly rotate to engage the second tang 474 of the wrap spring 462 with the opposite side of the rib 476, thereby causing the drive member 608 to rotate in the second direction R. Because at least one rib 476 is flanked on each side by the first and second tangs 472, 474, the drive member 608 may rotate only upon rotation of the wrap spring 462. For instance, the first and second tangs 472, 474 on either side of a rib 476 pushes the rib 476 in either direction to rotate the drive member 608 in either direction.

The wrap spring 462 may drivingly rotate the drive member 608 until excessive torque load occurs. For example, when the covering 102 is in a fully retracted or closed position, the drive member 608 may be effectively locked from further rotation in the second direction R, such as via engaging portions of the covering 102 (e.g., a bottom rail engaging a head rail), among others. Similarly, when the covering 102 is in a fully extended or opened position, further rotation of the drive member 608 in the first direction E may be limited, such as via a limit stop or other mechanism. In such embodiments, continued rotation of the second carrier 764 in the second and first directions R, E, respectively, may cause the torque load between the second carrier 764 and the wrap spring 462 to exceed the threshold torque supported by the interference fit therebetween. Once the threshold torque is exceeded, the wrap spring 462 slips relative the second carrier 764 for the purposes explained above.

In some embodiments, the threshold torque may be adjustable to match the operating system 600 to a covering 102 of particular requirements. For example, without limitation, the clutch mechanism 460 may include an adjustment screw 480 adjustably coupled to the second carrier 764, such as threadedly coupled to the journal 464 of the second carrier 764 (see FIG. 21). In such embodiments, the adjustment screw 480 may be arranged to control the outer diameter of the journal 464. For example, rotation of the adjustment screw 480 in one direction may increase the diameter of the journal 464 to increase the threshold torque between the journal 464 and the wrap spring 462 to limit slippage to higher loads. Similarly, rotation of the adjustment screw 480 in an opposite direction may decrease the diameter of the journal 464 to decrease the threshold torque between the journal 464 and the wrap spring 462 to allow slippage to occur under lighter loads. Additionally or alternatively, the threshold torque may be adjusted through modification or tailored selection of the wrap spring 462. For instance, the threshold torque may be adjusted based on the number or size of wraps of the spring body 466 positioned about the journal 464.

Figure 23:
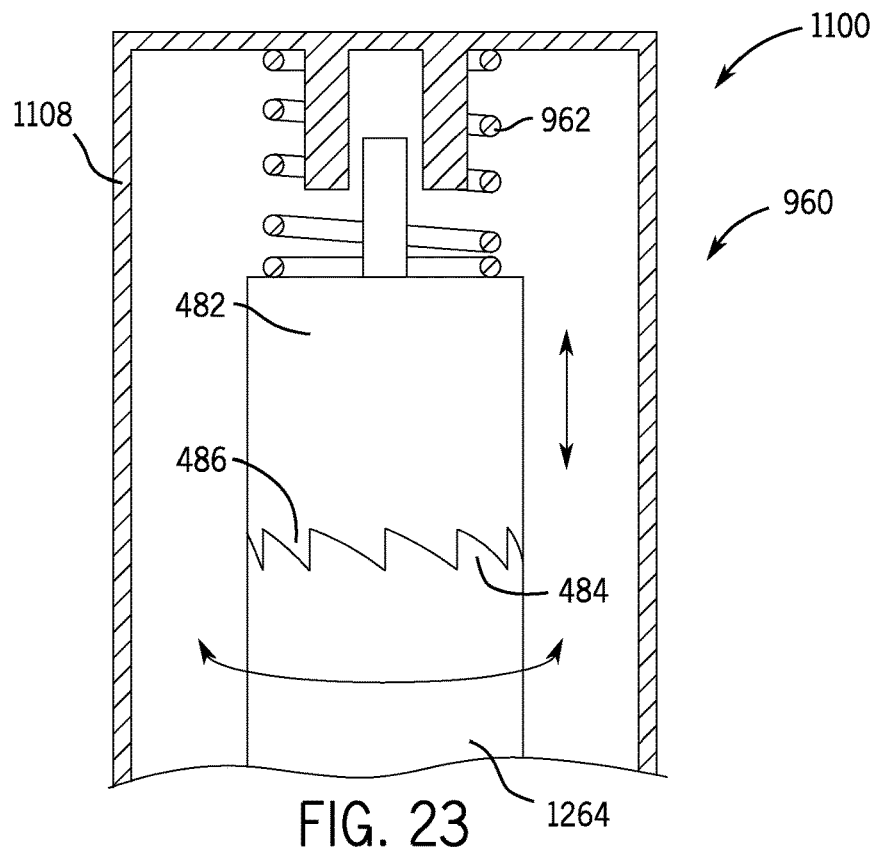
FIG. 23 is a schematic representation of an additional operating system in accordance with an embodiment of the present disclosure.

Turning to FIG. 23, the operating system 1100 may be similar to the operating system 600 discussed above to permit a portion of the operating system 1100 to slip before disengagement of the transmission 112 occurs under excessive torque loading. In one embodiment, the operating system 1100 includes a clutch mechanism 960 having a spring, such as a helical spring 962, coupled to the second carrier 1264, such as via a ratchet mechanism 482 coupled to the drive member 1108. The ratchet mechanism 482 may be slidably coupled to the drive member 1108 and selectively movable towards and away from the second carrier 1264. In such embodiments, the spring 962 may be positioned between the drive member 1108 and at least a portion of the ratchet mechanism 482 to bias the ratchet mechanism 482 towards the second carrier 1264. To provide a desired "slippage" of the drive member 1108 relative to the second carrier 1264, each of the second carrier 1264 and the ratchet mechanism 482 may include a plurality of teeth 484, 486, respectively, meshingly engaged with each other. Under normal operation, the spring 962 may bias the teeth 484, 486 into engagement, such as by biasing the ratchet mechanism 482 towards the second carrier 1264. Under excessive loads, such as when the drive member 1108 is effectively locked against rotation, rotation of the second carrier 1264 relative to the drive member 1108 causes the ratchet mechanism 482 to move away from the second carrier 1264, such as by causing the teeth 486 of the ratchet mechanism 482 to climb up the teeth 484 of the second carrier 1264 as the second carrier 1264 rotates relative to the ratchet mechanism 482. In some embodiments, the teeth 484, 486 may be biased such that the clutch mechanism 960 slips only when the second carrier 1264 rotates relative to the ratchet mechanism 482 in one direction (e.g., in the first direction E). Like the clutch mechanism 460 discussed above, the spring 962 may be sized and shaped to tailor the threshold torque at which the second carrier 1264 and the ratchet mechanism 482 slip relative to each other. For example, a stiffer spring may limit slippage to higher loads. In like manner, a softer spring may allow slippage to occur under lighter loads.

Figure 24:
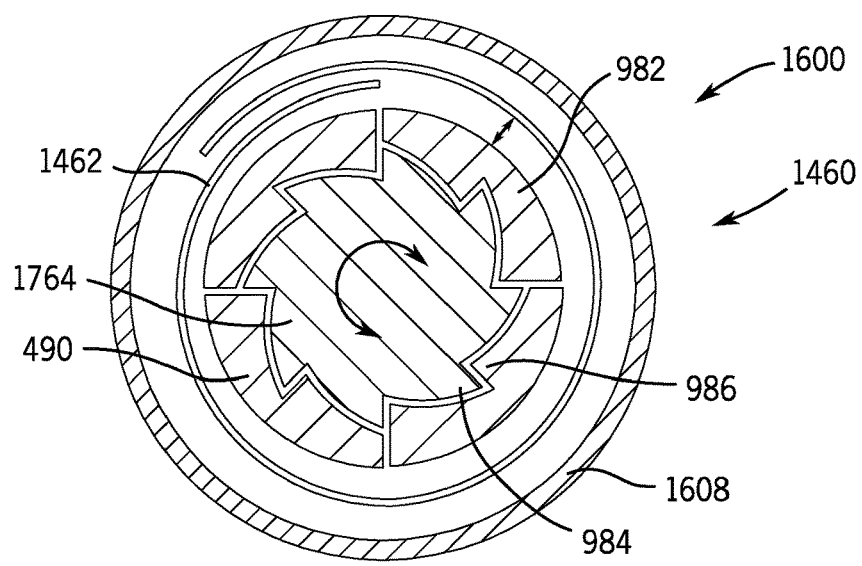
FIG. 24 is a schematic representation of an additional operating system in accordance with an embodiment of the present disclosure.

Referring to FIG. 24, the operating system 1600 may be similar to the operating systems 600 and 1100 discussed above to permit a portion of the operating system 1600 to slip before disengagement of the transmission 112 occurs under excessive torque loading. In particular, the operating system 1600 includes a clutch mechanism 1460 having a spring, such as a band spring 1462, coupled about the second carrier 1764, such as via a ratchet mechanism 982 coupled to the drive member 1608. The ratchet mechanism 982, which may include a plurality of collet fingers 490, may resiliently bend relative to the drive member 1608 to selectively expand away from or contract towards the second carrier 1764. In such embodiments, the band spring 1462 may be positioned about the collet fingers 490 to bias the collet fingers 490 towards the second carrier 1764. To provide a desired "slippage" of the drive member 1608 relative to the second carrier 1764, each of the second carrier 1764 and the ratchet mechanism 982 (i.e., the collet fingers 490) may include a plurality of teeth 984, 986, respectively, meshingly engaged with each other. Under normal operation, the band spring 1462 may bias the teeth 984, 986 into engagement, such as by biasing the collet fingers 490 towards the second carrier 1764. Under excessive loads, such as when the drive member 1608 is effectively locked against rotation, rotation of the second carrier 1764 relative to the drive member 1608 causes the collet fingers 490 to move away from the second carrier 1764, such as by causing the teeth 986 of the collet fingers 490 to climb up the teeth 984 of the second carrier 1764 as the second carrier 1764 rotates relative to the collet fingers 490. In some embodiments, the teeth 984, 986 may be biased such that the clutch mechanism 1460 slips only when the second carrier 1764 rotates relative to the collet fingers 490 in one direction (e.g., in the first direction E). The band spring 1462 may be sized and shaped to tailor the threshold torque at which the second carrier 1764 and the ratchet mechanism 982 slip relative to each other. For example, a stiffer spring may limit slippage to higher loads. In like manner, a softer spring may allow slippage to occur under lighter loads. Though the ratchet mechanisms 482, 982 are shown in FIGS. 23 and 24 to slip only when the second carriers 1264, 1764 rotate in one direction, the ratchet mechanisms 482, 982 and/or the second carriers 1264, 1764 may be arranged such that "slippage" occurs under any rotational direction of the second carriers 1264, 1764. For example, the teeth 484, 486, 984, 986 may be approximately symmetrical across the teeth face or width.

FIG. 35 illustrates an additional embodiment of an operating system 2600 incorporating an overload protection assembly or mechanism. With the exception of the description that follows, the operating system 2600 is similar to the aforementioned operating systems 100, 600, 1100, 1600 and their associated descriptions above. Moreover, the features of the operating system 2600 discussed below may be incorporated into the embodiments of the operating system 100, 600, 1100, 1600 discussed above, or vice-versa. Thus, in certain instances, descriptions of like features will not be discussed when they would be apparent to those with skill in the art in light of the descriptions above and in view of FIG. 35. For ease of reference, like structure is represented with appropriately incremented reference numbers.

As noted above, the operating system 2600 may include an overload protection assembly or mechanism, such as a clutch mechanism 2460, arranged to limit overloading of the transmission 112 (see, for example, FIG. 2). For example, without use of the clutch mechanism 2460, excessive torque loads on the transmission 112 applied via the input assembly 106 may cause at least portions of the first and second drive sections 164, 165 (see, for example, FIG. 2) to disengage, which may damage the transmission 112 and/or create an undesirable ratchet-type sound during operation due to at least the first and second drive sections 164, 165 moving with respect to each other too quickly and skipping teeth. As explained below, the clutch mechanism 2460 is arranged to slip before disengagement of the transmission 112 occurs under excessive torque loading, thus preventing the aforementioned damage and mis-operation.

In the embodiment of FIG. 35, the clutch mechanism 2460 may be in the form of a slip clutch 2462 coupled (e.g., press-fitted) to a portion of the second carrier, such as, for example, second carrier 264 (see, for example, FIG. 2), though other mechanisms are contemplated. For instance, the second carrier 264 may include an opening 2470 formed in one end of the second carrier 264. In such embodiments, the drive member 608 may extend over the slip clutch 2462 and the second carrier 264. As shown, the slip clutch 2462 may include a first body portion 2464 and a second body portion 2466. A portion of the first body portion 2466 may be sized and configured to be received within the opening 2740 in the second carrier 264. The second body portion 2466 may include a plurality of ridges 2468 formed thereon for coupling (e.g., press-fit) to the drive member 608. In some embodiments, the ridges 2468 engage correspondingly-shaped recesses formed in the drive member 608 or intermesh with ridges (not shown) located in the opening of the drive member 608 for receiving the second body portion 2466 of the slip clutch 2462.

In use, the first and second body portions 2464, 2466 of the slip clutch 2462 are adapted and configured to rotate together until a threshold torque between the first and second body portions 2464, 2466 is achieved. Thus, below the threshold torque, a torque applied to the second carrier 264 via the input assembly 106 is transmitted to the drive member 608 via the slip clutch 2462. Torque loads in excess of the threshold torque may cause the slip clutch 2462 to slip. That is, torque loads in excess of the threshold torque may cause the first body portion 2464 to rotate independent of the second body portion 2466, and vice-versa. As such, when the applied torque is below the threshold torque, torque supplied by the input assembly 106 causes the operating system to rotate, which in turn causes the first and second body portions 2464, 2466 to rotate in unison, thus rotating the drive member 608. However, once the threshold torque is achieved (e.g., the applied torque is equal to or greater than the threshold torque), rotation of the operating system is not transferred to the drive member 608 (e.g., rotation of the first body portion 2464 of the slip clutch 2462 is not transferred to the second body portion 2466 of the slip clutch).

More specifically, when the operating system 2600 is actuated, the second carrier 264 may rotate in either the first direction E or the second direction R in the same manner discussed above. When rotated in the first direction E, the second carrier 264 may cause the slip clutch 2462 (e.g., the first and second body portions 2464, 2466) to rotate, thereby causing the drive member 608 to rotate in the first direction E. Similarly, rotation of the second carrier 264 in the second direction R may cause the slip clutch 2462 (e.g., the first and second body portions 2464, 2466) to correspondingly rotate, thereby causing the drive member 608 to rotate in the second direction R. That is, when the supplied torque load is below the threshold torque load, the first and second body portions 2464, 2466 of the slip clutch 2462 rotate in unison so that rotation of the second carrier 264 is transferred to the drive member 608, and vice-versa.

Thus arranged, the slip clutch 2462 (e.g., the first and second body portions 2464, 2466) may drivingly rotate the drive member 608 until excessive torque load occurs. For example, as previously mentioned, when the covering 102 is in a fully retracted or closed position, the drive member 608 may be effectively locked from further rotation in the second direction R, such as by engaging portions of the covering 102 (e.g., a bottom rail engaging a head rail), among others. Similarly, when the covering 102 is in a fully extended or opened position, further rotation of the drive member 608 in the first direction E may be limited, such as via a limit stop or other mechanism. In such instances, user activation of the input assembly 106 can cause the second carrier 264 to rotate in the second or first direction R, E, respectively, which may cause the torque load between the first and second body portions 2464, 2466 to exceed the threshold torque supported by the slip clutch 2462, since the second body portion 2466 will be held stationary through its interaction with the drive member 608. Once the threshold torque is exceeded, the slip clutch 2462 slips (e.g., rotation of the first body portion 2464 is not transmitted into rotation of the second body portion 2466, and vice-versa). As such, rotation of the second carrier 264 is not transferred to the drive member 608, and vice-versa.

In one non-limiting example embodiment, the threshold torque may be about 13 inch-pounds, although this may vary depending on the particular application, such as the particular size, weight, and/or configuration of the covering. Additionally, by controlling the gear ratio between the slip clutch 2462 and the drive member 608, other aspects of the architectural structure covering and/or operating system could be controlled, for example, speed ratio, mechanical advantage, etc. The slip clutch 2462 may be any slip clutch now known or hereafter developed. In one embodiment, the slip clutch 2462 may be a TI-300 series Torque Insert offered and sold by Reell Precision Manufacturing Corporation.

It will be appreciated that at least some of the above-described embodiments allow an operator or user of the described operating system 100 to pull on the drive cord 334 to cause the covering 102 to move into an extended configuration with minimum effort, such as with a single pull. In embodiments in which the drive cord 334 automatically retracts into an inaccessible position, in some instances when the operator positions the shifter 118 in its second operating position to effectuate the gravity drop feature of the covering 102 and then releases the touchpoint (e.g., wand or handle 340), the touchpoint may be retracted too quickly and may inadvertently move the shifter 118 out of its operational position for providing the gravity drop feature and into a position for operating the operating system 100 in another operating mode. In accordance with another separate and independent aspect of the present application, a shift lock feature or mechanism (hereinafter "shift lock" for the sake of convenience without intent to limit) is provided to maintain the position of the shifter 118 or other component of an operating system 100 for shifting operation of the operating system 100 from one operating mode to another. Such shift lock may be used in connection with the above-described operating system 100 providing a gravity drop feature or other operating systems with more than one operating mode. In particular, such shift lock may advantageously be used with an operating system 100 having an automatically retracting component which may move the shifter 118 inadvertently out of the desired operating position thereof.

One aspect of a shift lock provides selective restriction of movement of the shifter 118 in at least one of the shifter's operating positions. For instance, it generally may be desirable to restrict movement of the shifter 118 during movement of the architectural covering 102 in a desired direction so that the desired movement will be achieved. In particular, if the desired movement is to be achieved by minimal effort by the operator, then it may be particularly desirable for movement of the covering 102 to be completed without obstruction after such movement has been initiated. In one embodiment, the shift lock restricts movement of the shifter 118 upon moving the shifter 118 into a selected operating position. For instance, in an operating system in which the touchpoint is moved substantially vertically for operation in one mode and is moved substantially towards the operator (at angle away from the covering 102) for operation in another mode, the shift lock restricts the shifter 118 to remain in one of the positions at least until the selected operation in that selected position is complete. For instance, as described above, movement of the touchpoint to release the covering 102 into the extended configuration involves moving the touchpoint away from the covering 102, and a shift lock in accordance with this disclosure may maintain the shifter 118 in the position for release of the covering 102 into the extended configuration until the covering 102 has been fully extended.

In accordance with one aspect of the shift lock, once the desired restriction of the shifter 118 has been achieved, the shift lock may be released to allow uninhibited or unrestricted movement of the shifter 118, or may move into another position restricting movement of the shifter 118 in a different position for a different operating mode. For instance, once the covering 102 is extended across the architectural structure/feature, the shift lock may be released to allow repositioning of the shifter 118 to another operating position to operate the covering 102 in a different operating mode, such as opening the covering 102 and/or retracting the covering 102, among others. For instance, once the covering 102 is extended across the architectural structure/feature a desired amount (e.g., fully extended, partially extended, etc.), the shift lock may be released to allow the shifter 118 to be moved from its second operating position to its first operating position. Once the shift lock is released, the shifter 118 may be moved between its first and second operating positions in an unrestricted manner.

A shift lock formed in accordance with principles of the present disclosure may include a selective bearing with a moveable element moving in a groove or race or track (hereinafter "groove" for the sake of simplicity without intent to limit). In a movement-restricting position, the bearing functions as an obstruction element configured to obstruct movement of the shifter from moving out of a selected operating position. In one embodiment, the obstruction element is an element bridging across the shifter and another element, such as an element with respect to which the shifter otherwise moves (when the obstruction element is not obstructing movement of the shifter), such as the end cap. For instance, the obstruction element may be a ball, a donut-shaped member, or any other suitable element configured to extend between the shifter and the end cap to selectively restrict movement of the shifter relative to the end cap.

An operating element may move the moveable element (e.g., automatically) into a restricting position, holding the shifter in such position until the operating element is moved in a different direction to effect a different operation. For instance, the retractable drive cord may pull the moveable element into a first position in which the moveable element restricts movement of the shifter from moving out of the extension mode. The drive cord may be moved in a second, different direction to operate the operating element in a different mode, and may move the shift lock into a second configuration. In one embodiment, movement of the drive cord in a second direction moves a moveable element of the shift lock into a second configuration or position. In one embodiment, when the shift lock is in the second configuration, the shifter is free to move in more than one direction (in contrast with the first configuration described above in which the shifter is constrained to stay in the position in which the shifter allows the operating system to operate in the second operating mode). In an embodiment in which the shift lock includes a movable element in a track, the track may be configured to allow the moveable element not to interfere with movement of the shifter and/or movement of the drive cord.

It will be appreciated that the operator of the operating system with such a shift lock may not be aware of the operation of the shift lock at all if the operator's movement of the drive cord places the obstruction element into the movement-restricting position as the shifter is moved into a position for operating in an operating mode in which the operator may not want to hold the shifter for an extended time, yet in which the operator intends the shifter to remain to complete the desired operation after the operator has released the shifter. In one embodiment, placement of the shift lock into a movement-restricting position may be considered substantially automatic upon moving the shifter into the accompanying operating mode position. And, in one embodiment, movement of the shifter to operate in a different operating mode may cause the shift lock to move into a different position without intended, separate input from the operator.

FIGS. 25-32 illustrate an embodiment of an operating system 2100 including a shift lock feature or mechanism (hereinafter "shift lock" for the sake of simplicity, without intent to limit). With the exception of the description that follows, the operating system 2100 is similar to the operating systems 100, 600, 1100, 1600, 2600 and their associated descriptions above, and the features of the operating system 2100 discussed below may be added to the embodiments of the operating systems 100, 600, 1100, 1600, 2600 discussed above, or vice-versa. Thus, in certain instances, descriptions of like features will not be discussed when they would be apparent to those with skill in the art. For ease of reference, like structure is represented with appropriately incremented reference numbers.

As noted above, the operating system 2100 illustrated in FIGS. 25-32 includes a shift lock, such as a shift lock assembly 500, arranged to limit inadvertent movement (e.g., shifting) of the shifter 2118 between its operating positions, such as limiting undesirable movement of the shifter 2118 out of a selected operating position to a different position in which the operating system 2100 operates in a different operating mode. For instance, the shift lock may limit inadvertent shifting of the operating system 2100 from an operating mode not requiring user input (e.g., a gravity drop mode) to a mode requiring user input. In one embodiment, the shift lock may limit inadvertent movement of the shifter 2118 from its second operating position to its first operating position during operation of the covering 102. For example, a swinging action of the handle 2340 may cause the shifter 2118 to inadvertently move the shifter 2118 from its second operating position to its first operating position. The swinging action of the handle 2340 may be caused by a user releasing the drive cord 2334 and/or the handle 2340 (either inadvertently or otherwise) after positioning the shifter 2118 in its second operating position (e.g., to effectuate the gravity drop feature of the covering 102). In some embodiments, the swinging action of the handle 2340 may be exaggerated by the automatic retraction of the handle 2340 towards the end cap 2408 via the spring motor 2330. If it is desired to shift the shifter 2118 between its operating positions, a user may manipulate the shift lock assembly 500 to permit shifting of the shifter 2118, as explained below.

Referring to FIGS. 25-32, the shift lock assembly 500 includes the shifter 2118, the end cap 2408, and an obstruction element 510 positioned to engage the shifter 2118 and the end cap 2408 in a selectively locking configuration. As described below, the shift lock assembly 500 is operable to limit movement of the shifter 2118 relative to the end cap 2408 to limit inadvertent shifting of the shifter 2118 between its operating positions, such as via the obstruction element 510. For example, the obstruction element 510 may be arranged to provide selective obstruction between the shifter 2118 and the end cap 2408 to selectively limit movement of the shifter 2118 (e.g., lateral sliding or pivoting movement of the shifter 2118) relative to the end cap 2408. The obstruction element 510 may take on substantially any form or shape, including without limitation spherical, torus (donut-shaped), cylindrical, polyhedron, or the like. To that end, the obstruction element 510 may be a ball bearing, a cylindrical rod, or any other commercial or custom-built member.

Figure 26:
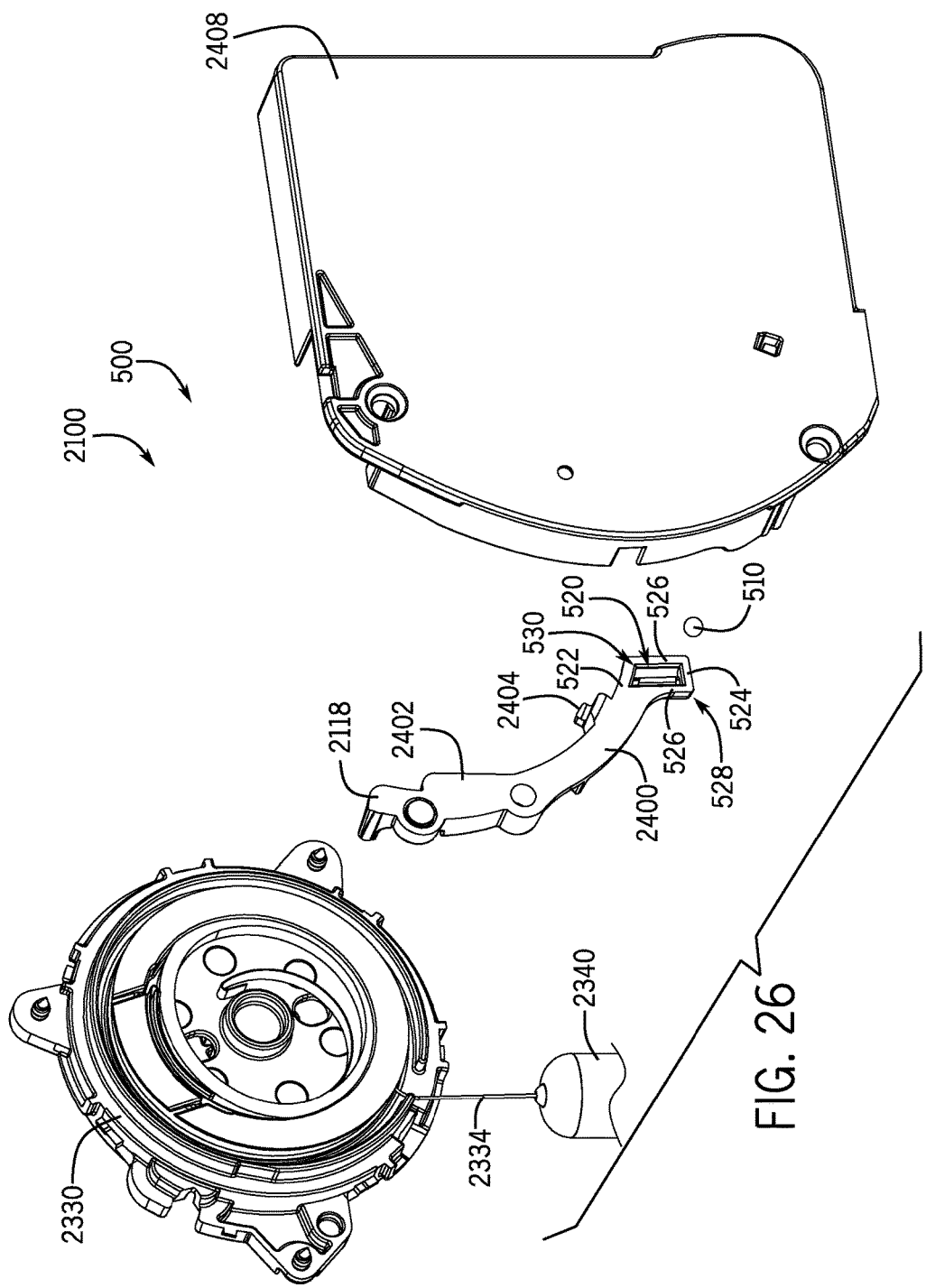
FIG. 26 is a partially exploded rear view of the operating system of FIG. 25 in accordance with an embodiment of the present disclosure.
Figure 30:
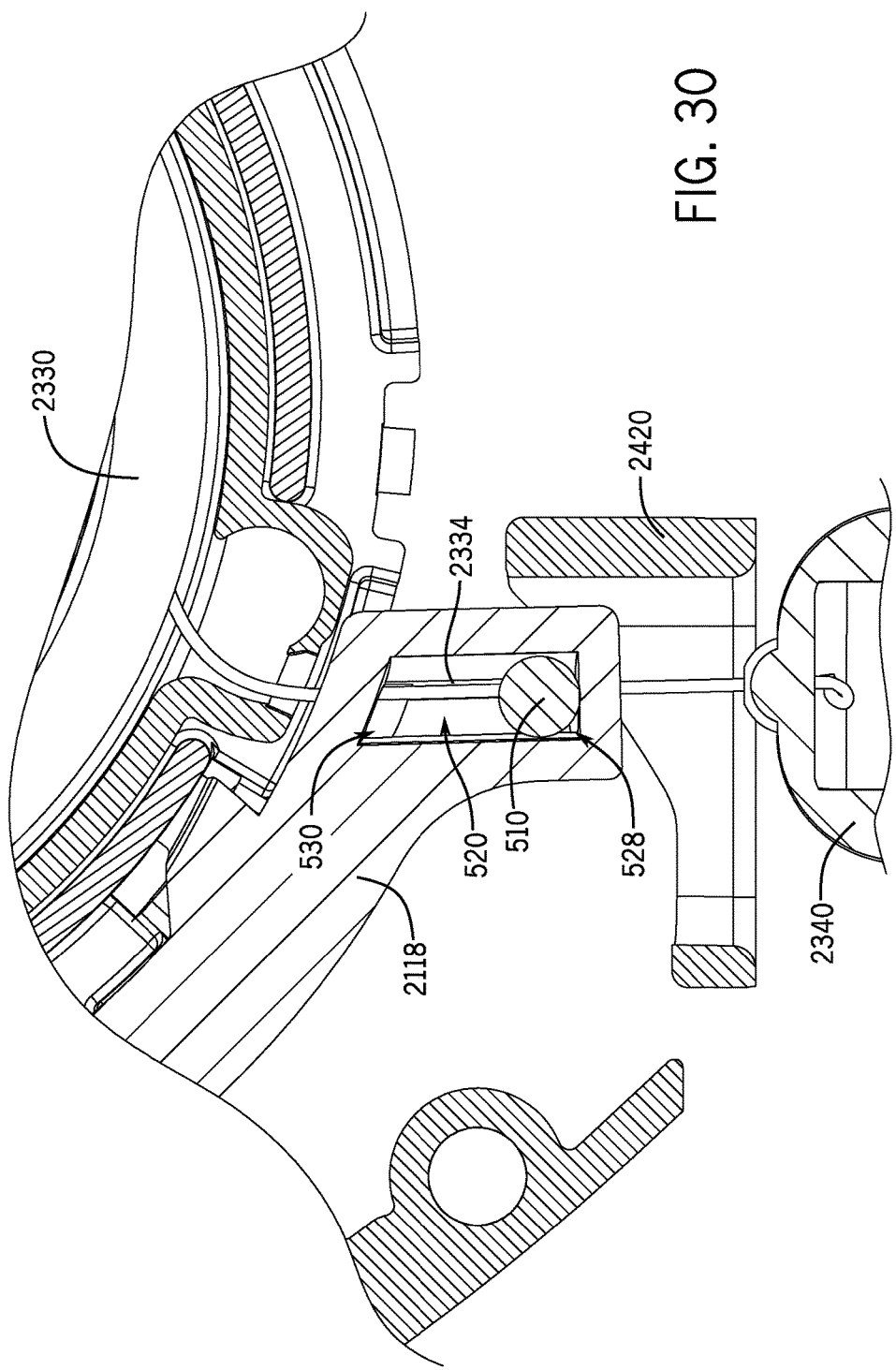
FIG. 30 is an enlarged fragmentary cross-sectional view taken along line XXX-XXX of FIG. 25 in accordance with an embodiment of the present disclosure.
Figure 31:
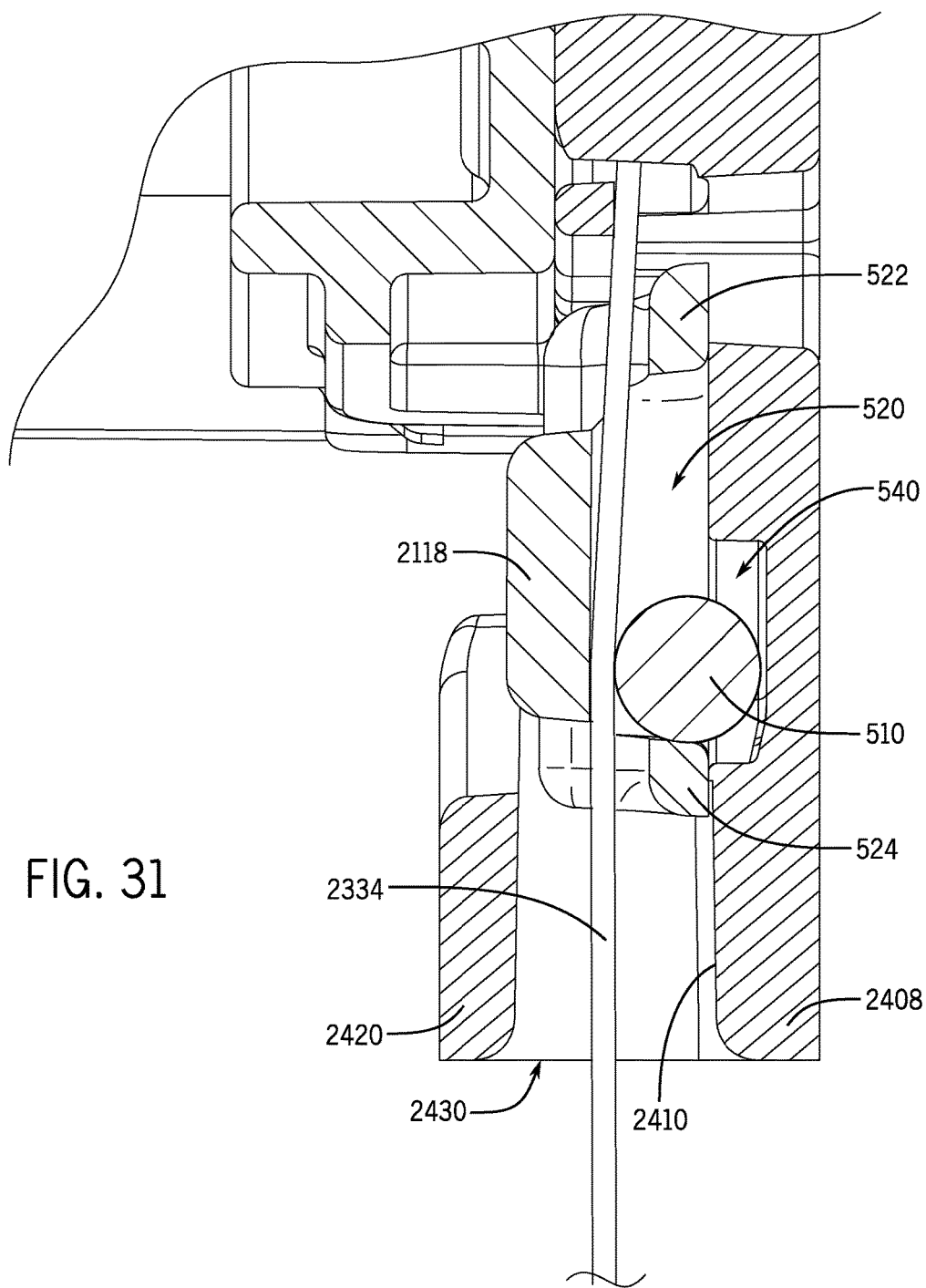
FIG. 31 is an enlarged fragmentary cross-sectional view taken along line XXXI-XXXI of FIG. 27 in accordance with an embodiment of the present disclosure.
Figure 32:
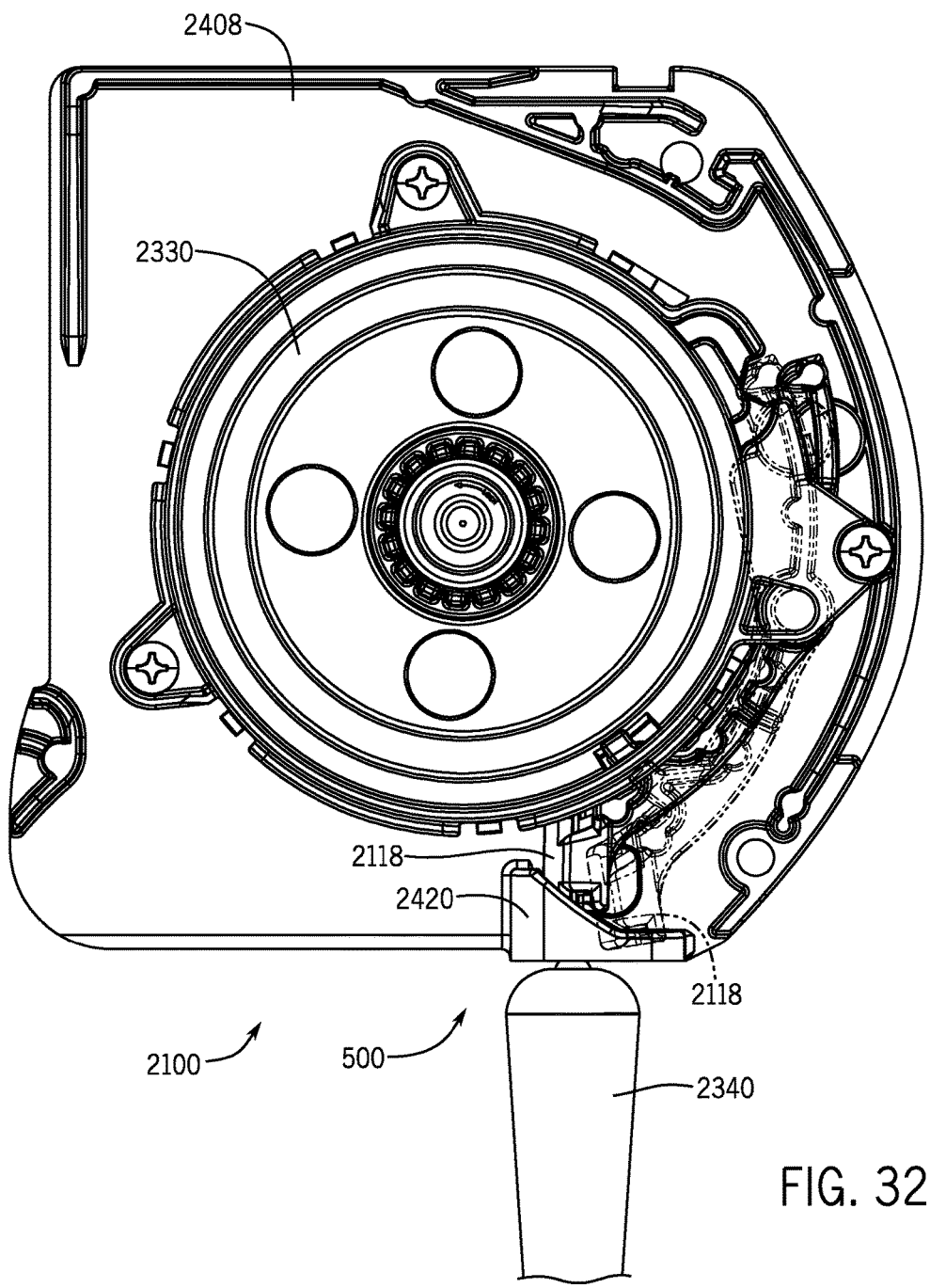
FIG. 32 is a front elevation view of the operating system of FIG. 25 in accordance with an embodiment of the present disclosure.

The shifter 2118 may include a channel 520 (see FIG. 26) defined therein to receive at least a portion of the obstruction element 510 (see FIGS. 30 and 31). As shown in FIG. 26, the channel 520 may be defined in the first portion 2400 of the shifter 2118, such as adjacent the first protrusion 2404, though the channel 520 may be defined in other portions of the shifter 2118 (e.g., within the second portion 2402). The channel 520 may include a length defined between upper and lower walls 522, 524 and a transverse width defined between opposing sidewalls 526. The drive cord 2334 may be routed through the channel 520 in the shifter 2118 (see FIGS. 30 and 31). For example, the drive cord 2334 may be routed through the upper wall 522, the channel 520, and the lower wall 524 (see FIG. 31). In such embodiments, the channel 520 may be dimensioned to allow movement of the obstruction element 510 along the length of the channel 520 (e.g., between the upper and lower walls 522, 524) while simultaneously limiting movement of the obstruction element 510 along the width of the channel 520. For instance, the width of the channel 520 may be dimensioned to closely match the width of the obstruction element 510 to limit movement of the obstruction element 510 to only along the length of the channel 520.

As described more fully below, the channel 520 may be dimensioned to allow selective movement of the obstruction element 510 therein to selectively limit movement of the shifter 2118 relative to the end cap 2408. For example, movement of the obstruction element 510 to a first position 528 (see FIG. 26) of the channel 520 (e.g., to a lower portion of the channel 520) may permit movement of the shifter 2118 relative to the end cap 2408 (see FIGS. 27 and 28). Conversely, movement of the obstruction element 510 to a second position 530 (see FIG. 26) of the channel 520 (e.g., to an upper portion of the channel 520) may limit movement of the shifter 2118 relative to the end cap 2408 (see FIG. 29), as described below.

Figure 25:
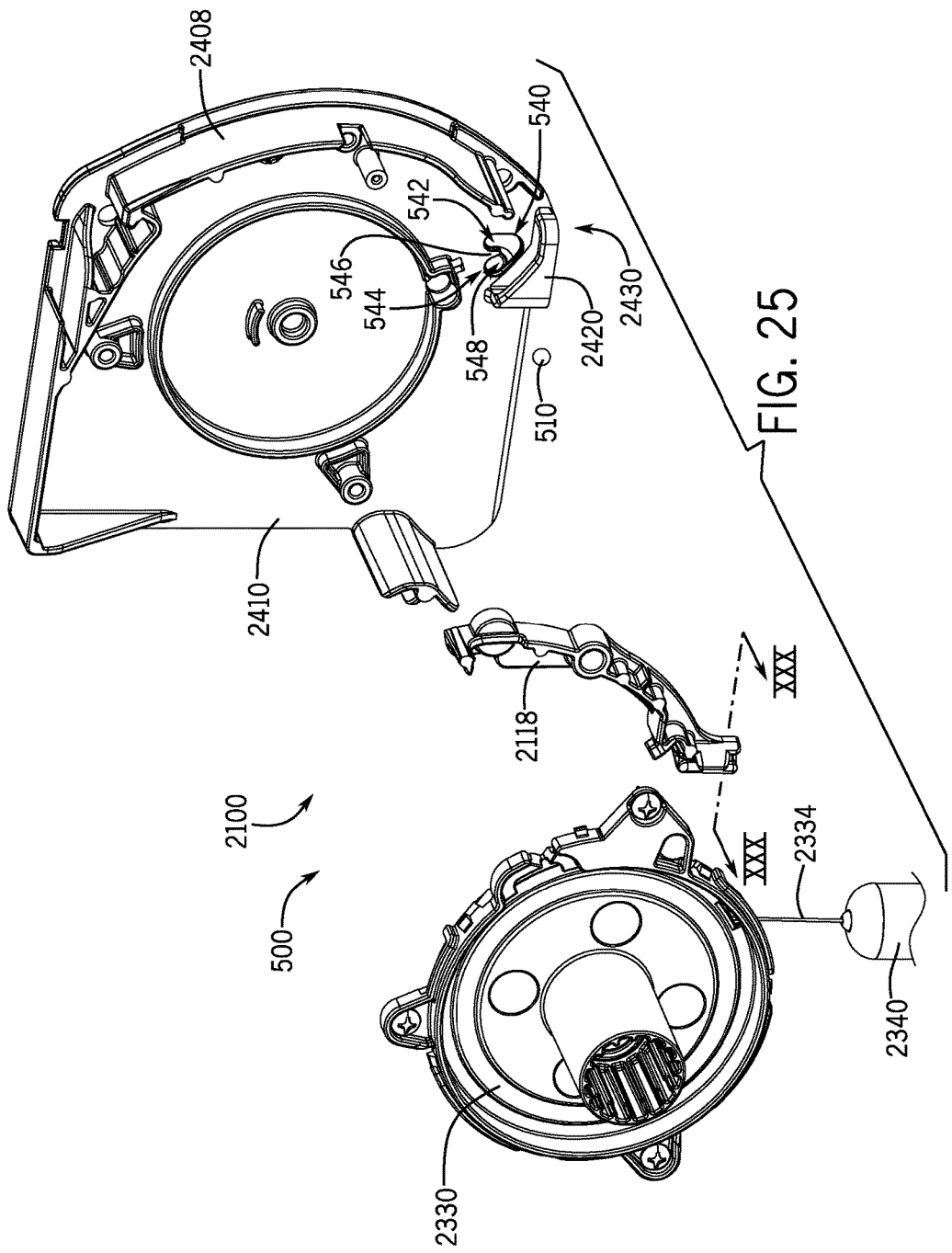
FIG. 25 is a partially exploded front view of an additional operating system in accordance with an embodiment of the present disclosure.

As illustrated in FIG. 25, a track 540 may be defined in the end cap 2408, such as in the inner surface 2410 of the end cap 2408, to receive at least a portion of the obstruction element 510 therein. The track 540 may include a first track portion 542 and a second track portion 544. Depending on the particular application, the first and second track portions 542, 544 may extend at various angles relative to each other. In one embodiment, the first and second track portions 542, 544 may be oriented relative to each other to define a wall 546 therebetween. For instance, the first and second track portions 542, 544 may extend at an acute angle relative to each other to define a V-shaped track, a U-shaped track, among others, with the wall 546 defined between the first and second track portions 542, 544. As described below, selective positioning of the obstruction element 510 within the first track portion 542 may permit movement of the shifter 2118 relative to the end cap 2408. Conversely, selective positioning of the obstruction element 510 within the second track portion 544 may limit movement of the shifter 2118 relative to the end cap 2408. In one embodiment, the track 540 may be defined in the inner surface 2410 of the end cap 2408 adjacent to the guide 2420, such as above the opening 2430 defined between the inner surface 2410 and the guide 2420.

As shown in FIG. 31, once the operating system 2100 is assembled for operation, the obstruction element 510 may be positioned at least partially between the shifter 2118 and the end cap 2408, such as extending between the shifter 2118 and the end cap 2408, to selectively inhibit movement of the shifter 2118 relative to the end cap 2408. In a preferred embodiment, the obstruction element 510 is positioned at least partially within the channel 520 defined in the shifter 2118 and at least partially within the track 540 defined in the end cap. Various portions of the obstruction element 510 may be positioned within the channel 520 and the track 540. For example, in one embodiment, approximately ½ of the obstruction element 510 may be positioned within the channel 520, and approximately ½ of the obstruction element 510 may be positioned within the track 540, though other configurations are contemplated. For example, more of the obstruction element 510 may be positioned in one of the channel 520 and the track 540 (e.g., more within the track 540, or vice-versa). Additionally or alternatively, less than ½ of the obstruction element 510 may be positioned within the channel 520, and less than ½ of the obstruction element 510 may be positioned within the track 540. In each of the above embodiments, however, relative movement, such as relative transverse sliding movement, of the shifter 2118 relative to the end cap 2408 may be limited by positioning a portion of the obstruction element 510 within both the channel 520 and the track 540. For example, movement of the shifter 2118 relative to the end cap 2408 may be limited by engagement of the obstruction element 510 with portions of the shifter 2118 and the end cap 2408 defining the channel 520 and the track 540, respectively, as described in more detail below.

Figure 33:
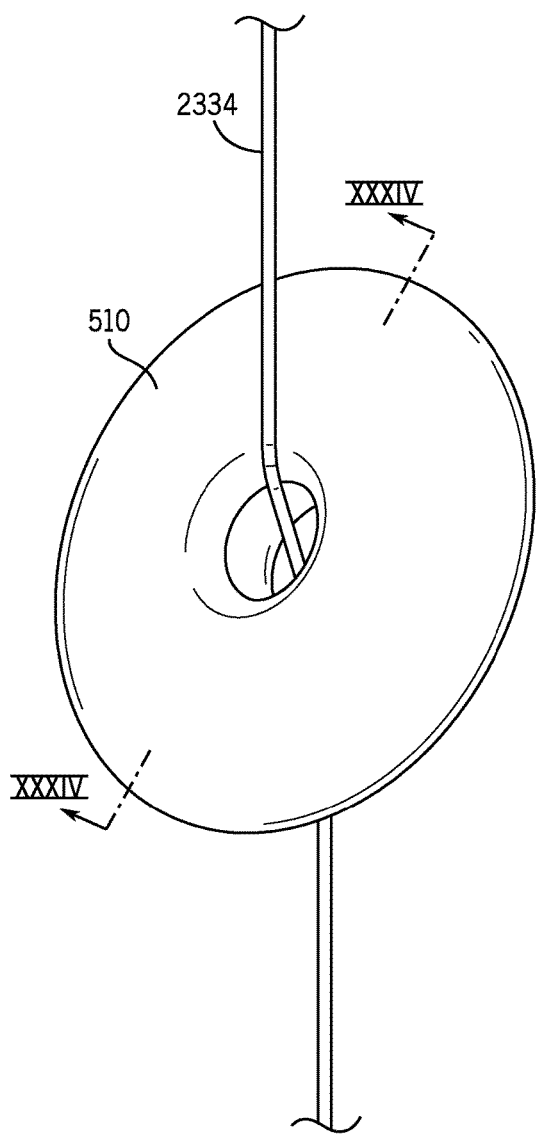
FIG. 33 is a perspective view of an obstruction element according to an alternative embodiment of the present disclosure.
Figure 34:
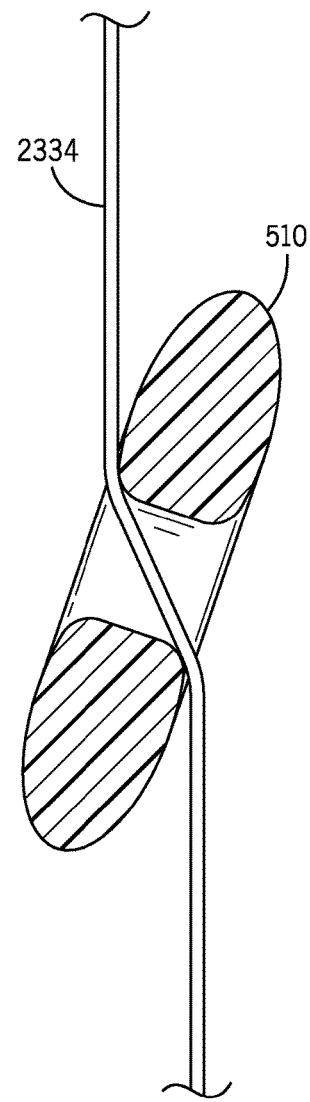
FIG. 34 is a cross-sectional view taken along line XXXIV-XXXIV of FIG. 33 in accordance with an embodiment of the present disclosure.

Movement of the obstruction element 510 within the track 540 and the channel 520 may be controlled via the drive cord 2334. For instance, the drive cord 2334 may be routed within the channel 520 of the shifter 2118 such that movement of the drive cord 2334 causes movement of the obstruction element 510. The drive cord 2334 may move the obstruction element 510 via a frictional engagement between the drive cord 2334 and the obstruction element 510. The drive cord 2334 may be routed to extend adjacent or through the obstruction element 510 to provide a degree of frictional engagement between the drive cord 2334 and the obstruction element 510. For example, in embodiments where the obstruction element 510 is a ball bearing, the drive cord 2334 may be routed to curve around the obstruction element 510 (see FIG. 31). In embodiments where the obstruction element 510 is annular (e.g., donut-shaped or a toroid), the drive cord 2334 may be routed through the obstruction element 510 (see FIGS. 33 and 34). To increase the frictional engagement between the drive cord 2334 and the obstruction element 510 in annular embodiments, the obstruction element 510 may be oriented transverse to the longitudinal axis of the drive cord 2334 such that the drive cord 2334 is routed around a lower portion of the obstruction element 510, through the obstruction element 510, and then around an opposite side of an upper portion of the obstruction element 510 to provide a desired frictional engagement between the drive cord 2334 and the obstruction element 510. In each of the embodiments described herein, the frictional engagement between the drive cord 2334 and the obstruction element 510 is sufficient to move the obstruction element 510 within the channel 520 in the direction in which the drive cord 2334 is moving as the drive cord 2334 slides or rubs against a surface of the obstruction element 510. For instance, downward movement of the drive cord 2334 causes the obstruction element 510 to move downwardly. Conversely, upward movement of the drive cord 2334 causes the obstruction element 510 to move upwardly.

In some embodiments, the tolerances between the shifter 2118, the drive cord 2334, the obstruction element 510, and the end cap 2408 may be such to create an interference fit between the elements. For instance, the channel 520 and the track 540 may be dimensioned such that the drive cord 2334 is partially compressed between the shifter 2118 and the obstruction element 510. Such an interference fit between the elements may facilitate the obstruction element 510 remaining in a set position, such as in a position locking movement of the shifter 2118 relative to the end cap 2408, absent movement of the drive cord 2334, as described more fully below.

Portions of the track 540 may be dimensioned to reduce the interference fit between the elements. For example, a dwell 548 may be formed as part of the first track portion 542 (e.g., as a terminal end portion of the first track portion 542), and the dwell 548 may be dimensioned to permit movement of the drive cord 2334 relative to the obstruction element 510 when the obstruction element 510 is positioned within the dwell 548 (see FIGS. 25 and 27). For example, without limitation, the dwell 548 may be sized larger, such as including a greater depth, width, or area within the inner surface 2410 of the end cap 2408, than other portions of the track 540 to decrease the frictional engagement between the obstruction element 510 and the drive cord 2334 when the obstruction element 510 is positioned within the dwell 548. Such a configuration may allow the drive cord 2334 to move substantially freely relative to the obstruction element 510 to limit binding of the drive cord 2334 with the obstruction element 510, which may be beneficial during highly repetitive and grossly controlled movement of the covering 102 (e.g., during retraction of the covering 102).

Figure 27:
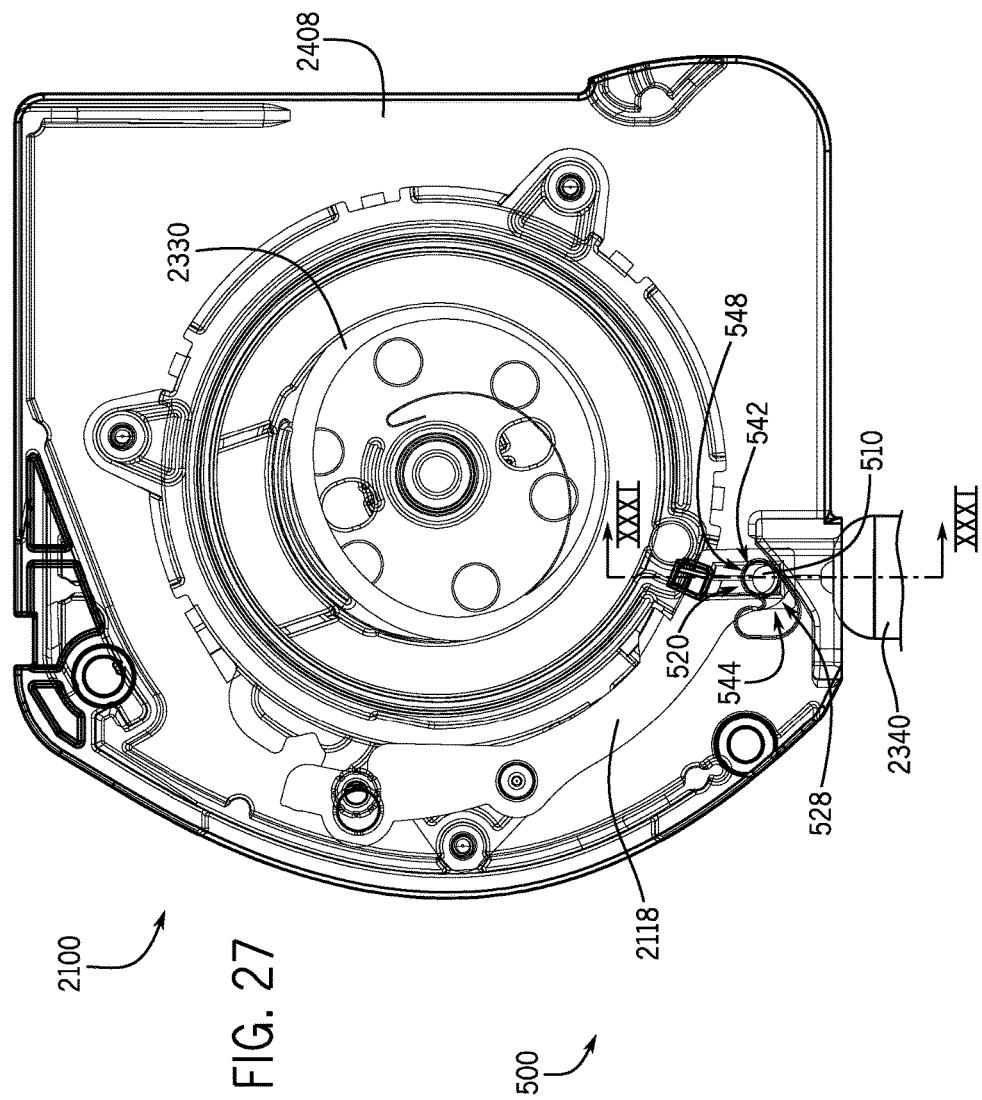
FIG. 27 is a rear elevation view of the operating system of FIG. 25 showing a shift lock feature or mechanism in a first configuration in accordance with an embodiment of the present disclosure. The end cap is transparent for illustrative purposes.

Operation of the shift lock assembly 500 will now be discussed in more detail with reference to FIGS. 27-29. Referring to FIG. 27, the obstruction element 510 may be positioned within the first track portion 542, such as within the dwell 548, when the shifter 2118 is positioned in its first operating position allowing retraction of the covering 102 upon actuation of the drive cord 2334. In accordance with one aspect of the present disclosure, the dwell 548 provides space for the obstruction element 510 to move as the drive cord 2334 moves up and down to retract the covering 102. For example, the dwell 548 may be sized and shaped to allow the drive cord 2334 to move up and down within the channel 520 of the shifter 2118 without obstruction from the obstruction element 510. The first track portion 542 may extend at an angle to the shifter 2118 to permit the obstruction element 510 to move within the first track portion 542 as the shifter 2118 is moved (shifted) from the first operating position (see FIG. 27) to the second operating position (see FIGS. 28 and 29). For example, the first track portion 542 may be designed to follow the arc angle defined by the obstruction element 510 as the shifter 2118 moves between its first and second operating positions. In this manner, the shift lock assembly 500 may permit the shifter 2118 to move freely from its first operating position to its second operating position.

To move the shifter 2118 to its second operating position, a user may pull the drive cord 2334 away from the operating system 2100 (e.g., towards the user), such as via the handle 2340, thereby moving the first portion 2400 of the shifter 2118 away from the transmission 2112 until the shifter 2118 is seated in its second operating position. Movement of the shifter 2118 from the first operating position to the second operating position may cause a length of the drive cord 2334 to be pulled through the channel 520, thereby rotating the spring motor 2330 and thus creating a bias in the spring motor 2330 to retract the length of the drive cord 2334 back through the shifter 2118.

Figure 28:
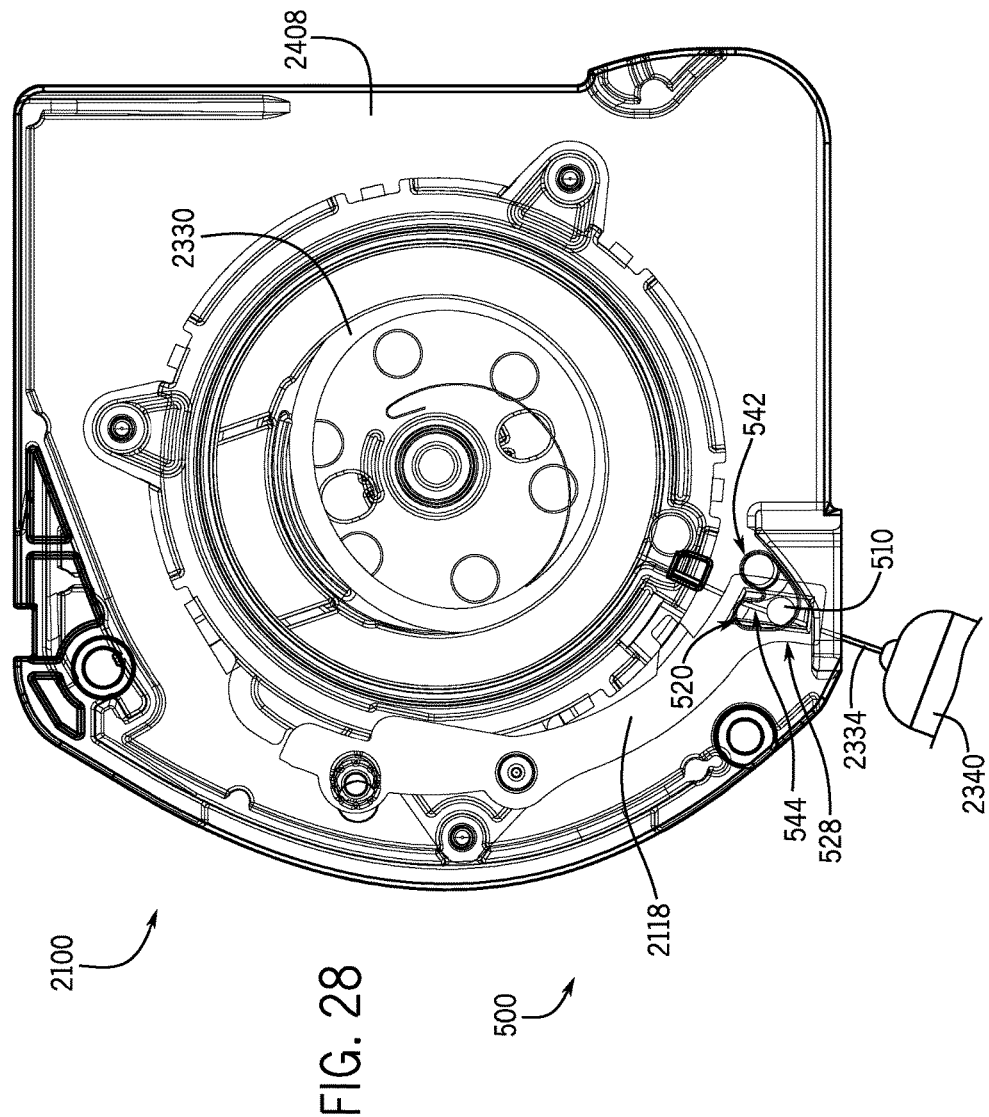
FIG. 28 is a rear elevation view of the operating system of FIG. 25 showing the shift lock in a second configuration in accordance with an embodiment of the present disclosure. The end cap is transparent for illustrative purposes.
Figure 29:
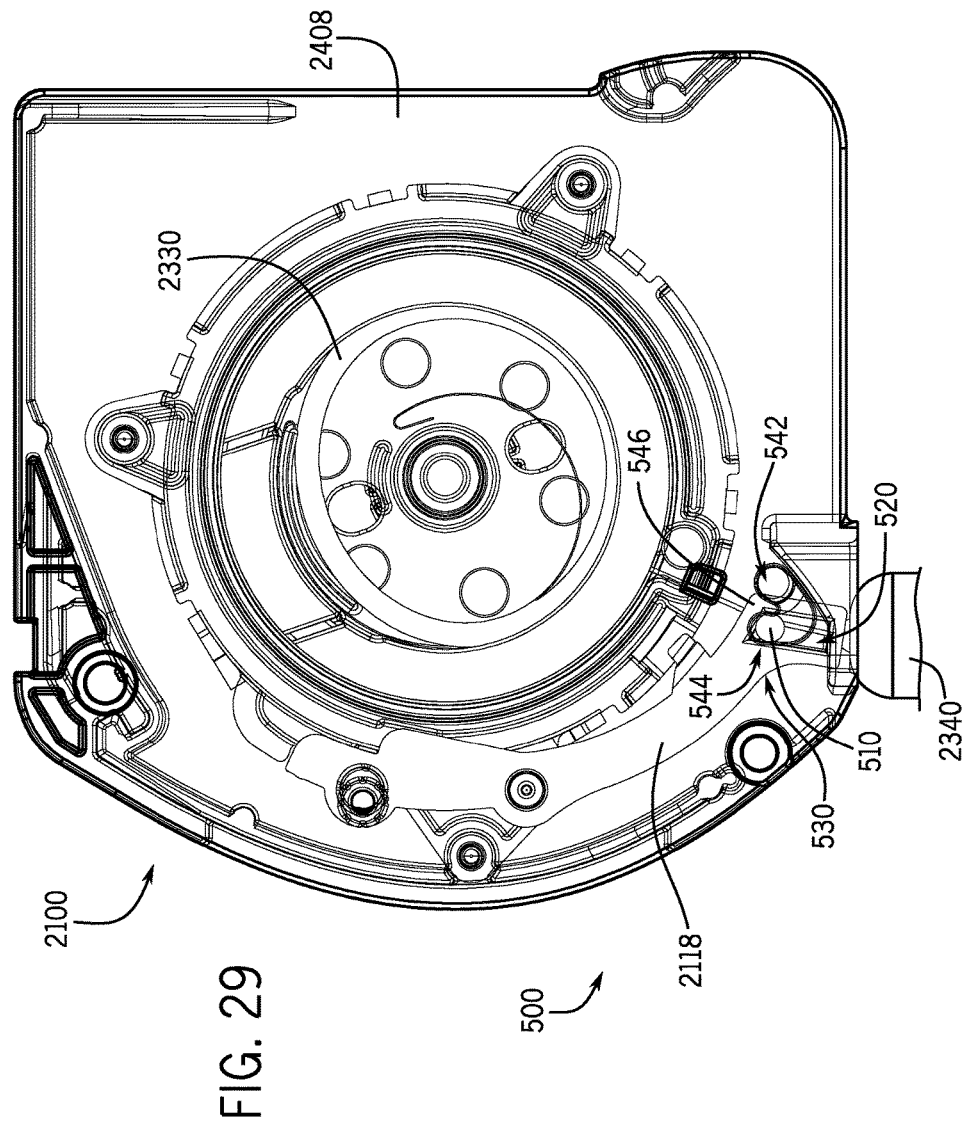
FIG. 29 is a rear elevation view of the operating system of FIG. 25 showing the shift lock in a third configuration in accordance with an embodiment of the present disclosure. The end cap is transparent for illustrative purposes.

During movement of the shifter 2118 to its second operating position, the obstruction element 510 moves from the first track portion 542 to the second track portion 544 of the track 540, with the obstruction element 510 positioned in the first portion 528 of the channel 520 (see FIG. 28). The user may then release the handle 2340 or otherwise permit movement of the drive cord 2334 towards the spring motor 2330 to retract through the channel 520 the length of the drive cord 2334 that was pulled through the channel 520 in shifting the shifter 2118 from its first operating position to its second operating position. Because of the friction engagement between the drive cord 2334 and the obstruction element 510, retraction of the drive cord 2334 through the channel 520 under the bias of the spring motor 2330 causes the obstruction element 510 to move (e.g., upwardly) from its first position 528 in the channel 520 to its second position 530 in the channel 520 (see FIG. 29). As noted above, an interference fit between the obstruction element 510 and the drive cord 2334 causes the obstruction element 510 to remain in the second position 530 in the channel 520 of the shifter 2118 when the drive cord 2334 is retracted, such as via friction between the obstruction element 510 and the drive cord 2334 inhibiting movement of the obstruction element 510 towards the first position 528 in the channel 520 without corresponding downward movement of the drive cord 2334. The obstruction element 510, may move up and down within the second track portion 544 of the end cap 2408 and within the channel 520 of the shifter 2118 as the drive cord 2334 moves up and down within the channel 520 as the user cycles the transmission 2112 between the power and reset strokes to open the covering 102. Once the shifter 2118 is positioned in its second operating position, the channel 520 of the shifter 2118 may be aligned (e.g., parallel) with the second track portion 544 of the end cap 2408 to limit inadvertent shifting of the shifter 2118 out of its second operating position. In one embodiment, the parallel alignment of the channel 520 and the second track portion 544 may facilitate the up and down movement of the obstruction element 510 within the second track portion 544 and the channel 520 as the user moves the drive cord 2334, such as to open the covering 102 and/or to move the shifter 2118 to its first operating position, as described below.

Once the obstruction element 510 is positioned in the second track portion 544 of the end cap 2408 and the second position 530 in the channel 520, the shifter 2118 is limited from moving relative to the end cap 2408 towards its first operating position. In particular, the limit wall 546 limits the obstruction element 510 from moving in a direction transverse to the channel 520 and the track 540, thereby limiting movement of the shifter 2118 relative to the end cap 2408 (see FIG. 29, for instance). For example, the limit wall 546 may block the obstruction element 510 from moving along the arc of travel of the shifter 2118 in moving between the second operating position and the first operating position. In this manner, the shift lock assembly 500 is operable to limit inadvertent shifting of the shifter 2118 when the obstruction element 510 is positioned in the second track portion 544 of the end cap 2408 and the second position 530 in the channel 520. As such, the shift lock assembly 500 is operable to limit shifting of the shifter 2118 when the cord is moving (or is moved) towards the operating system 2100, such as upwardly under the retraction bias of the spring motor 2330. Such a configuration may be advantageous to prevent shifting of the shifter 2118 when a user is not providing input to the operating system 2100, such as after moving (e.g., clicking) the shifter 2118 to its second operating position and walking away from the covering 102 while the covering 102 gravity drops across the architectural structure/feature.

To move the shifter 2118 to its first operating position, the obstruction element 510 is positioned in the first track portion 542 of the end cap 2408. For example, the user moves the drive cord 2334 towards the operating system 2100 (e.g., away from the user), such as via the handle 2340. In one embodiment, movement of the drive cord 2334 to shift the shifter 2118 to its first operating position causes a length of the drive cord 2334 to be pulled through the channel 520, thereby moving the obstruction element 510 from its second position 530 in the channel 520 to its first position 528 in the channel 520. Once the obstruction element 510 is positioned in its first position 528 in the channel 520, the interference between the obstruction element 510 and the track 540 is reduced or removed (e.g., the obstruction element 510 clears the limit wall 546) to permit the obstruction element 510 to move within the first track portion 542. For example, once the obstruction element 510 is positioned in the first portion 528 of the channel 520 via movement of the drive cord 2334, the obstruction element 510 may be free to move within the first track portion 542 from the second track portion 544 towards the dwell 548 of the first track portion 542 to permit the shifter 2118 to move towards its first operating position under a lateral bias of the drive cord 2334 on the shifter 2118 directing the first portion 2400 of the shifter 2118 towards the transmission 2112. In this manner, the shifter 2118 may move relative to the end cap 2408 when the obstruction element 510 is positioned within the first track portion 542. Once the obstruction element 510 is positioned within the dwell 548, the drive cord 2334 may move relatively freely within the channel 520 of the shifter 2118 as the user cycles the transmission 2112 between the power and reset strokes to retract the covering 102.

To restrict the obstruction element 510 from "climbing" the limit wall 546 and moving out of the track 540, the end cap 2408 may include a guide 2420 that limits movement of the shifter 2118 (e.g., an end of the shifter) away from the inner surface 2410 of the end cap 2408 (see FIG. 31). For example, the guide 2420 may be defined as a bail (see FIG. 30) to support the shifter 2118 during its movement between the first and second operating positions. To support the shifter 2118 in each of its first and second operating positions (and in any position therebetween), the guide 2420 may be shaped (e.g., arcuately) to match the arc defined by the movement of the end of the shifter 2118 between the first and second operating positions.

The operating system 100, 600, 1100, 1600, 2100, or 2600 and its components may be constructed of substantially any type of material. For example, each of the components of the operating system 100, 600, 1100, 1600, 2100, or 2600 may be constructed or formed from natural and/or synthetic materials, including metals, ceramics, plastics, and/or other suitable materials. Plastic materials may include thermoplastic material (self-reinforced or fiber-reinforced), ABS, polycarbonate, polypropylene, polystyrene, PVC, polyamide, or PTFE, among others. The operating system 100, 600, 1100, 1600, 2100, or 2600 may be built, formed, molded, or non-molded in any suitable manner, such as by plug molding, blow molding, injection molding, milling or the like.

In one embodiment, an operating system for an architectural covering is disclosed. The operating system may include a first drive section including an input, a second drive section including an output, and a directional control mechanism arranged to selectively lock an element conveying movement between the first and second drive sections to control movement of the output upon actuation of the input.

In one embodiment, the element selectively locked by the directional control mechanism is a shared element of the first and second drive sections.

The first drive section may include an output, the second drive section includes an input, and the output of the first drive section is the input of the second drive section. In one embodiment, each of the first and second drive sections includes a planetary gear set to control rotation of the output upon rotation of the input.

In one embodiment, the input of the first drive section is arranged to rotate in one direction, and the output of the second drive section is arranged to rotate in one of two directions depending on the selective engagement of the element conveying movement between the first and second drive sections. Engagement with the element conveying movement between the first and second drive sections causes the output of the second drive section to rotate in a first direction, and rotation of the output of the second drive section in the first direction both extends the architectural covering across an architectural feature and opens the architectural covering once the architectural covering is extended. Disengagement with the element conveying movement between the first and second drive sections and engagement of the directional control mechanism with another element of at least one of the first and second drive sections causes the output of the second drive section to rotate in a second direction upon rotation of the input of the first drive section.

In one embodiment, an operating system for an architectural covering may include a rotatable drive member configured for engagement with a covering winding member, a transmission configured to drivingly rotate the drive member, and a shifter movable to alternately engage different portions of the transmission to result in more than two modes of operation of the operating system. In a first mode of operation, the operation system operates to close, to retract, or to both close and retract the covering. In a second mode of operation, the operation system operates to allow the covering to extend across an architectural structure or feature. In a third mode of operation, the operation system operates to open the covering.

In one embodiment, alternate engagement of the shifter with the different portions of the transmission results in different directions of movement of the drive member upon actuation of the transmission.

In one embodiment, the shifter includes first and second lock portions configured to alternately engage another portion of the transmission. Engagement of the first lock portion with a first portion of the transmission locks the drive member against rotation in a first direction. Engagement of the second lock portion with another portion of the transmission locks the drive member against rotation in a second direction.

In one embodiment, the shifter pivots about an axis to alternately engage the different portions of the transmission. The shifter may be releasably held in alternate engagement with different parts of the transmission via a biasing mechanism.

In one embodiment, the operating system may further include an end cap. The biasing mechanism includes first and second magnets. The first magnet is secured to the end cap. The second magnet is associated with a portion of the shifter. The first and second magnets are configured to repel away from each other to position the shifter into alternating engagement with the transmission.

In one embodiment, the transmission includes a first member and a second member. The shifter moves to alternatively lock the first and second members against rotation in at least one direction. In one embodiment, the operating system includes an overrunning gear meshingly engaged with the second member to lock the second member against rotation in at least one direction when engaged by the shifter. The shifter includes a first protrusion operable to selectively engage the first member to lock the first member against rotation. The shifter includes a second protrusion operable to selectively engage the overrunning gear to lock the second member against rotation. Engagement of the shifter with the first member locks the drive member against rotation in a first direction. Engagement of the shifter with the overrunning gear locks the drive member against rotation in a second direction, the drive member being free to rotate in the first direction when the shifter is positioned for engagement with the overrunning gear.

In one embodiment, the transmission includes first and second drive sections operably coupled together yet individually controlled by the shifter.

In one embodiment, the operating system includes an output arranged to drivingly rotate the drive member, and a clutch mechanism permitting the drive member to slip relative the output upon application of a predetermined torque load to the clutch mechanism. The clutch mechanism may include a spring coupled to the output and engageable with the drive member, the spring arranged to allow movement of the output relative the drive member at the predetermined torque load.

In one embodiment, the operating system may include an obstruction element coupled with the shifter to selectively restrict movement of the shifter.

In one embodiment, an operating system for an architectural covering includes a transmission including a first member, and a second member, a rotatable drive member coupled to the transmission, the drive member configured for engagement with a covering winding member operable to extend or retract the architectural covering upon actuation of the transmission, the drive member rotatable in a first direction and a second opposite direction, and a shifter movable between two operating positions to alternately engage the first member and the second member to alter the rotation of the drive member upon actuation of the transmission.

In one embodiment, the transmission may include a first drive section and a second drive section. The first drive section may include a first sun gear, and a first set of planetary gears meshingly engaged with the first sun gear and carried by a first carrier positioning the first set of planetary gears about the first sun gear. The second drive section may include a second sun gear, and a second set of planetary gears meshingly engaged with the second sun gear and carried by a second carrier positioning the second set of planetary gears about the second sun gear. The operating system may further include a ring gear meshingly engaged with both the first set of planetary gears and the second set of planetary gears. The second member may include the ring gear.

The second sun gear and at least a portion of the first carrier may be operably coupled to rotate together. The first member may include at least a portion of the first carrier.

In one embodiment, the operating system may include an input shaft operable to drivingly rotate the transmission. The input shaft rotates in only one direction. The drive member is driven to rotate in the same direction as the input shaft. The drive member is driven to rotate in a direction opposite rotation of the input shaft. The drive member is free to rotate with respect to the input shaft.

In one embodiment, movement of the shifter between the operating positions changes the rotation direction of the drive member upon actuation of the transmission.

In one embodiment, the operating system may further include an actuation element operable to rotate the transmission. The actuation element selectively moves the shifter between the operating positions. The operating system may further include a biasing mechanism biasing the shifter to one of the operating positions based on the position of the shifter.

In one embodiment, the operating system may also include an output arranged to drivingly rotate the drive member, and a clutch mechanism permitting the drive member to slip relative to the output upon application of a predetermined torque load to the clutch mechanism. The clutch mechanism may include a ratchet mechanism selectively engageable with the output, the ratchet mechanism permitting selective movement of the output relative the ratchet mechanism, and a spring biasing the ratchet mechanism into engagement with the output.

In one embodiment, the operating system may further include an obstruction element coupled with the shifter to selectively restrict movement of the shifter between the two operating positions.

In one embodiment, a covering for an architectural structure or feature is disclosed for use with the operating system. The covering including a roller tube coupled to the drive member, and a shade mounted on the roller tube, the shade movable between extended and retracted positions upon rotation of the drive member.

In one embodiment, when the shifter is coupled to the first member, actuation of the transmission rotates the drive member in the second direction to retract the shade, and when the shifter is coupled to the second member, actuation of the transmission rotates the drive member in the first direction to extend the shade across the architectural structure or feature.

The shifter may be coupled to the second member, the drive member rotates freely in the first direction.

In one embodiment, a method of operating a covering for an architectural structure or feature is disclosed. The method including alternately engaging first and second members of an operating system via a shifter to rotatably inhibit rotation of either the first member or the second member, actuating a transmission when the shifter is engaged to the second member to allow rotation of an output of the operating system in a first direction to extend the covering across the architectural structure or feature, actuating the transmission when the shifter is engaged to the second member to rotate the output of the operating system in the first direction to open the covering, and actuating the transmission when the shifter is engaged to the first member to rotate the output of the operating system in a second direction to close, to retract, or to both close and retract the covering.

In one embodiment, the method may include rotatably driving a drive member by the transmission. Rotatably driving the transmission may be by an input shaft. Rotation of the input shaft may be limited to only one rotational direction.

In one embodiment, engaging the shifter to an engagement profile on an outer periphery of the first member, the engagement profile providing a resistance to rotation of the first member in the first direction when engaged by the shifter.

In one embodiment, the method may further include meshingly engaging the shifter to the second member via an overrunning gear, the overrunning gear providing a resistance to rotation of the second member in the second direction when engaged by the shifter.

In one embodiment, the method may further include selectively inhibiting movement of the shifter via an obstruction element coupled with the shifter.

In one embodiment, a method of operating a covering of an architectural structure or feature using an operating system is disclosed. The method may include operating the operating system in a first manner to retract the covering across the architectural structure or feature, operating the operating system in a second manner to extend the covering across the architectural structure or feature, and operating the operating system in a third manner to open, alter or re-configure the covering to allow viewing through the covering when the covering is in an extended configuration. For example, in one embodiment, in the third manner, the operating system may alter the covering or shade material between a closed configuration in which a portion of the covering or shade material is operated to block viewing through the covering or shade material, and an open configuration in which a portion of the shade material is operated to allow viewing through the covering or shade material.

In one embodiment, operating the operating system in the first manner includes rotating an input of the operating system in a first direction to rotate an output of the operating system in a second direction, operating the operating system in the second manner includes fixing the input of the operating system against rotation while permitting the output of the operating system to rotate in the first direction, and operating the operating system in the third manner includes rotating the input of the operating system in the first direction to rotate the output of the operating system in the first direction.

In one embodiment, operating the operating system in the first manner includes drivingly rotating the covering closed and/or retracted via a retractable cord mechanism, operating the operating system in the second manner includes permitting the covering to gravity drop across the architectural structure or feature, and operating the operating system in the third manner includes drivingly rotating the covering open via the retractable cord mechanism.

In one embodiment, the second and third manners rotate the shade in a first direction, and the first manner rotates the shade in an opposite second direction. Switching between the first, second, and third manners may be performed using a shifter.

In one embodiment, operating the operating system includes drivingly rotating a portion of the operating system using a planetary gear system. The second manner includes allowing the covering to drop freely across the architectural structure or feature. The planetary gear system provides a first drive ratio to operate the operating system in the third manner. The planetary gear system may provide a second drive ratio to operate the operating system in the first manner, the second drive ratio different than the first drive ratio.

In one embodiment, a method of operating an architectural covering is disclosed. The method includes rotating a first drive section via an input, rotating a second drive section via an output of the first drive section, rotating a drive member via an output of the second drive section, the drive member arranged to control movement of the architectural covering, and selectively controlling one or more selective engagements of the first and second drive sections to control movement of the drive member.

Selectively controlling one or more selective engagements of the first and second drive sections to control movement of the drive member includes selectively engaging the first and second drive sections via a shifter.

In one embodiment, the method may also include selectively locking an element conveying movement between the first and second drive sections via the shifter to selectively control rotation of the drive member.

The method may further include operating a drive cord to provide an input force to the first and second drive sections. Operating the drive cord in a first manner to close, to retract, or to both close and retract a shade material of the architectural covering, and operating the drive cord in a second manner to open the shade material. Operating the drive cord in the first manner includes pulling the drive cord straight down. Operating the drive cord in the second manner includes pulling the drive cord away from the architectural structure or feature to which the architectural covering is attached.

In one embodiment, a method of operating an architectural covering is disclosed. The method includes rotating an output of a transmission in a first direction to extend the covering at least partially across an architectural structure or feature, and once the covering is in an extended position, rotating the output of the transmission in the first direction to move the covering into an open configuration, wherein the covering moves into the open configuration via a slower adjustment for the same amount of force than extending the covering.

In one embodiment, an operating system for an architectural covering is disclosed. The operating system includes an input shaft rotating in only a first direction, and a drive member rotating in one of at least three modes. The at least three modes including being driven in the first direction, being driven in a second direction opposite the first direction, and rotating freely with respect to the input shaft.

In one embodiment, the operating system may also include a transmission. The transmission may include first and second drive sections. The first drive section may be coupled with the second drive section such that rotation of a first element of the first drive section rotates a first element of the second drive section and locking of the first element of the first drive section locks the first element of the second drive section against rotation. Rotation of a second element of the first drive section may rotate a second element of the second drive section and locking of the second element of the first drive section locks the second element of the second drive section against rotation.

In one embodiment, an operating system for an architectural covering is disclosed. The operating system includes a transmission for rotating a covering winding member, a shifter movable to alternately engage different portions of the transmission to affect operation of the transmission, the shifter movable between a first operating position and a second operating position, and an obstruction element adapted to selectively restrict movement of the shifter to remain in one of the first and second operating positions. The obstruction element may be movably received within the shifter.

In one embodiment, a channel may be defined within a portion of the shifter, a track may be defined within a portion of an end cap of the architectural covering, and the obstruction element may be movable within the channel and the track to selectively restrict movement of the shifter relative to the end cap. The channel and the track are dimensioned to accommodate at least a portion of the obstruction element therein.

In one embodiment, the obstruction element is movable between a first position in which movement of the shifter between the first and second operating positions is permitted and a second position in which movement of the shifter from the one of the first and second operating positions is restricted. When the obstruction element is positioned in the second position, the shifter may be positioned in the second operating position and the obstruction element restricts the shifter from moving to the first operating position.

In one embodiment, the operating system may further include a drive cord for operating the transmission, and movement of the obstruction element within the track and within the channel is controlled via the drive cord.

In one embodiment, an operating system for an architectural covering is disclosed. The operating system including a shifter movable between a first operating position for actuating the operating system to effect movement of the covering in a first manner, and a second operating position for actuating the operating system to effect movement of the covering in a second manner, and a shift lock operable to restrict movement of the shifter in the second operating position during movement of the covering in the second manner.

In one embodiment, the first operating position is different from the second operating position.

The shift lock may be operable between a first configuration and a second configuration, the first configuration restricting movement of the shifter in the second operating position. The shift lock may include a movable element moveable between a first track at the first configuration, and a second track at the second configuration, the moveable element is constrained to move only in the first track when the shift lock is in the first configuration to retain the shifter in the second operating position, and the moveable element allows movement of the shifter when the moveable element is in the second track. The second track may include a dwell and the moveable element seats in the dwell when the shift lock is in the second configuration. The shifter may include a channel formed therein, the moveable element sits in both the channel in the shifter and the first track of the shift lock to restrain movement of the shifter, and the moveable element sits in both the channel in the shifter and the second track of the shift lock to allow movement of the shifter. The first track and the second track of the shift lock are formed in an end cap to which the operating element is coupled. The operating system may further include a retractable drive cord extending through the channel in the shifter, and the retractable drive cord moves the moveable element into the first track of the shift lock when the shifter is in the second operating position and the drive cord retracts. The moveable element sits in the dwell, frictional engagement between the moveable element and the drive cord is decreased. The retractable drive cord moves the moveable element into the second track of the shift lock when the shifter is moved into the first operating position.

In one embodiment, the moveable element is a ball.

In one embodiment, the operating system may include a transmission including a first drive section and a second drive section, the operating system is operable between a first transmission position to operate the first drive section and a second transmission position to operate the second drive section, and the shifter is disengaged from the first drive section and the second drive section when the shifter is in the second operating position, and engaged with one of the first drive section and the second drive section when the shifter is in the first operating position. The operating system may release the architectural covering into an extended position upon movement of the shifter into the second operating position so that no further action beyond moving the shifter into the second operating position is required to move the architectural covering from a retracted position to an extended position.

In one embodiment, the operating system may further include a slip clutch operatively coupled to the transmission and the rotatable drive member to prevent excessive torque from being transmitted between the transmission and the rotatable drive member.

In one embodiment, a method of operating a covering of an architectural structure or feature using an operating system is disclosed. The method may include operating the operating system in a first manner to retract the covering across the architectural structure or feature via drivingly rotating the covering closed and/or retracted via a retractable cord mechanism, operating the operating system in a second manner to extend the covering across the architectural structure or feature via permitting the covering to gravity drop across the architectural structure or feature, and operating the operating system in a third manner to open, alter or re-configure the covering to allow viewing through the covering when the covering is in an extended configuration via drivingly rotating the covering open via the retractable cord mechanism.

The foregoing description has broad application. It should be appreciated that the concepts disclosed herein may apply to many types of shades, in addition to the roller shades described and depicted herein. Similarly, it should be appreciated that the concepts disclosed herein may apply to many types of operating systems, in addition to the operating system 100 described and depicted herein. For example, the concepts may apply equally to any type of covering having a shade element movable across an architectural structure/feature. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed is:

1. An operating system for an architectural covering, said operating system comprising:
   a rotatable drive member configured for engagement with a covering winding member;
   a transmission configured to drivingly rotate said drive member; and
   a shifter movable to alternately engage different portions of said transmission to result in more than two modes of operation of said operating system.

2. The operating system of claim 1, wherein:
   in a first mode of operation, the operation system operates to close, to retract, or to both close and retract the covering; and
   in a second mode of operation, the operation system operates to allow the covering to extend across an architectural structure or feature.

3. The operating system of claim 2, wherein in a third mode of operation, the operation system operates to open the covering.

4. The operating system of claim 1, wherein the alternate engagement of said shifter with said different portions of said transmission results in different directions of movement of said drive member upon actuation of said transmission.

5. The operating system of claim 1, wherein:
   said shifter comprises first and second lock portions configured to alternately engage another portion of said transmission;
   engagement of said first lock portion with a first portion of said transmission locks said drive member against rotation in a first direction; and
   engagement of said second lock portion with another portion of said transmission locks said drive member against rotation in a second direction.

6. The operating system of claim 1, wherein said shifter pivots about an axis to alternately engage said different portions of said transmission.

7. The operating system of claim 1, wherein said shifter is releasably held in alternate engagement with different parts of said transmission via a biasing mechanism.

8. The operating system of claim 7, further comprising an end cap, wherein:
said biasing mechanism includes first and second magnets;
said first magnet is secured to said end cap;
said second magnet is associated with a portion of said shifter; and
said first and second magnets are configured to repel away from each other to position said shifter into alternating engagement with said transmission.

9. The operating system of claim 1, wherein:
said transmission comprises a first member and a second member; and
said shifter moves to alternatively lock said first and second members against rotation in at least one direction.

10. The operating system of claim 9, further comprising an overrunning gear meshingly engaged with said second member to lock said second member against rotation in at least one direction when engaged by said shifter.

11. The operating system of claim 9, wherein:
said shifter includes a first protrusion operable to selectively engage said first member to lock said first member against rotation; and
said shifter includes a second protrusion operable to selectively engage said overrunning gear to lock said second member against rotation.

12. The operating system of claim 9, wherein:
engagement of said shifter with said first member locks said drive member against rotation in a first direction; and
engagement of said shifter with said overrunning gear locks said drive member against rotation in a second direction, the drive member being free to rotate in said first direction when said shifter is positioned for engagement with said overrunning gear.

13. The operating system of claim 1, wherein said transmission comprises first and second drive sections operably coupled together yet individually controlled by said shifter.

14. The operating system of claim 1, further comprising:
an output arranged to drivingly rotate said drive member; and
a clutch mechanism permitting said drive member to slip relative said output upon application of a predetermined torque load to said clutch mechanism.

15. The operating system of claim 14, wherein said clutch mechanism comprises a spring coupled to said output and engageable with said drive member, said spring arranged to allow movement of said output relative said drive member at the predetermined torque load.

16. The operating system of claim 1, further comprising an obstruction element coupled with said shifter to selectively restrict movement of said shifter.

17. The operating system of claim 1, wherein said transmission comprises a first drive section and a second drive section.

18. The operating system of claim 17, wherein each of said first and second drive sections comprises a planetary gear set to control rotation of said rotatable drive member upon rotation of said transmission.

19. The operating system of claim 17, wherein:
said first drive section comprises:
a first sun gear; and
a first set of planetary gears meshingly engaged with said first sun gear and carried by a first carrier positioning said first set of planetary gears about said first sun gear; and
said second drive section comprises:
a second sun gear; and
a second set of planetary gears meshingly engaged with said second sun gear and carried by a second carrier positioning said second set of planetary gears about said second sun gear.

20. The operating system of claim 19, further comprising a ring gear meshingly engaged with both said first set of planetary gears and said second set of planetary gears.

21. The operating system of claim 14, wherein said clutch mechanism comprises a slip clutch coupled to said output and engageable with said drive member, said slip clutch arranged to allow movement of said output relative said drive member at or below said predetermined torque load.

22. The operating system of claim 21, wherein said slip clutch includes a first body portion and a second body portion, said first and second body portions being adapted and configured: (i) to rotate in unison when an applied torque is below said predetermine torque load so that said applied torque is transmitted from said transmission to said drive member via said slip clutch, and (ii) to decouple when an applied torque is above said predetermine torque load so that said applied torque is not transmitted from said transmission to said drive member via said slip clutch.

23. The operating system of claim 22, wherein said output includes an opening formed in an end thereof, said opening being arranged and configured to receive a portion of said first body portion of said slip clutch.

24. The operating system of claim 22, wherein said second body portion of said slip clutch includes a plurality of ridges formed thereon for coupling to said drive member.

* * * * *